(12) United States Patent
Barnard et al.

(10) Patent No.: US 12,459,852 B2
(45) Date of Patent: Nov. 4, 2025

(54) FEEDBACK CONTROL SYSTEMS AND METHODS FOR GLASS TUBE CONVERTING PROCESSES

(71) Applicant: CORNING INCORPORATED, Corning, NY (US)

(72) Inventors: Christelle Ruby Barnard, Painted Post, NY (US); Eric Michael Gross, Corning, NY (US); Joseph Michael Matusick, Corning, NY (US); Kevin Patrick McNelis, Elmira, NY (US); Connor Thomas O'Malley, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 416 days.

(21) Appl. No.: 17/885,210

(22) Filed: Aug. 10, 2022

(65) Prior Publication Data

US 2022/0388889 A1    Dec. 8, 2022

Related U.S. Application Data

(63) Continuation-in-part of application No. 17/746,396, filed on May 17, 2022, now Pat. No. 12,060,295.
(Continued)

(51) Int. Cl.
*C03B 23/08* (2006.01)
*C03B 23/045* (2006.01)
(Continued)

(52) U.S. Cl.
CPC ............ *C03B 23/08* (2013.01); *C03B 23/045* (2013.01); *C03B 23/09* (2013.01); *G05B 19/4155* (2013.01); *G05B 2219/45009* (2013.01)

(58) Field of Classification Search
CPC ....... C03B 23/08; C03B 23/045; C03B 23/09; C03B 23/043; C03B 23/095;
(Continued)

(56) References Cited

U.S. PATENT DOCUMENTS 3,424,570 A    1/1969    Couquelet
3,482,448 A    12/1969    Gaffard
(Continued)

FOREIGN PATENT DOCUMENTS

CN    1685229 A    10/2005
CN    1872754 A    12/2006
(Continued)

OTHER PUBLICATIONS

International Search Report and Written Opinion of the International Searching Authority; PCT/US2022/038445; dated Jan. 30, 2023; 12 pages; European Patent Office.
(Continued)

*Primary Examiner* — Kamini S Shah
*Assistant Examiner* — Jonathan Michael Skrzycki
(74) *Attorney, Agent, or Firm* — Michael G. Panian

(57) ABSTRACT

Methods for providing feedback control of converters for converting glass tubes to glass articles include a model predictive control framework. The methods include operating the converter, providing target values for attributes of the glass articles or glass tubes, measuring the attributes for the glass articles and glass tubes, conditioning the measurement data to remove outlier data points and calculating statistics representative of the measured attributes, and determine updated settings for one or more process parameters from the previous settings, the statistical properties, and the target values, where the updated settings are those that minimize an objective control function for the converter. The methods further include adjusting the process parameters to the
(Continued)

updated settings. The model predictive control framework enables feedback control of the converter that compensates for disturbances that act on the process.

45 Claims, 18 Drawing Sheets

Related U.S. Application Data

(60) Provisional application No. 63/192,135, filed on May 24, 2021.

(51) Int. Cl.
*C03B 23/09* (2006.01)
*G05B 19/4155* (2006.01)

(58) Field of Classification Search
CPC ...... G05B 19/4155; G05B 2219/45009; G05B 2219/32191; G05B 2219/32194; G05B 19/41875
See application file for complete search history.

(56) References Cited

U.S. PATENT DOCUMENTS

| | | | |
|---|---|---|---|
| 3,736,118 A | 5/1973 | Heflich et al. | |
| 4,092,142 A | 5/1978 | Dichter | |
| 4,142,883 A | 3/1979 | Dichter | |
| 4,303,435 A | 12/1981 | Sleighter | |
| 4,548,633 A | 10/1985 | Nebelung | |
| 4,615,719 A | 10/1986 | Pauluk et al. | |
| 4,688,474 A | 8/1987 | Anderl | |
| 5,196,997 A * | 3/1993 | Kurtzberg | G05B 21/02 700/109 |
| 5,583,337 A | 12/1996 | Chan | |
| 5,611,834 A | 3/1997 | Walter et al. | |
| 6,188,079 B1 | 2/2001 | Juvinall et al. | |
| 6,232,583 B1 | 5/2001 | Uhm | |
| 7,660,642 B1 * | 2/2010 | Tuszynski | G05B 19/41875 700/29 |
| 8,958,058 B2 | 2/2015 | Bonin et al. | |
| 10,773,989 B2 | 9/2020 | Gaylo et al. | |
| 10,968,133 B2 | 4/2021 | Gaylo et al. | |
| 11,186,513 B2 | 11/2021 | Gaylo et al. | |
| 11,339,079 B2 | 5/2022 | Klingensmith et al. | |
| 11,420,893 B2 | 8/2022 | McEnroe | |
| 2003/0216887 A1 | 11/2003 | Shieh | |
| 2004/0143357 A1 * | 7/2004 | Schwarm | G05B 23/0221 700/121 |
| 2006/0031024 A1 * | 2/2006 | Mountassir | G06Q 10/04 702/19 |
| 2006/0096319 A1 | 5/2006 | Dalstra | |
| 2007/0038657 A1 * | 2/2007 | Denton | G06Q 10/04 |
| 2009/0037013 A1 | 2/2009 | Hendler et al. | |
| 2010/0060902 A1 | 3/2010 | Wornson et al. | |
| 2010/0082120 A1 * | 4/2010 | Stephenson | G05B 13/048 700/95 |
| 2010/0208242 A1 | 8/2010 | Martinez et al. | |
| 2011/0141264 A1 | 6/2011 | Holtkamp et al. | |
| 2011/0141265 A1 | 6/2011 | Holtkamp et al. | |
| 2012/0047955 A1 * | 3/2012 | Belgum | C03B 23/043 65/271 |
| 2014/0174127 A1 | 6/2014 | Dalstra | |
| 2014/0373574 A1 | 12/2014 | Moseler et al. | |
| 2015/0064779 A1 | 3/2015 | Schultz et al. | |
| 2015/0076353 A1 | 3/2015 | Bathelet | |
| 2015/0142163 A1 | 5/2015 | Simon | |
| 2015/0203077 A1 | 7/2015 | Gokan | |
| 2016/0016841 A1 | 1/2016 | Frost et al. | |
| 2016/0214224 A1 | 7/2016 | Jing et al. | |
| 2018/0134603 A1 | 5/2018 | Yoshio | |
| 2019/0195724 A1 | 6/2019 | Jo et al. | |
| 2020/0354255 A1 * | 11/2020 | Gerber | C03B 23/112 |
| 2020/0377402 A1 * | 12/2020 | Gaylo | C03B 23/112 |

FOREIGN PATENT DOCUMENTS

| | | |
|---|---|---|
| CN | 104591525 A | 5/2015 |
| CN | 104843981 A | 8/2015 |
| CN | 105271658 A | 1/2016 |
| DE | 19902316 A1 | 8/2000 |
| EP | 1725501 B1 | 5/2008 |
| EP | 2842916 A1 | 3/2015 |
| EP | 2873572 A1 | 5/2015 |
| EP | 3287419 A1 | 2/2018 |
| GB | 2241400 A | 8/1991 |
| IT | 201900005600 A1 | 10/2020 |
| JP | 52-121486 A | 10/1977 |
| JP | 60-098340 A | 6/1985 |
| JP | 02-049930 B2 | 10/1990 |
| JP | 05-072138 A | 3/1993 |
| JP | 07-002138 B2 | 1/1995 |
| JP | 09-008340 A | 1/1997 |
| JP | 2013-079180 A | 5/2013 |
| JP | 2014-114028 A | 6/2014 |
| JP | 2014-129224 A | 7/2014 |
| JP | 2014-184845 A | 10/2014 |
| JP | 2014-208565 A | 11/2014 |
| JP | 2015-107636 A | 6/2015 |
| JP | 2016-060674 A | 4/2016 |
| RU | 2064458 C1 | 7/1996 |
| WO | 2014/010578 A1 | 1/2014 |
| WO | 2016/042984 A1 | 3/2016 |
| WO | 2016/171214 A1 | 10/2016 |

OTHER PUBLICATIONS

Dean Butler, et al., Intelligent software sensors and process prediction for glass container forming processes based on multivariate statistical process control techniques, UKACC International Conference on Control, 2012, pp. 281-285.

* cited by examiner

FEEDBACK CONTROL SYSTEMS AND METHODS FOR GLASS TUBE CONVERTING PROCESSES

CROSS-REFERENCE TO RELATED APPLICATIONS

This application claims the benefit of priority under 35 U.S.C. § 120 of U.S. application Ser. No. 17/746,396 filed on May 17, 2022, and U.S. Provisional Application Ser. No. 63/344,851, filed on May 23, 2022, the content of which are relied upon and incorporated herein by reference in their entirety.

FIELD

The present specification generally relates to systems and methods for producing glass articles from glass tubes, in particular, systems and methods for feedback control of a glass tube converting process.

TECHNICAL BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability to prevent affecting the stability of the pharmaceutical formulations contained therein. Glasses having suitable chemical durability include those glass compositions within the ASTM standard 'Type IA' and 'Type IB' glass compositions, which have a proven history of chemical durability.

Glass tubing may be converted into other glass articles, such as various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long lengths of glass tube into a plurality of glass articles using steps that include flame working, rotating and stationary tool forming, thermal separation, or score and shock cutoff steps. Various burners and forming tools are often used to shape one or more articles from the glass tube and separate the article from the glass tube.

SUMMARY

During conversion of glass tube to glass articles using a converting machine (i.e., converter), heating elements, such as burners, heat the glass of the glass tube to a temperature at which the viscosity of the glass allows the glass to be formed into one or more features of the glass article. Forming stations include forming tools, such as pin and wheel assemblies, to make contact with the heated glass tube and form the internal and external dimensions of features of the finished glass articles. Conventional converting machines have used simple needle valves to adjust burner output in heating stations. The positions of forming tools on conventional converting machines have been adjusted by mechanical linkages, which are often connected to cam driven shafts. Burner output, burner positioning, forming tool position, and forming tool contact timing can affect dimensional yields and defect rates of the converter. Additionally, hundreds of other process settings and inputs on the typical converting machine can influence the dimensional yields and defect rates that can be achieved by the converting machine.

Historically, control strategies for managing the hundreds of process settings and inputs for conventional converting machines have relied on human operators. In particular, these human operators of various experience levels have been relied on to change the burner parameters, forming unit parameters, and overall machine timing for different geometry vials. Human operators manage the normal day-to-day variation which occurs during this process by adjusting these same parameters. The degree by which a producer is able to consistently make high yield and high quality glass articles from the converting machines is highly dependent on the skill level and experience of the machine operators operating the converting machines. The variation in experience levels between operators line to line, and shift to shift can cause significant variability in the yield and quality of the vials produced on the process. Despite advances in "add on" control devices and automation, such as mass flow control valves, servo motors, and/or PLC controllers, the current state of the art is that human operators are still making the decisions and ultimately driving all of the input parameters for the converter.

Accordingly, a need exists for systems and methods for providing feedback control for a converter for converting glass tubes into glass articles, such as pharmaceutical packaging, to reduce variability in operations and improve yield and reduce defect rates.

In a first aspect of the present disclosure, a method for controlling a converter for producing glass articles from glass tubes may include operating a converter to produce a plurality of glass articles from a plurality of glass tubes, where the converter comprises a plurality of processing stations and operating the converter may comprise translating the glass tubes through each of the plurality of processing stations in succession. The method may further include providing target values for at least one attribute of the plurality of glass articles or the plurality of glass tubes during or after converting, measuring the at least one attribute of the plurality of glass articles or the plurality of glass tubes during or after converting, recording settings of at least one process parameter of the converter related to the at least one attribute to produce a data set comprising measured values of the at least one attribute and the settings of the at least one process parameter of the converter, processing the data set to produce a statistical property of a distribution of the measured values of the at least one attribute, and determining an updated setting for each of the at least one process parameter from the statistical property of the distribution of the at least one attribute measured, the target values of the at least one attribute, and the settings of the at least one process parameter. The updated settings of the at least one process parameter may be values of the settings that minimizes an objective control function for the at least one attribute. The method may further include adjusting each of the at least one process parameter of the converter to the updated setting.

A second aspect of the present disclosure may include the first aspect, further comprising repeating the measuring the at least one attribute, the recording the setting for each of the at least one process parameter, the processing the data set, the determining the updated setting for each of the at least one process parameter, and the adjusting each of the at least one process parameter until the updated setting for each of the at least one process parameter converges.

A third aspect of the present disclosure may include either one of the first or second aspects, wherein processing the data set may comprise removing outlier data points from the data set of the measured values of the at least one attribute and, after removing the outlier data points, calculating the statistical property for the distribution of the measured values of the at least one attributes from the data set.

A fourth aspect of the present disclosure may include the third aspect, wherein the statistical property of the distribution of the data set may be a mean, a median, a range, a standard deviation, a variance, or combinations of these.

A fifth aspect of the present disclosure may include any one of the first through fourth aspects, further comprising providing a specification range for each of the at least one attribute. The specification range of an attribute may comprise a minimum value of the attribute below which the glass article is considered out of specification and a maximum value of the attribute above which the glass article is considered out of specification. The method may further comprise applying an attribute weighting factor to each of the at least one attribute in the objective control function based on a spread in the specification range of each of the at least one attribute.

A sixth aspect of the present disclosure may include the fifth aspect, further comprising determining the attribute weighting factor from the specification range for each of the at least one attribute.

A seventh aspect of the present disclosure may include the sixth aspect, comprising determining the process capability index $C_{pk}$ of each of the at least one attribute from the specification range, and determining the attribute weighting factor for each of the at least one attribute based on the process capability index $C_{pk}$ of the at least one attribute.

An eighth aspect of the present disclosure may include any one of the first through seventh aspects, further comprising developing a penalty factor for each of the at least one process parameter and applying the penalty factor to each of the at least one process parameter in the objective control function, where the penalty operates to reduce the magnitude of changes to process parameters that have greater impact on one or more of the at least one attributes.

A ninth aspect of the present disclosure may include the eighth aspect, further comprising repeating the method of the eighth aspect for a plurality of iterations, identifying divergence or oscillation of the updated setting for one or more of the at least one process parameter indicating a reduced ability to control one or more aspects of the converter, and adjusting the penalty factor for one or more of the at least one process parameter. Adjusting the penalty factor may reduce a magnitude of changes made to the one or process parameters in each iteration of the method, thereby tending to reduce divergence or oscillation of the updated setting.

A tenth aspect of the present disclosure may include the ninth aspect, wherein the divergence may be indicated by oscillations in or consistent increases in the objective control function per iteration of the method.

An eleventh aspect of the present disclosure may include any one of the first through tenth aspects, further comprising providing a maximum setting and a minimum setting of each of the at least one process parameter and maintaining the updated setting for each of the at least one process parameter in a range between the minimum setting and the maximum setting for the process parameter.

A twelfth aspect of the present disclosure may include any one of the first through eleventh aspects, wherein the objective control function may comprise a mean square error cost function according to the following equation:

$$J(k)=(G^*\text{Act}(k)+\text{Attrib}_{measured}(k)-G^*\text{Act}(k-1)-\text{Attrib}_{targ})^T Q^T Q(G^*\text{Act}(k)+\text{Attrib}_{measured}(k)-(G^*\text{Act}(k-1))-\text{Attrib}_{targ})+(\text{Act}(k)-\text{Act}(k-1))^T R^T R(\text{Act}(k)-\text{Act}(k-1));$$

where: $J(k)$ is the mean square error cost function as a function of k, k is an integer indicative of a present iteration of minimizing the mean square error cost function, G is a matrix of sensitivity factors representative of a degree to which a change in each of the at least one process parameter produces a change each of the at least one attribute, $\text{Attrib}_{measured}(k)$ is a vector of the statistical property of the distribution of the measured values of the at least one attribute during iteration k, $\text{Act}(k)$ is a setting of the process parameter at iteration k, $\text{Act}(k-1)$ is a setting of the process parameter iteration k−1, $\text{Attrib}_{targ}$ is a vector of the target values for each of the at least one attribute, $Q^T Q$ is a symmetric weighting matrix of attribute weighting factors for errors in measured values of the attributes from target values of the attributes, and $R^T R$ is a symmetric weighting matrix of penalty factors on the change in the at least one process parameter.

A thirteenth aspect of the present disclosure may include the twelfth aspect, further comprising developing the objective control function.

A fourteenth aspect of the present disclosure may include the thirteenth aspect, wherein developing the objective control function may comprises developing at least one model relating a predicted value of the at least one attribute for each setting of the at least one process parameter. The at least one model may comprise an expression in which the predicted value of the at least one attribute may be a sum of at least one term dependent on the setting of the at least one process parameter and an offset constant. Developing the objective control function may further comprise providing an initial mean square error cost function that is a function of the predicted values for each of the at least one attribute, the target values for each of the at least one attribute, and the settings for each of the at least one process parameter; substituting the at least one model into the initial mean square error cost function for the predicted value of the at least one attribute; and solving the at least one model for the offset constant to produce an offset constant function. Solving the at least one model for the offset constant may comprise substituting the statistical property of the measured value for each of the at least one attribute for the predicted value of each of the at least one attribute. Developing the objective control function may further comprise substituting the offset constant function for the offset constant in the initial mean square error cost function to produce the objective control function.

A fifteenth aspect of the present disclosure may include the fourteenth aspect, wherein developing the at least one model may comprise conducting a Design of Experiments process, deriving the at least one model from first principles, or combinations of these to produce the at least one model.

A sixteenth aspect of the present disclosure may include either one of the fourteenth or fifteenth aspects, further comprising re-developing the at least one model periodically to account for process changes over time or in response to a known change in operation of the converter.

A seventeenth aspect of the present disclosure may include any one of the fourteenth through sixteenth aspects, further comprising applying an attribute weighting factor for each of the at least one attribute to one or more terms of the objective control function.

An eighteenth aspect of the present disclosure may include any one of the fourteenth through seventeenth aspects, further comprising applying a penalty factor for each of the at least one process parameter to one or more terms of the objective control function.

A nineteenth aspect of the present disclosure may include any one of the first through eighteenth aspects, wherein determining an updated setting for each of the at least one process parameter may further comprise subjecting the at least one process parameter to constraints comprising a maximum value and a minimum value of the at least one process parameter.

A twentieth aspect of the present disclosure may include any one of the first through nineteenth aspects, comprising providing target values for a plurality of attributes of the plurality of glass articles, the plurality of glass tubes, or both; measuring the plurality of attributes of the plurality of glass articles, the plurality of glass tubes, or both for a plurality of glass articles; and recording settings of a plurality of process parameters of the converter related to the plurality of attributes to produce a plurality of data sets. Each of the plurality of data sets may comprise measured values for each of the plurality of attributes and the settings for each of the plurality of process parameters of the converter over the time period. The method may further comprise processing each of the plurality of data sets to produce a statistical property of a distribution for each of the plurality of attributes; determining an updated setting for each of the plurality of process parameters from the statistical property of the distribution of each of the plurality of attributes, the target values for each of the plurality of attributes, and the settings of each of the plurality of process parameters; and adjusting each of the plurality of process parameters of the converter to the updated setting for each of the plurality of process parameters. The updated settings for the plurality process parameters may be values of the updated settings that minimize the objective control function; and A twenty-first aspect of the present disclosure may include any one of the first through twentieth aspects, further comprising displaying a user interface on a display.

A twenty-second aspect of the present disclosure may include the twenty-first aspect, further comprising receiving one or more user inputs from the user interface and changing the updated setting of the at least one process parameter based on the one or more user inputs.

A twenty-third aspect of the present disclosure may include any one of the first through twenty-second aspects, wherein the at least one attribute may comprise one or more attributes of the glass article after converting, one or more attributes of one or more features of a partially formed glass article at the working end of the glass tube, one or more attributes of the glass tube, one or more attributes of a preform at the working end of the glass tube, or combinations of these.

A twenty-fourth aspect of the present disclosure may may be directed to a system for producing a plurality of glass articles from a plurality of glass tubes. The system may comprise a converter comprising: a plurality of holders, each of which is operable to hold a glass tube and rotate the glass tube about a center axis of the glass tube; a plurality of processing stations comprising at least one heating station, at least one forming station, and at least one separating station; and at least one measurement device operable to measure one or more attributes of each of the glass articles produced from the glass tubes, each of the glass tubes, or both. The converter may be operable to translate the glass tubes through each of the plurality of processing stations in succession to produce the plurality of glass articles. The system may further comprise a control system communicatively coupled to the converter, the control system comprising one or more processors, one or more memory modules communicatively coupled to the one or more processors, and machine readable and executable instructions stored on the one or more memory modules. The machine readable and executable instructions, when executed by the one or more processors, can cause the control system to automatically measure at least one attribute of the glass articles, the glass tubes, or both with the at least one measurement device; record settings of at least one process parameter of the converter related to the at least one attribute to produce a data set comprising measured values of the at least one attribute and the settings for each of the at least one process parameter of the converter; process the data set to produce a statistical property of a distribution of the measured values of the at least one attribute; determine an updated setting of the at least one process parameter from the statistical property of the distribution of the measured values of the at least one attribute, the target values of the at least one attribute, and the settings for each of the at least one process parameter; and adjusting the at least one process parameter of the converter to the updated setting. The updated setting for each of the at least one process parameter may be a value of the setting that minimizes an objective control function for the at least one attribute.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
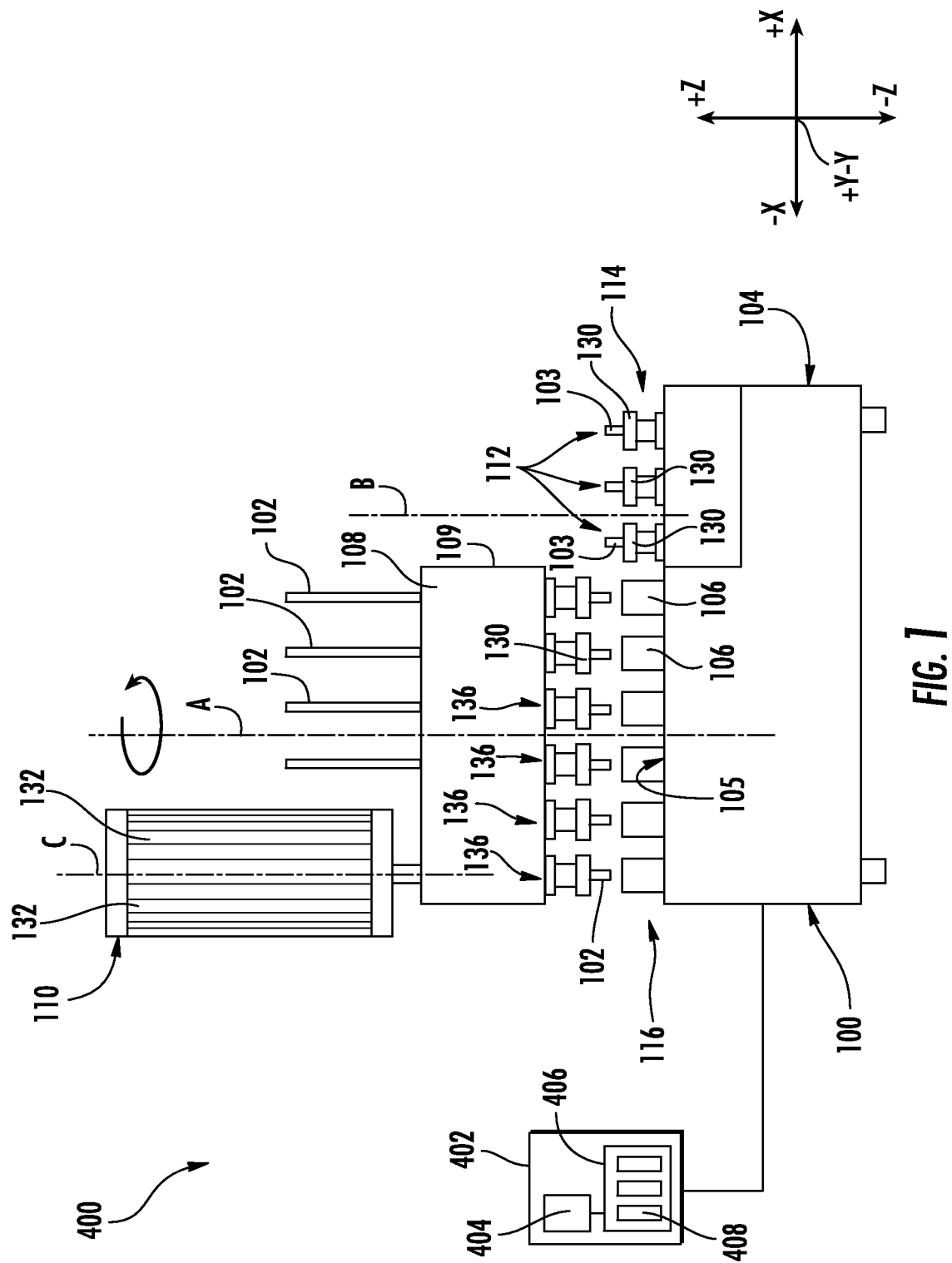
FIG. 1 schematically depicts a front view of an embodiment of system comprising a converter for producing glass articles from glass tubes, according to one or more embodiments shown and described herein.

Reference will now be made in detail to embodiments of systems and methods of the present disclosure for controlling operation of a glass tube converting process for producing glass articles, examples of which are illustrated in the accompanying drawings. Whenever possible, the same reference numerals will be used throughout the drawings to refer to the same or like parts. The methods disclosed herein for controlling a converter for converting glass tubes to glass articles can include operating a converter to produce a plurality of glass articles from a plurality of glass tubes, where the converter comprises a plurality of processing stations and operating the converter comprises translating the glass tubes through each of the plurality of processing stations in succession. The method can further include providing target values for at least one attribute of the plurality of glass articles or the plurality of glass tubes during or after converting, measuring the at least one attribute of the plurality of glass articles or the plurality of glass tubes during or after converting, and recording settings of at least one process parameter of the converter related to the at least one attribute to produce a data set comprising measured values of the at least one attribute and the settings of the at least one process parameter of the converter. The method can further include processing the data set to produce a statistical property of a distribution of the measured values of the at least one attribute and determining an updated setting for each of the at least one process parameter from the statistical property of the distribution of the at least one attribute measured, the target values of the at least one attribute, and the settings of the at least one process parameter. The updated settings of the at least one process parameter may be values of the settings that minimize an objective control function for the at least one attribute. In embodiments, the objective control function can be derived from a cost function, such as but not limited to a mean square error cost function, for the converter. The method can further include adjusting each of the at least one process parameter of the converter to the updated setting.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tube is the end of the glass tube oriented towards the processing stations of the main turret of the converter relative to the holder, and the "non-working end" of the glass tube is the end of the glass tube oriented away from the processing stations of the main turret.

As used herein, a "dwell time" of the converter refers to the duration of time that the glass tube spends in a particular processing station before passing to the next subsequent processing station.

As used herein, the term "active time" refers to a duration of time that the glass tube is maintained in engagement with at least one heating element or at least one forming tool while in a particular processing station.

As used herein, the term "index time," when used in relation to an index converter, refers to a duration of time that it takes to index the glass tube from one processing station to the next processing station. The "dwell time," "active time," and "index time" are all measured in units of time.

When used in relation to a heating station, "engagement" of a burner with the glass tube refers to placing the burner in a position in which the flame from the burner extends towards the glass tube or contacts the glass tube to heat the glass tube. Conversely, when the burner is out of engagement with the glass tube, the burner is placed in a position in which the flame from the burner is directed away from the glass tube or moved far enough away from the glass tube so that the flame does not contact or directly heat the glass tube.

When used in relation to forming tools in a forming station, the term "engagement" refers to the forming tools contacting the glass tube. When a forming tool is out of engagement with the glass tube, the forming tool does not contact the glass tube.

As used herein, the term "part rate" refers to the production rate or throughput rate of the converter in units of number of glass articles per unit time.

As used herein, the term "circumference" of the glass tube refers to a collection of points of the glass tube at constant radius r from the center axis D of the glass tube at a particular Z position (i.e., position on the +/−Z axis of the figures) through 360 degrees. A circumference of the glass tube may coincide with an outer surface of the glass tube at a particular Z position or an inner surface of the glass tube at a specific Z position, for example.

As used herein, the term "run" refers to the normal steady state operation of the converter. Thus, as used herein, a "run setting" refers to a setting of the converter for normal steady state operation of the converter.

As used herein, the terms "upstream" and "downstream" refer to the positioning of processing stations of the converter relative to each other. A first processing station is considered "downstream" of a second processing station if the glass tube encounters the second processing station before encountering the first processing station. Likewise, the first processing station is considered "upstream" of the second processing station if the glass tube encounters the first processing station before encountering the second processing station.

Glass tubing may be converted into glass articles, in particular glass articles for use in pharmaceutical applications, which may include, without limitation, vials, syringes, ampoules, cartridges and other glass articles. The glass tubing may be converted into these glass articles using a converter (i.e., a converting machine) comprising a plurality of processing stations. The processing stations can include heating stations, forming stations, thermal separating stations, and piercing stations, among other types of processing stations. The converting machines typically reform long glass tube lengths into a plurality of glass articles using steps that include, but are not limited to, flame working, rotating and stationary tool forming, separation (e.g., thermal separation or score and shock cut-off steps), piercing, cooling, measuring, or other processing steps. Thus, glass articles produced through a converting process conducted on a converting machine are subjected to a series of flame burners or other heating elements and forming tools to shape the glass tube to specific shapes and dimensions and separate a formed glass article from the glass tube.

Referring now to FIG. 1, one embodiment of the converter 100 for producing glass articles from a glass tube 102 is schematically depicted. The converter 100 may be used to convert glass tubes 102 into a plurality of glass articles. The converter 100 may include a base 104 having a plurality of processing stations 106 and a main turret 108 positioned above the base 104 and rotatable relative to the base 104 about the central axis A. The converter 100 may further include a glass tube loading turret 110 positioned above the main turret 108 for feeding glass tubes 102 to the main turret 108. The converter 100 may also include a plurality of secondary processing stations 112 on the base 104 and a secondary turret 114, which may be rotatable relative to the base 104.

As schematically depicted in FIG. 1, the base 104 of the converter 100 may be stationary and the processing stations 106 may be coupled to an upper portion 105 of the base 104. The plurality of processing stations 106 may be spaced apart from one another and arranged in a main circuit 116. In embodiments, the main circuit 116 may be circular so that the main turret 108 may index or continuously move a glass tube 102 through the plurality of processing stations 106 by rotation of the main turret 108 about the central axis A. Alternatively, in other embodiments, the main circuit 116 may be linear arrangement of the processing stations 106. Although described herein in reference to a circular-shaped layout of processing stations 106, it is understood that the subject matter disclosed herein may apply equally well to converters having other arrangements of the processing stations 106, such as linear, curvilinear, or irregular-shaped arrangements of processing stations 106.

The type and/or shape of the glass articles to be made from the glass tube 102 may influence the total number of processing stations 106 of the converter 100. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, discharge stations, other processing stations, or combinations of these for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 may include a plurality of holders 130 configured to removably secure each glass tube 102 to the main turret 108. The holders 130 may be clamps, chucks, or other holding devices, or combinations of holding devices.

The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle such that the glass tube 102 is non-vertical during processing. Each of the holders 130 may extend from a bottom portion 109 of the main turret 108 in a direction towards the base 104 (i.e., in the –Z direction relative to the coordinate axis in FIG. 1). Each holder 130 may be oriented to position the glass tube 102 in or proximate to each of the successive processing stations 106 of the main circuit 116 of the base 104 as the main turret 108 is indexed about the central axis A. Vertical orientation of the glass tubes 102 allows the working end 150 of each glass tube 102 to be moved or indexed progressively through the processing stations 106.

In embodiments, the converter 100 may be operable to index each of the plurality of holders 130 progressively through the plurality of processing stations 106. Indexing may refer to the stepwise process of moving the glass tube 102 into a processing station 106, maintaining the glass tube 102 at a stationary position XYZ position in the processing station 106 for a dwell time, and then indexing the glass tube 102 to the next processing station 106. Alternatively, in embodiments, the converter 100 may be operable to translate the plurality of holders 130 continuously through the converting process. In embodiments, the processing stations 106 may translate with the glass tube 102 during the active time of the glass tube 102 in the processing station.

Each holder 130 may be individually rotatable relative to the main turret 108 to rotate the glass tube 102 about center axis D of the glass tube 102, which can be parallel to the central axis A of the main turret 108. Each of the holders 130 may be operatively coupled to a motor (not shown), continuous drive belt, or other drive mechanism for rotation of each of the holders 130 about center axis D of the glass tube 102 relative to the main turret 108. Rotation of the holders 130 allows for rotation of the glass tube 102 about center axis D of the glass tube 102 relative to stationary burners, forming tools, cooling nozzles, or other features of the processing stations 106. The heating element or forming tools in the processing stations 106 may be maintained in a fixed position relative to the glass tube 102, and the rotation of the glass tube 102 about center axis D may enable exposure of the entire circumference of the glass tube 102 to the heating elements or forming tools.

Figure 2:
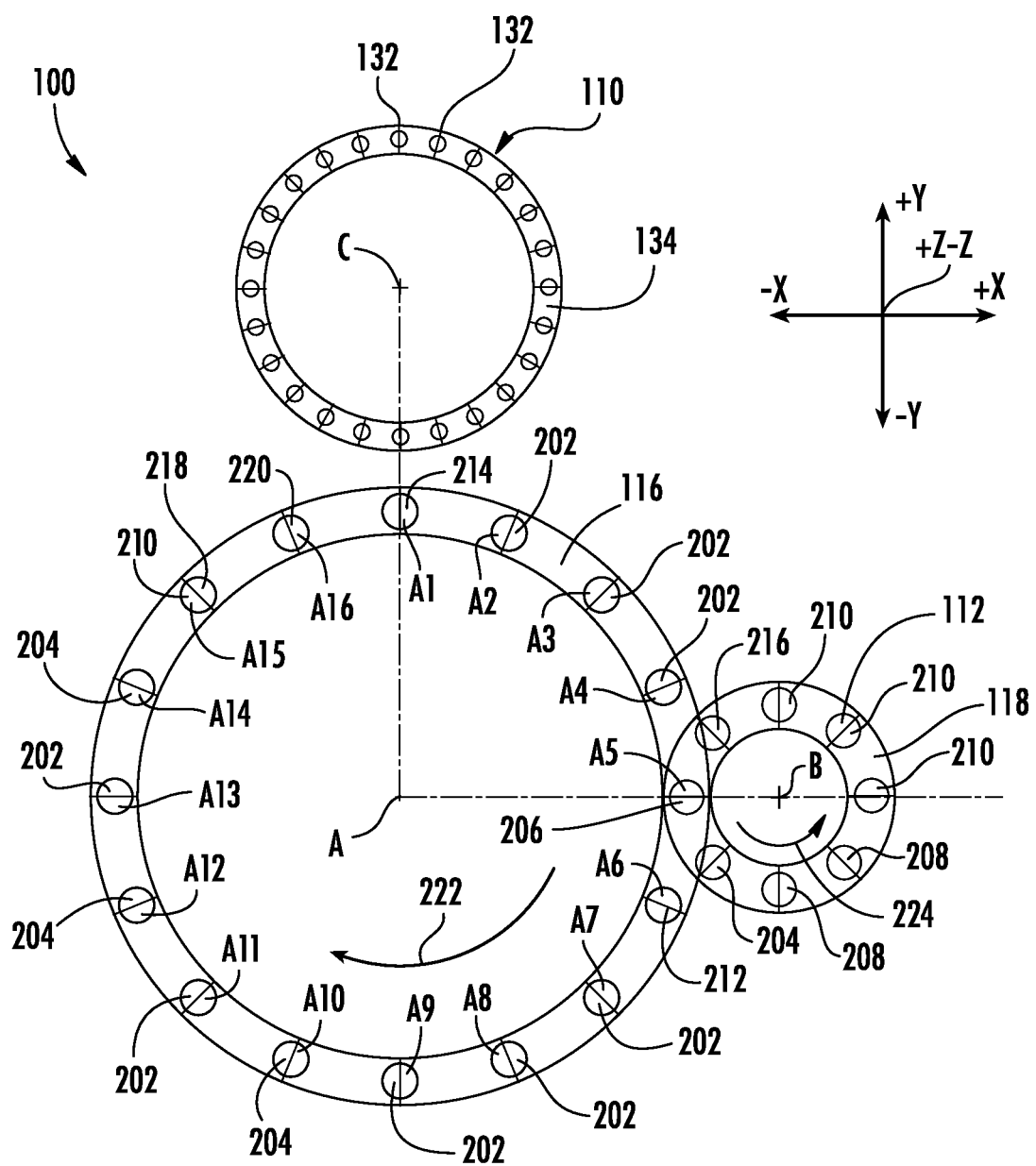
FIG. 2 schematically depicts a top view of a main turret, a secondary turret, and a feed turret of the converter of FIG. 1, according to one or more embodiments shown and described herein.

Referring to FIGS. 1 and 2, the converter 100 may include a plurality of secondary processing stations 112, which may also be spaced apart and arranged in a secondary circuit 118 (FIG. 2). The converter 100 may include a secondary turret 114 (FIG. 1) for indexing or continuously moving an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 may also include a plurality of holders 130 to hold the glass articles 103 and position the glass articles 103 to engage with each of the secondary processing stations 112 in succession. The secondary turret 114 may receive the glass articles 103 from a separating station 206 (FIG. 2) of the main turret 108, index or continuously move the articles 103 through the plurality of secondary processing stations 112 through rotation of the secondary turret 114, and discharge the finished articles from the converter 100. Although shown in a circular pattern, it is understood that the secondary processing stations 112 may be arranged in a linear, curvilinear, or irregular arrangement. The secondary processing stations 112 may be referred to as a bottom forming machine. For vials, the secondary processing stations 112 may be operable to form bottom of the vial.

The converter 100 can include an apparatus for loading new lengths of glass tube 102 into the holders 130. In embodiments, the converter 100 can include a glass tube loading turret 110 positioned adjacent to the main turret 108 in a position from which the glass tube loading turret 110 is capable of loading a new length of glass tube 102 into the holders 130 of the main turret 108 in at least one processing station 106. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. In embodiments, the processing station 106 aligned with the glass tube loading turret 110 may be a tube loading station 214 (FIG. 2). When the converter 100 has converted all or most of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 (FIG. 2). Alternatively or additionally, in embodiments, the converter 100 may include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring now to FIG. 2, as previously described, the plurality of processing stations 106 of the converter 100 may include one or more heating stations 202, forming stations 204, separating stations 206, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As previously described, the processing stations 106 of the main circuit 116 may be evenly spaced apart and evenly distributed about a circular circuit, and the secondary processing stations 112 of the secondary circuit 118 may also be evenly spaced apart and evenly distributed about a circular circuit. FIG. 2 also schematically depicts the glass tube loading turret 110 having a plurality of loading channels 132.

The main circuit 116 of the converter schematically depicted in FIG. 2 may include one or more heating stations 202, a separating station 206, a piercing station 212, one or more forming stations 204, one or more cooling stations 210, a measuring station 218, a tube length drop station 220, and a tube loading station 214. Although FIG. 2 depicts the main circuit 116 as having a circular arrangement of the processing stations 106, as previously discussed, the main circuit 116 may have the processing stations 106 positioned in other non-circular-shaped arrangements, such as linear, curvilinear, irregular-shaped, or other arrangements. With respect to the direction of indexing 222 of the main turret 108, the heating stations 202 may be positioned before each of the forming stations 204 and the separating stations 206 to preheat target regions of the glass tube 102 to a viscosity at which the glass becomes deformable and may effectively be shaped or stretched and separated. At the separating station 206, the formed glass article 103 (FIG. 1) may be separated from the glass tube 102 (FIG. 1) as its bottom is concurrently formed. The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus 350 (FIG. 8) of the glass tube 102 previously formed in the separating station 206 is pierced, thereby reopening the working end 150 of the glass tube 102.

Referring again to FIG. 2, the forming stations 204 of the main turret 108 may be positioned downstream of the piercing station 212 and one or more heating stations 202 in the direction of indexing 222. The one or more forming stations 204 may iteratively shape the glass tube 102 to form one or more features of the finished glass article. As noted above, one or more heating stations 202 may be positioned before each of the forming stations 204 to preheat target regions of the glass tube 102 to a temperature at which the glass tube 102 may be shaped and formed into the desired features. The forming stations 204 of the main turret 108 may shape the working end 150 (FIG. 3A) of the glass tube 102 to form features at one end of the glass articles 103, and the forming stations 204 of the secondary turret 114 may shape the other end of the glass articles 103 after the glass article 103 has been separated from the glass tube 102. In embodiments, the converter 100 may be used to produce vials from the glass tubes 102, and the forming stations 204 of the converter 100 may include one or more shoulder forming stations, flange forming stations, flange finishing stations, or combinations of these with one or more heating stations 202 positioned before and between each of the forming stations 204.

The main circuit 116 may further include a measuring station 218, at which at least one measurement device may be used to measure one or more attributes of the glass tube 102, such as the diameter and thickness for example, or one or more dimensions of the features of the glass article 103 formed by the forming stations 204. Feature dimensions may include, but are not limited to, flange thickness, flange length, neck length, neck thickness, overall article length, flange inner diameter, flange outer diameter, flange height, top height, bottom flange angle, top flange angle, eccentricity, article inside or outside diameter, shoulder thickness, shoulder angle, shoulder radius, other feature dimension, or combinations thereof. One or more cosmetic attributes of the glass tube 102 or glass article 103 may also be assessed in the measuring station 218. Cosmetic attributes may include, but are not limited to defects in one or more features (e.g., defects in the flange, neck, etc.) of the glass article 103, overall desirability, or combinations of these. Overall desirability may be a composite property based on a plurality of other dimension or cosmetic attributes measured for the glass article 103. In embodiments, the measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article 103 at a lower temperature. In embodiments, the secondary circuit 118 of the converter 100 may include a measuring station 218.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for separating the glass article 103 from the glass tube 102 at the separating station 206. The main circuit 116 may also include a tube loading station 214 for loading a new length of glass tube 102 feedstock from the glass tube loading turret 110 to the main turret 108 (FIG. 1). In embodiments, the tube loading station 214 may be incorporated into a cooling station 210. The tube loading station 214 may be positioned between the last forming station 204 and the separating station 206.

Figure 4:
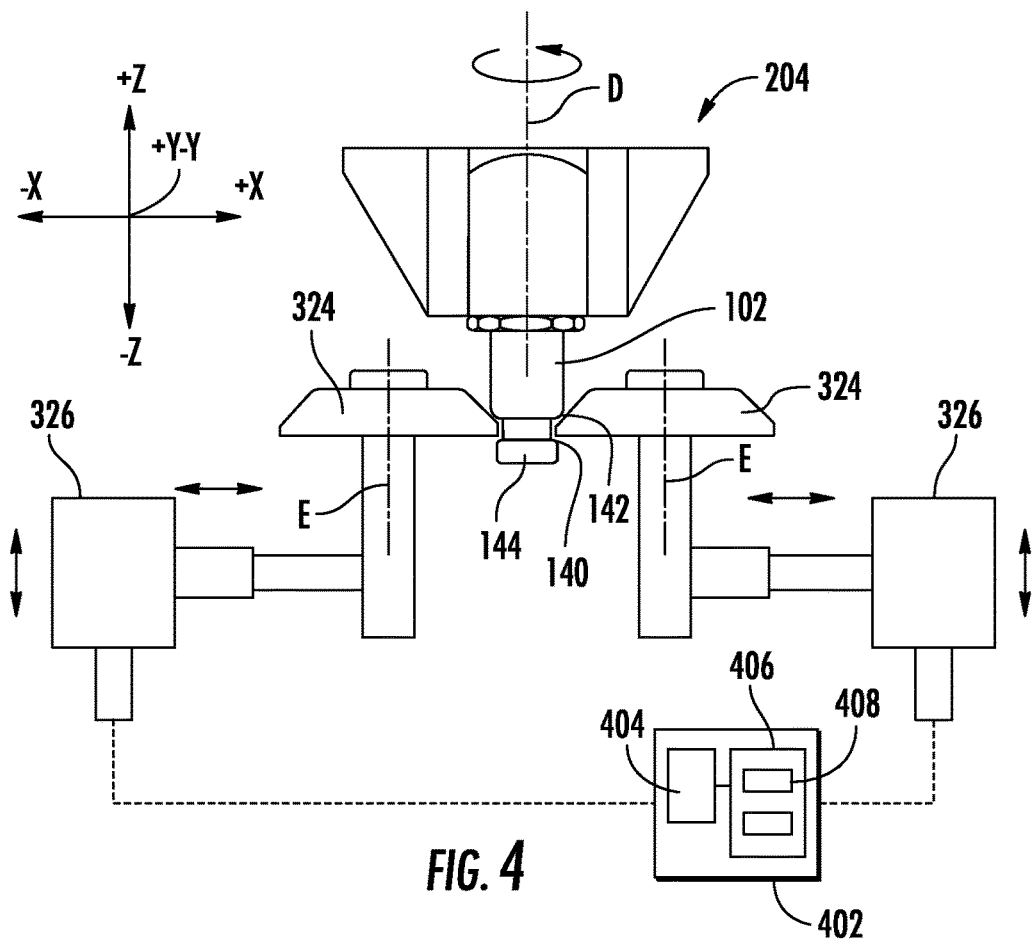
FIG. 4 schematically depicts one embodiment of a forming station of the converter of FIG. 1, according to one or more embodiments shown and described herein.

The forming stations 204 of the main turret 108 can form features at a first end of the glass article 103. For example, the forming stations 204 may form the shoulder 142 and flange 144 at the top (first end) of a glass article 103 that is a vial or cartridge, as shown in FIG. 4. Referring again to FIG. 2, once the glass article 103 is separated from the glass tube 102 at the separating station 206, the glass article 103 may be transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103. The secondary turret 114 may rotate about the axis B in a direction 224 that is opposite from the the main turret 108. In embodiments, the secondary turret 114 may rotate in a direction that is the same as the main turret 108.

The secondary processing stations of the secondary circuit may include one or more heating stations 202, forming stations 204, polishing stations 208, cooling stations 210, discharge stations 216, or other stations or combinations of secondary processing stations 112. Although FIG. 2 depicts the secondary circuit as having a circular arrangement of the secondary processing stations 112, as previously discussed, the secondary circuit may have the secondary processing stations 112 positioned in other non-circular arrangements, such as linear, curvilinear, irregular-shaped, or other arrangements. In embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or features or other glass articles, such as cartridges, syringes, ampoules, or other pharmaceutical glass articles. Additionally, it is understood that the processing stations 106 and secondary processing stations 112 may be arranged in any of a number of different orders and/or configurations in order to produce differently shaped glass articles.

Figure 3:
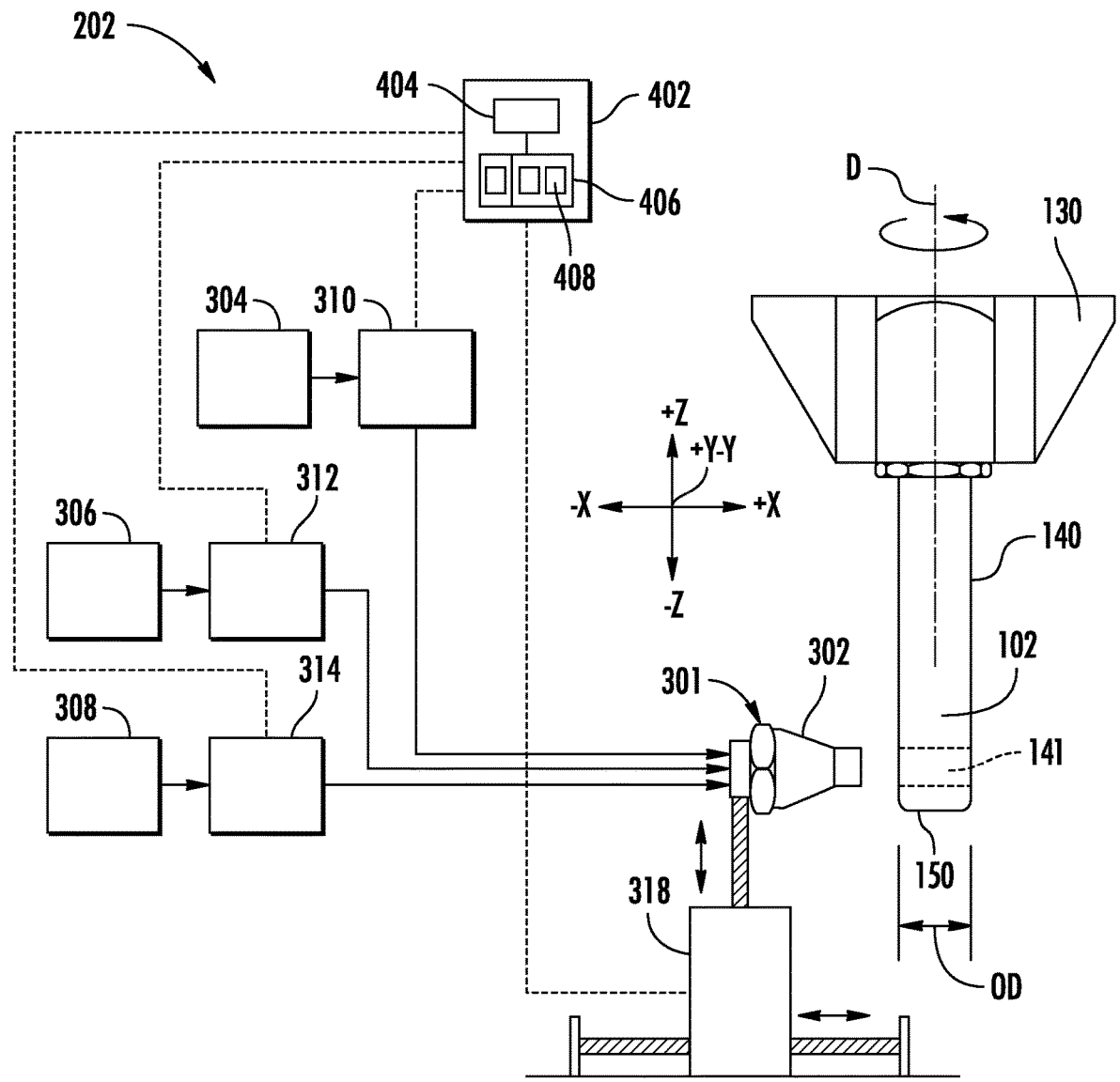
FIG. 3 schematically depicts a heating station of the converter of FIG. 1, according to one or more embodiments shown and described herein.

Referring now to FIG. 3, a heating station 202 of the converter 100 is schematically depicted. Each of the heating stations 202 may include one or more heating elements 301. As illustrated in FIG. 3, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3 depicts a single burner 302, it is understood that a plurality of burners 302 may be employed in a single heating station 202. Each burner 302 may be fluidly coupled to a fuel gas supply 304, an oxygen supply 306, and, optionally, an air supply 308. Examples of fuel gases for the burner 302 may include, but are not limited to hydrogen, hydrocarbon fuel gases such as methane, propane, and butane for example, other fuel gases, or combinations of these.

Each burner 302 may include a fuel control valve 310 to control the flow rate of fuel gas to the burner 302. Each burner 302 may also include an oxygen control valve 312 to control the mass flow rate of oxygen to the burner 302. Each burner 302 may further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners may be used to heat the glass tube 102. Other heating elements may include, but are not limited to, lasers such as $CO_2$ lasers for example, induction heaters, other heating devices, or combinations of these.

The heating station 202 may further include a burner positioner 318 coupled to the burner 302. The burner positioner 318 may be operable to positon the burner 302 vertically (e.g., in the +/−Z direction of the coordinate axis in FIG. 3), horizontally (e.g., in the X-Y plane identified by the coordinate axis in FIG. 3), or a combination of these directions relative to the glass tube 102 in the heating station 202. In embodiments, each burner positioner 318 may include one or a plurality of servo motors operable to automatically and/or incrementally adjust the position of the burner 302 in one or a plurality of directions. Any other type of positioner that is or will become commercially available may be used for the burner positioner 318. The burner positioner 318, fuel control valve 310, oxygen control valve 312, air control valve 314, or combinations of these may be communicatively coupled to the control system 402 to enable the control system 402 to control the vertical position, horizontal position, heat output, or combinations thereof of burners 302.

Figure 5:
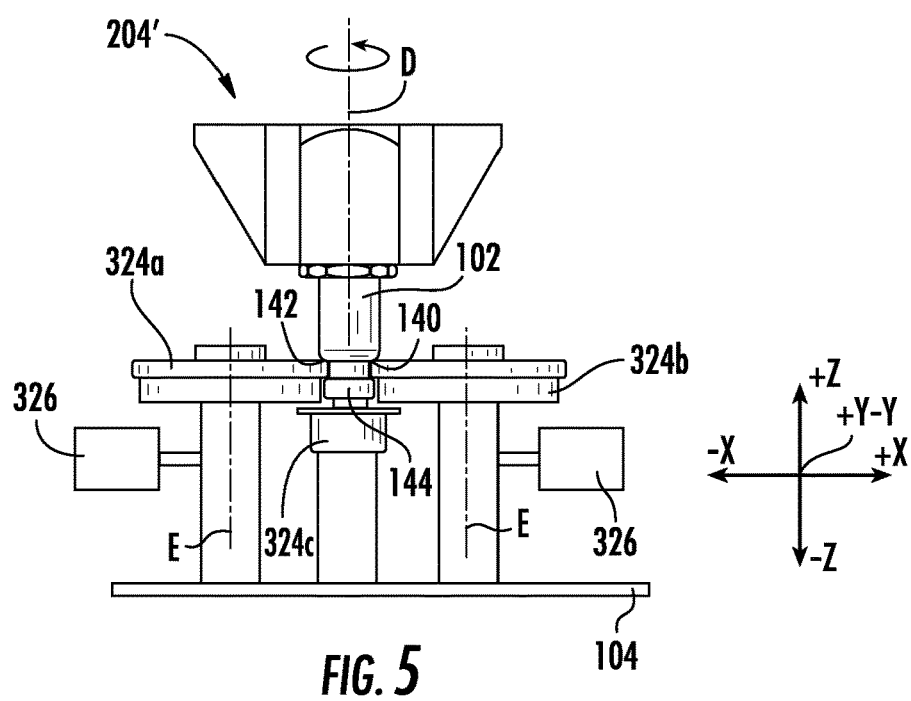
FIG. 5 schematically depicts another embodiment of a forming station of the converter of FIG. 1, according to one or more embodiments shown and described herein.

Referring now to FIGS. 4 and 5, examples of forming stations 204 of the converter 100 are schematically depicted. Each forming station 204 may include one or more forming tools 324 rotatable relative to the base 104 (FIG. 1) about tooling axis E. When passed into the forming station 204, the glass tube 102, which has been heated in a prior heating station 202, is rotated by the holder 130. The forming tools 324 may engage with the glass tube 102 as it rotates. When engaged, contact of the forming tools 324 with the heated glass tube 102 may form the glass tube 102 into the desired shape. The forming tools 324 may be contacted with the glass tube 102 for an active time of the forming tools 324. Upon expiration of the active time, the forming tool actuators 326 may withdraw the forming tools 324 from engagement with the glass tube 102. FIG. 4 schematically illustrates an embodiment of a forming station 204 for forming the shoulder 142 of a glass vial. FIG. 5 schematically depicts an exemplary embodiment of a forming station 204' for forming the flange 144 of a glass vial. The forming station 204' for forming the flange 144 comprises three forming tools 324a, 324b, and 324c. Other types of forming tools 324 may be employed in the forming station 204 depending on the desired features of the glass article 103.

Referring again to FIG. 4, the forming tool actuators 326 may be operable to move the forming tools 324 into and out of engagement with the glass tube 102. Moving the forming tools 324 into and out of engagement with the glass tube 102 may control the contact timing of the forming tools 324 with the glass tube 102. The contact timing of the forming tools 324 with the glass tube 102 refers to the timing of engaging and disengaging each of the forming tools 324 in a forming station 204 with the glass tube 102. Adjusting the contact timing of the forming tools 324 may adjust the total contact time of each of the forming tools 324 in contact with the glass tube 102. The contact time refers to the duration of time that the forming tools 324 are engaged or in contact with the glass tube 102.

The forming tool actuators 326 may further be operable to change the position of the forming tools 324 vertically (e.g., in the +/−Z direction of the coordinate axis in FIG. 3), horizontally (e.g., in the X-Y plane identified by the coordinate axis in FIG. 4), or a combination of these directions relative to the glass tube 102 in the forming station 204. The forming position of the forming tools 324 refers to the forming tool position when the forming tool 324 is engaged with the glass tube 102. In embodiments, each forming tool actuator 326 may include one or a plurality of servo motors operable to automatically and/or incrementally adjust the positions of the forming tools 324 in one or a plurality of directions of the coordinate axis in FIG. 4. Any other type of positioner that is or will become commercially available may be used as at least a portion of the forming tool actuator 326. The forming tool actuators 326 may be communicatively coupled to the control system 402 to enable the control system 402 to change the vertical position, horizontal position, or both of the forming tools 324 when in the forming position. The vertical and/or horizontal position of the forming tools 324 refers to the position of the forming tools 324 when the forming tools 324 are engaged with the glass tube 102.

Figure 6:
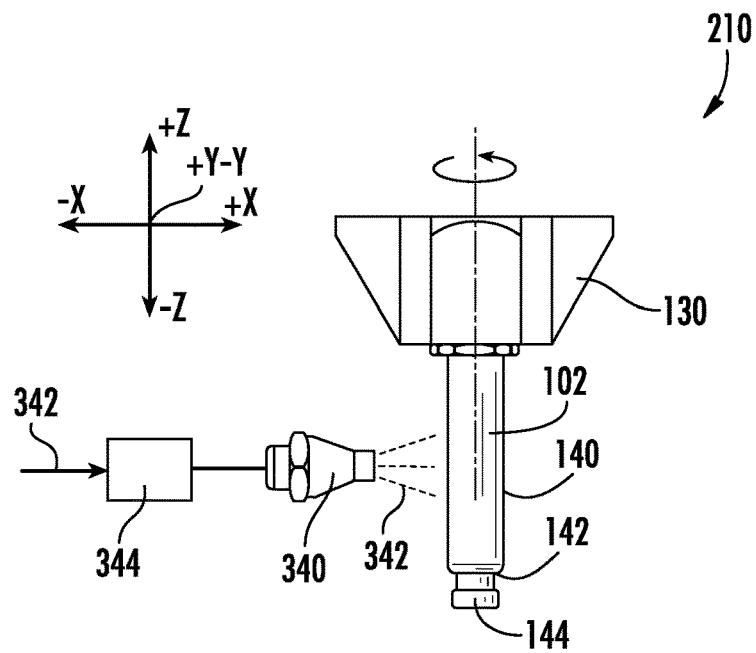
FIG. 6 schematically depicts a cooling station of the converter of FIG. 1, according to one or more embodiments shown and described herein.

Referring now to FIG. 6, a cooling station 210 is schematically depicted. The cooling station 210 may include one or a plurality of cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102. The cooling station 210 may further include a cooling nozzle positioner (not shown) coupled to the cooling nozzle 340 and operable to positon the cooling nozzle 340 relative to the glass tube 102. The cooling nozzle positioner, cooling fluid control valves 344, or both may be communicatively coupled to the control system 402 (FIG. 1) to enable the control system 402 to control the vertical and/or horizontal position of the cooling nozzle 340, the flow rate of cooling fluid 342, or combinations of these.

Figure 7:
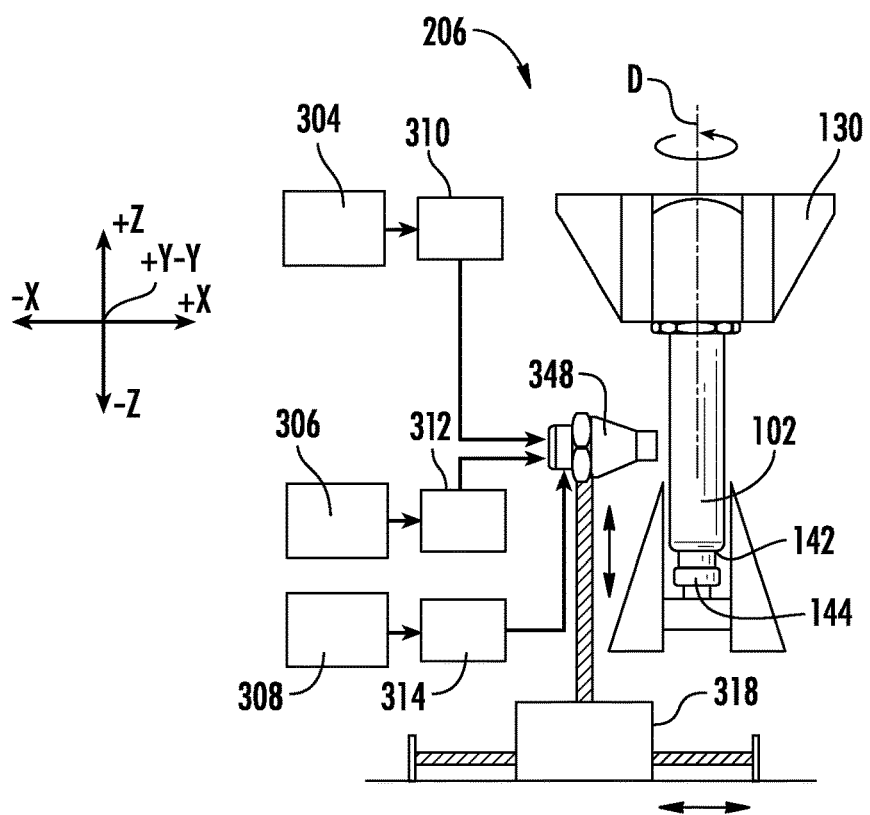
FIG. 7 schematically depicts a separating station of the converter of FIG. 1, according to one or more embodiments shown and described herein.

Referring now to FIG. 7, a separating station 206 of the converter 100 is schematically depicted. The separating station 206 depicted in FIG. 7 is a thermal separation station and may be positioned after one or more heating stations 202 in the direction of indexing 222 of the main turret 108. The heating stations 202 positioned before the separating station 206 may heat the glass tube 102 to make the glass viscous. The separating station 206 may include a separating burner 348. The separating burner 348 may have any of the features previously described for burners 302, including but not limited to a fuel gas control valve 310, an oxygen control valve 312, and/or an air control valve 314. While the glass tube 102, which has been made viscously deformable by the previous heating stations 202, is rotated by the holder 130 about the center axis D of the glass tube 102, the separating burner 348 may be engaged with the outer surface 140 of the glass tube 102 to heat the glass tube 102 to a temperature at which the viscosity of the glass causes the partially formed glass article to separate from the glass tube 102. Once separated from the glass tube 102, the partially formed article may be transferred to the secondary turret 114 (FIG. 1) or discharged from the converter 100. Although shown in FIG. 7 as a thermal separating station, the separating station 206 may also be a non-thermal separating station such as a separating station using score and break techniques, as may be used for syringes and cartridges for example.

Like the heating station 202, the separating station 206 may also include a burner positioner 318 coupled to the separating burner 348. The burner positioner 318 may be operable to positon the separating burner 348 vertically (e.g., in the +/−Z direction of the coordinate axis in FIG. 3), horizontally (e.g., in the X-Y plane identified by the coordinate axis in FIG. 7), or a combination of these directions relative to the glass tube 102 in the separating station 206. The burner positioner 318, fuel control valve 310, oxygen control valve 312, air control valve 314, or combinations of these may be communicatively coupled to the control system 402 (FIG. 3) to enable the control system 402 to control the vertical position, horizontal position, heat output, or combinations of these of the separating burner 348. When the separating station 206 is a score and break separating station, the separating station 206 can include one or more scoring tools and/or breaking tools and may further include tool actuators operable to change the positioning of the scoring tools and/or breaking tools.

Figure 8:
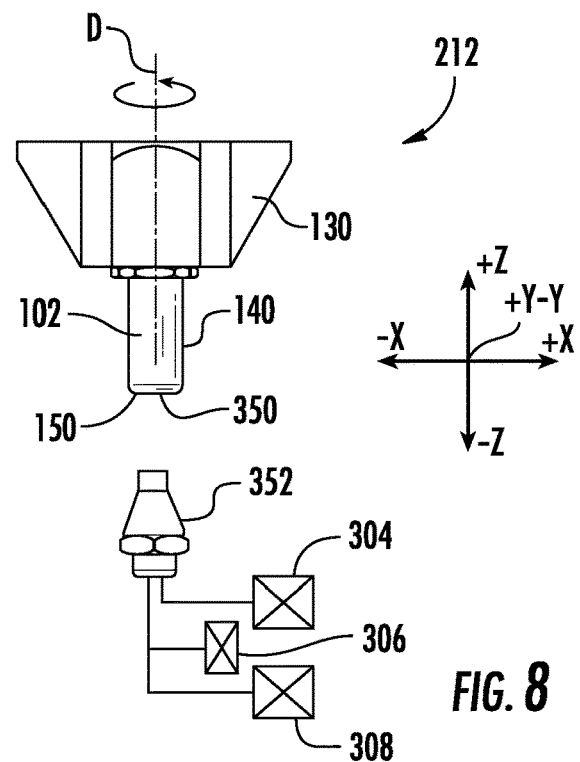
FIG. 8 schematically depicts a piercing station of the converter of FIG. 1, according to one or more embodiments shown and described herein.

Referring now to FIG. 8, one embodiment of a piercing station 212 of the converter 100 is schematically depicted. The piercing station 212 may be positioned after the separating station 206 in the direction of indexing 222 of the main turret 108. As previously described, thermal separation of the article 103 from the glass tube 102 in the separating station 206 may cause a meniscus 350 of glass to form across the working end 150 of the glass tube 102. In the piercing station, the meniscus 350 is pierced in preparation for forming the next article at the working end 150 of the glass tube 102.

In embodiments, the piercing station 212 may include a piercing burner 352. The piercing burner 352 may be positioned below the working end 150 of the glass tube 102 and may be oriented toward the working end 150 of the glass tube 102. The piercing burner 352 may be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3. The piercing station 212 may also include a fuel gas control valve 310, oxygen control valve 312, and/or air control valve 314 for controlling heat output from the piercing burner 352. When main turret 108 indexes the glass tube 102 into the piercing station 212, the flame from the piercing burner 352 heats the meniscus 350 of glass and melts the meniscus 350 to pierce the meniscus 350 and re-open the working end 150 of the glass tube 102. In embodiments, the meniscus 350 may be pierced by directing a stream of gas, such as compressed air, nitrogen, argon, or other gas, at the meniscus 350 or across the meniscus 350. In embodiments, mechanical means or other methods may be used to pierce the meniscus 350 instead of using a piercing burner 352. Various methods of piercing the meniscus 350 are disclosed in U.S. Pat. No. 10,968,133, entitled "METHODS FOR MINIMIZING SHR IN GLASS ARTICLES BY PRODUCING A GAS FLOW DURING PHARMACEUTICAL PART CONVERTING," granted Apr. 6, 2021; co-pending U.S. application Ser. No. 16/197,187, entitled "SYSTEMS AND METHODS FOR MINIMIZING SHR FROM PIERCING DURING PHARMACEUTICAL PART CONVERTING USING A GAS FLOW," filed Nov. 20, 2018; co-pending U.S. application Ser. No. 16/197,971, entitled "SYSTEMS AND METHODS FOR MINIMIZING SHR FROM PIERCING DURING PHARMACEUTICAL PART CONVERTING USING NEGATIVE PRESSURE EVACUATION," filed Nov. 21, 2018; and co-pending U.S. application Ser. No. 16/198,041, "SYSTEMS AND METHODS FOR MINIMIZING SHR FROM PIERCING FROM PHARMACEUTICAL PART CONVERTING USING PULSED EJECTION," filed Nov. 21, 2018, the entire contents of all of which are incorporated by reference in the present disclosure. Positioners, control valves, and other control devices may be incorporated into the piercing station 212 and communicatively coupled to the control system (FIG. 1) to control various operating parameters of the piercing station 212.

Figure 9:
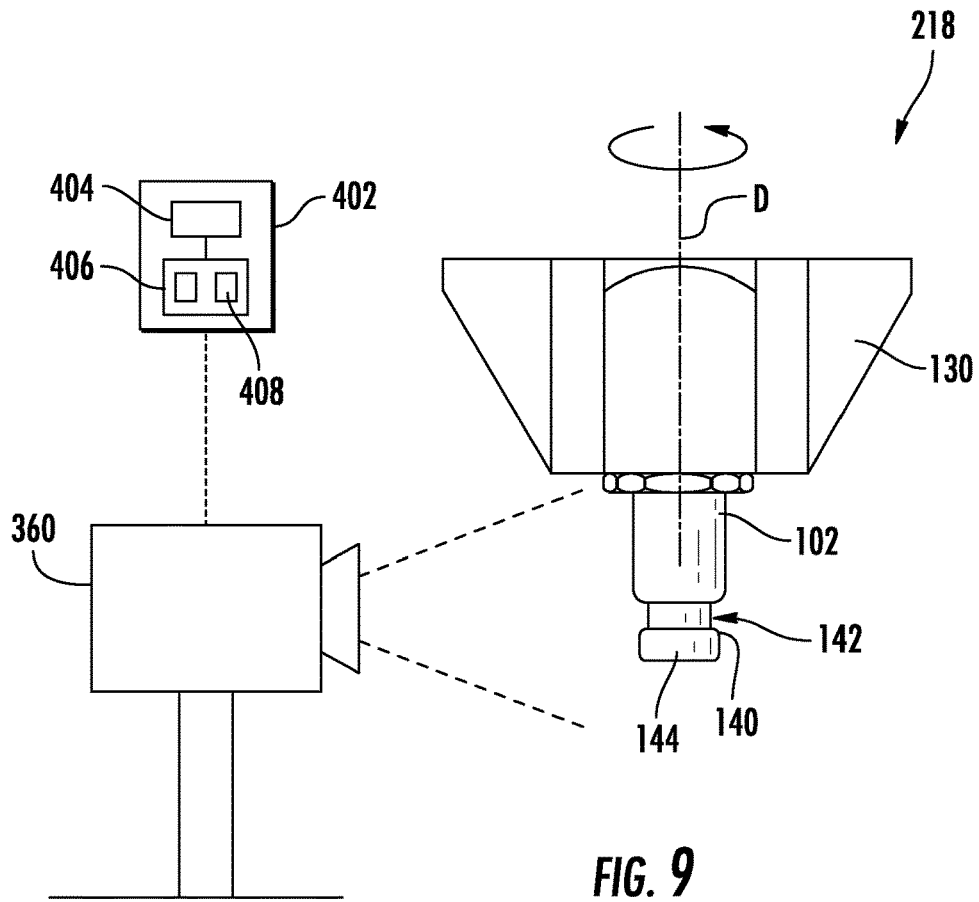
FIG. 9 schematically depicts a measuring station of the converter of FIG. 1, according to one or more embodiments shown and described herein.

Referring now to FIG. 9, a measuring station 218 is schematically depicted. The measuring station 218 may include one or a plurality of measurement devices 360 positioned to measure one or a plurality of attributes of the glass tube 102, and glass article 103, or both. The attributes may include one or more physical dimensions, one or more cosmetic properties, or both of the glass tube 102, the glass article 103, or both. The measurement device 360 in the measuring station 218 may be any of the measurement devices described herein. The measurement devices 360 may be communicatively coupled to the control system 402 to transmit information relating to the one or more attributes of the glass tube 102, glass article 103, or both to the control system 402. In embodiments, the measurement device 360 may be a thermal imaging device. Examples of thermal imaging devices for measuring attributes and properties of the glass tube 102 or the features formed at the working end 150 of the glass tube 102 can be found in U.S. Pat. No. 10,773,989, granted Sep. 15, 2020, the entire contents of which are incorporated by reference herein.

FIGS. 3-9 include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Figure 10:
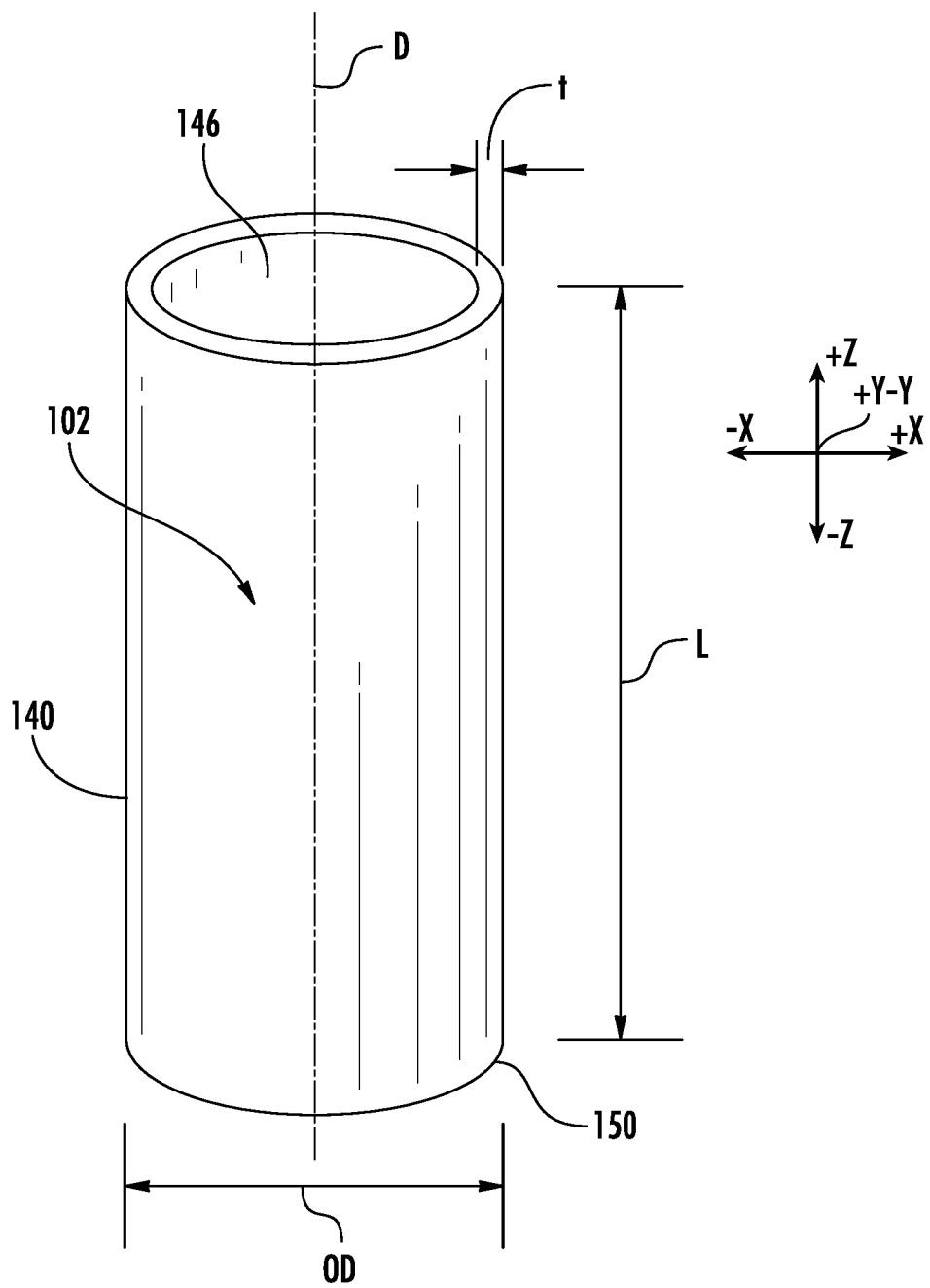
FIG. 10 schematically depicts a perspective view of a section of a glass tube prior to conversion in the converter of FIG. 1, according to one or more embodiments shown and described herein.

Referring now to FIG. 10, the glass tube 102 may be an elongated hollow cylindrical tube made from glass. The glass tube 102 may have a circular cross-sectional shape and may have an outer surface 140, an inner surface 146, and a thickness t. The thickness t of the glass tube 102 may be a radial distance between the inner surface 146 and the outer surface 140 of the glass tube 102. The glass tube 102 may have a length L in the +/−Z direction of the coordinate axis of FIG. 10. The glass tube 102 may have an outside diameter OD as shown in FIG. 10. As previously discussed, the glass tube 102 may be rotated about center axis D of the glass tube 102 throughout the converting process. The working end 150 of the glass tube 102 is the end of the glass tube 102 that is oriented in the −Z direction of the coordinate axis in FIG. 10 when the glass tube 102 is secured in the holder 130 of the converter 100. The non-working end of the glass tube 102 is the end opposite the working end 150 (i.e., the end of the glass tube 102 in the +Z direction of the coordinate axis of FIG. 10.

Referring again to FIGS. 1 and 2, in operation, the main turret 108 may index or move the glass tubes 102, which are secured in the holders 130, into a processing station 106. A specific operation, such as heating, forming, piercing, separating, cooling, dropping, feeding, measuring, etc. may be performed on the glass tubes 102 at each of the processing stations 106. The converter 100 may be tuned so that all of the processing stations 106 complete their operations within the dwell time. At the end of the dwell time, the main turret 108 may index the glass tubes 102 to the next processing stations 106 during an index time. For an indexing converter, the total time per part per station, as used in this disclosure, is the sum of the dwell time and the index time.

In embodiments, the converter 100 may be a continuous converter operable to move the glass tubes 102 and holders 130 continuously through the plurality of processing stations 106. In embodiments, the heating elements, burners, forming tools, measurement devices, and other elements of the converting process may move with the glass tube 102 as it passes through the processing station 106. For both an indexing converter and a continuous converter, an "active time" of the processing station is a duration of time that the glass tube 102 is maintained in engagement with at least one heating element, at least one forming tool, at least one cooling nozzle, or other device while in the processing station 106.

Examples of converters 100 for converting glass tube 102 into glass vials include the Vial Forming Machine Models RP16 or RP18 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into glass cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as other types of pharmaceutical containers or articles, by changing the forming tools 324 and/or the order or configuration of processing stations 106 in the main circuit 116 or secondary processing stations 112 in one or more secondary circuits 118. Pharmaceutical articles may include, but are not limited to vials, cartridges, syringes, ampoules, jars, or other glass pharmaceutical articles.

During operation of the converter 100, the burner output of the burners 302 and positioning of the burners 302 can have a significant impact on the dimensional yield and defect rates of the converter 100. The positions of the forming tools 324 relative to the glass tube 102 can also have a significant impact on the dimensional yield and defect rate of the converter 100. Further, the contact timing of the forming tools 324 in contact with the glass tube 102 can greatly impact dimensional tolerancing and flaws in the glass articles 103 made from the glass tube 102. The total contact time in conventional converting machines has been intrinsically linked to the machine index rate, which further complicates and restricts the process window of the conventional converting machines for producing high yield and high-quality products. Additionally, the converter 100 may have hundreds of other inputs and process settings across all of the processing stations 106 that need to be managed appropriately and consistently to produce high manufacturing yields and high-quality products.

Historically, on conventional converting machines, the burner outputs required to heat the glass tubes 102 to sufficient viscosity for forming have been controlled by simple needle valves fluidly coupled to a manifold of fuel gas, oxygen, and air. In the forming stations of conventional converting machines, the positions of the forming tools, which often include forming pins and forming wheels, have been set by simple mechanical linkages connected to cam driven shafts. Some modern automation technologies have been developed and have become "add on" features for some glass tube converting machines in recent years. In particular, mass flow control valves have been incorporated to replace the manual needle valve to set the gas and oxygen flows to the various burners. Servo motors have replaced the adjustable linkages used to position forming tools in forming stations. More advanced PLC's have allowed for timing and velocity profiles to be applied to each servo driven device significantly advancing control of forming stations compared to the previous cam driven machines. However, the current state of the art is that human operators are still making the decisions on selection and adjustment of process parameters, even though doing so is through interaction with more sophisticated software and technology.

Efficiency in operation of the converter 100 to produce glass articles 103 from glass tubes 102 depends to a significant degree on timely compensation for disturbances in the process that move one or more attributes of the glass articles 103 off target and/or increase the variance of these attributes. Consistently regulating the numerous attributes of the glass articles or glass tubes by managing and adjusting the hundreds of inputs and process parameter settings of the glass tube converter 100 is difficult.

Additionally, normal variation in the converting process or variations in external inputs to the converting process can also require adjustments to the converter. Variability can occur with incoming material or fuel gas, thermal growth of the turret over time, tool wear gradually changing tool dimensions, burners degrading over time, or other factors. This variability manifests itself as shifts or trends in the measured glass attributes over time. Even after nominal set-points are determined, changes in incoming material or incoming fuel gases, equipment wear, changes in ambient environment of the converter, and many other disturbances necessitate that actuator set points themselves be adjusted in real time to compensate the process. The source of the disturbances are often not known and even if known, some are not economically feasible to remove as compared to the development and application of feedback control. From the many actuator set point values possible, most can be fixed with possibly 10 to 20 considered for adjustment with 10 to about 30 attributes of the glass articles or glass tube being of primary consideration. With usually fewer actuator settings than attributes to control and with actuator maximum and minimum limits, some form of optimization or tradeoff may be required. Furthermore, the actuators controlling various burners and forming tools may have complicated interactions and attribute to actuator change sensitivities are often variable and not well known.

For conventional glass tube converting machines, the control strategy for managing all of the process inputs and process settings has been historically to use human operators and to make changes to process parameters of the converter 100 based on human intuition and experience. These human operators of various experience levels have been relied on to change burner parameters, forming unit parameters, and overall machine timing for different geometry glass articles, such as vials, syringes, ampoules, cartridges, etc. Human operators have also been relied on to manage and account for the normal day-to-day variations that occur during the converting process by adjusting these same parameters. Through experience and understanding of basic first principles, some experienced operators have learned to adjust numerous actuator set points in an attempt to maintain attribute values of the glass articles within specification targets. However, the way the operators react to these changing attributes can significantly impact the yield and quality of the glass articles at steady state. The degree by which a producer is able to consistently produce high yields of high-quality glass articles from the converting machines has, therefore, been highly dependent on the skill level and experience of the human operators they use for operating the converting machines. The variation in experience levels between operators, machines, production lines, and shifts can cause significant variability in the yield and quality of the glass articles produced by the converting process.

The task of controlling a glass tube converter 100 is multi-dimensional. The human ability to consider more than about 3 actuators and 3 attributes simultaneously is difficult and often impossible. Also, some flange dimensions have shown to have some degree of heteroskedasticity. So, one has to consider not only attributes means being at or near target but also balancing attribute variance, because ultimately maximization of process capability $C_{pk}$ is desired. Finally, the operator in the loop approach is quite manual and so frequent operator attention is needed to notice if and when the process drift becomes excessive or there has been a step change in performance of the converter 100.

Thus, there is a continued need for systems and methods for controlling operation of converters 100 and converting processes for producing glass articles 103 from glass tubes 102. The systems and methods disclosed herein solve the problems in the existing state of the art by providing automated or semi-automated feedback control based on a model predictive control framework to efficiently control the converter 100 for producing glass articles 103 from glass tubes 102. The feedback control methods disclosed herein can efficiently control a plurality of process parameters of the converter 100 to produce glass articles with attributes within specification ranges during steady state operation of the converter 100.

The model predictive control framework includes developing one or a plurality of operating models for the converter 100, each operating model relating at least one process parameter of the converter 100 to at least one attribute of the glass article 103, glass tube 102 or both. The operating models included within the controller can be determined by Design of Experiments techniques, developed through first principles, or a combination of both methods. The operating models for the converter 100 can be substituted into an objective control function. In embodiments, the objective control function can be a mean square error cost function for the converter 100. Although described herein in the context of a mean square error cost function, it is understood that the objective control function can be based on other types of cost functions, or any other suitable control function. The objective control function can further include attribute weighting factors and penalty factors for process parameter adjustments. Updated settings for the plurality of process parameters of the converter can be determined by solving the objective control function for the values of the process parameters that minimize the objective control function. The solution minimizing the objective control function can further take into consideration maximum and minimum values for each of the process parameters.

The model predictive control framework can be used to provide feedback control of the converter 100. The feedback control methods disclosed herein for controlling operation of the converter 100 can include executing one or several iterations of a control sequence. The control sequence can include providing target values for attributes of the glass articles 103 or glass tubes 102 during or after converting. The feedback control methods can further include operating the converter 100 to produce glass articles 103 from glass tubes 102 by translating the glass tubes 102 through the plurality of processing stations 106 in succession, measuring the attributes of the glass articles or glass tubes for a statistically relevant number of glass tubes, and recording settings of the process parameters of the converter related to the attributes to produce one or more data sets comprising measured values of the attributes and the settings of the process parameters. The data sets can be processed to remove outlier data points and produce a statistical property (e.g., mean, median, spread, standard deviation, variance, etc.) of a distribution of the measured values of the attributes. The methods further include determining updated settings from the objective control function by substituting the statistical properties of the distributions for each of the attributes measured, the target values of the attributes, and the settings of the process parameters into the objective control function and then finding the updated settings that minimize the value of the objective control function. The methods can further include adjusting the process settings to the updated settings determined from minimization of the objective control function. The control sequence can be repeated until the updated settings for the process parameters converge.

Over time, operating conditions for the converter 100 can change, and differences between the operating models and actual performance of the converter 100 can become substantial. The model predictive control framework disclosed herein uses feedback control to compensate for such mismatches between the operating models and the actual converter performance so that operation of the converter produces glass articles that remain within acceptable specification ranges, despite potentially substantial inaccuracies in the initial operating models. Thus, the initial operating models can generally be in error with regards to non-linearities, offsets, and sensitivity errors. The model predictive control framework disclosed herein compensates for process changes over time, such as changes in glass composition, wear of forming tools and burners, changes in the ambient environment of the converter (e.g., temperature, humidity, atmospheric pressure, etc.), or other process changes. The feedback control processes disclosed herein can also reduce dependence on human operators for control of the converter 100 for more consistent and reliable performance. The feedback control methods may also enable adjustments to be made to operation of the converter 100 to account for normal process variability in a consistent and data driven manner rather than through guesswork and models based on human intuition and experience.

It is to be also noted that some unusual behavior of converters 100 can be difficult to capture algorithmically, but can be observed and noted by human operators. The feedback control methods disclosed herein can be adapted to allow for varying degrees of human interaction, which can provide the opportunity to observe these unusual behaviors and account for them in controlling the converting process.

The feedback control methods disclosed herein can be at least partially or fully executed by a control system communicatively coupled to the converter. Referring again to FIG. 1, a system 400 for producing a plurality of glass articles from glass tube 102 can include the converter 100 having the plurality of processing stations 106, such as but not limited to at least one heating station 202, at least one forming station 204, and a separating station 206. As previously discussed, the converter 100 may be operable to move or pass the glass tube 102 through each of the plurality of processing stations 106. The converter 100 may include the plurality of holders 130. Each of the plurality of holders 130 may be operable to secure a glass tube 102 and rotate the glass tube 102 about the center axis D of the glass tube 102. The converter 100 can further include at least one measurement device 360 operable to measure one or more attributes of each of the glass articles 103 produced from the glass tube 102. The converter 100 can further include a control system 402 communicatively coupled to the converter 100 and to the at least one measurement device 360. It is understood and intended that the converter 100 may include any of the features, processing stations, or operating parameters previously described herein for converter 100.

Referring again to FIG. 9, as previously discussed, the system 400 may include one or a plurality of measurement devices 360. The measurement devices 360 may enable 100% online inspection of various dimensions and cosmetic attributes of the glass tube 102, glass articles 103, or both to provide real time feedback to the system 400. The measurement devices 360 may be disposed in one or a plurality of measuring stations 218, which may be in the primary circuit, the secondary circuit, or both. Additionally or alternatively, in embodiments, the converter 100 may include one or a plurality of measurement devices 360 positioned at one or more processing stations 106 that is not a measuring station 218, such as but not limited to a heating station 202, forming station 204, separating station 206, cooling station, piercing station, or other type of processing station. Additionally or alternatively, one or more of the measurement devices 360 may be coupled to one of the plurality of holders 130 and may be translated through a plurality of the processing stations 106 with the holder 130. In embodiments, the converter 100 may include a plurality of measurement devices 360, each of which may be coupled to a processing station 106 and/or coupled to one of the plurality of holders 130 for translation through the plurality of processing stations 106 with the holder 130 and the glass tube 102. Additionally or alternatively, the measurement devices 360 may be disposed downstream of the converter 100, such as at a quality control station downstream from the converter 100.

The measurement devices 360 may be operable to measure one or a plurality of attributes of the glass tube 102, one or a plurality of attributes of features of a partially formed glass article at the working end 150 of the glass tube 102, one or a plurality of attributes of each of the glass articles 103 produced from the glass tubes 102, or a combination of these. The attributes of the plurality of glass tubes 102, glass articles 103, partially formed glass article 103, or combinations of these may comprise one or more temperatures of the glass tube 102, one or more dimensions of the glass tube 102, one or more dimensions of the plurality of glass articles 103 or features of the partially formed glass articles 103 formed at the working end 150 of the glass tube 102, one or more cosmetic attributes of the plurality of glass articles 103, or combinations of these. In embodiments, the measurement device 360 may be positioned and operable to measure one or more attributes of a glass preform at the working end 150 of the glass tubes 102. The glass preform refers to the heated portions of the glass tube 102 at the working end 150 of the glass tube 102 after the heating stations 202 and before the forming stations 204. In other words, the glass preform refers to the working end 150 of the glass tube 102 that is in a suitable condition (e.g., glass viscosity) for forming. Since the glass preform is part of the glass tube 102 during converting, reference to attributes of the glass tube 102 herein is intended to include attributes of the glass preform as well. The attributes of the glass preform may include glass temperature, dimensions of the preform, other attributes of the preform, or combinations of these. Other attributes of the glass tubes 102, glass articles 103, or both maybe measured and are contemplated by the present disclosure.

The one or more measurement devices 360 may include any measurement devices capable of measuring one or more dimensions, temperatures, or cosmetic attributes of the glass tube 102 and/or glass articles 103 made therefrom. Measurement devices 360 may include but are not limited to optical measuring systems, laser measurement devices, measurement devices using sound waves or other electromagnetic waves, or other measurement technology. In embodiments, the measurement devices 360 may include a thermal imaging system, such as the thermal imaging systems disclosed in U.S. Pat. No. 10,773,989, entitled "SYSTEMS AND METHODS FOR MEASURING THE TEMPERATURE OF GLASS DURING TUBE CONVERSION," filed on Mar. 22, 2018, the entire contents of which are incorporated by references herein in their entirety. The thermal imaging systems may be operable to measure one or more temperatures or dimensions of the glass tube 102, glass article 103, or both during or after heating and forming the glass tube 102 into the glass articles 103. Additionally or alternatively, the measurement devices 360 may include one or more dimension measuring systems, such as one or more of a visual imaging system, a laser reflectometer, a laser gauge, an optical micrometer, or other measuring device operable to measure one or more dimensions of the glass tube 102, features of the partially formed glass article, finished glass article 103, or combinations of these. Other available measurement devices 360 for determining one or more temperatures, dimensions, cosmetic attributes, or combinations of these of the glass tube 102, the glass articles 103, or both are contemplated.

Referring again to FIG. 1, the system 400 for producing a plurality of glass articles from glass tube 102 may further include the control system 402 communicatively coupled to the converter 100. In particular, the control system 402 may be communicatively coupled to the measurements devices 360 and the various control devices in the processing stations 106 of the converter 100. Control devices of the converter 100 that may be communicatively coupled to the control system 402 may include but are not limited to burner positioners 318, fuel gas control valves 310, oxygen control valves 312, air control valves 314, forming tool actuators 326, cooling fluid control valves 344, main turret drive motor, drive motor(s) operatively coupled to the holders 130 for rotation of the glass tubes 102, timers, vent systems, other control devices, or combinations of these. The number and type of control devices may depend on the specific converter 100 being used and the number and type of processing stations 106 employed by the converter 100.

The control system 402 may include one or a plurality of processors 404, one or a plurality of memory modules 406 communicatively coupled to the processor(s) 404, and machine readable and executable instructions 408 stored on the one or a plurality of memory modules 406. The machine readable and executable instructions 408, when executed by the processor(s) 404, may cause the system to automatically perform any of the actions and/or methods steps further described in greater detail herein, even if not explicitly described in the context of the machine readable and executable instructions 408.

Figure 11:
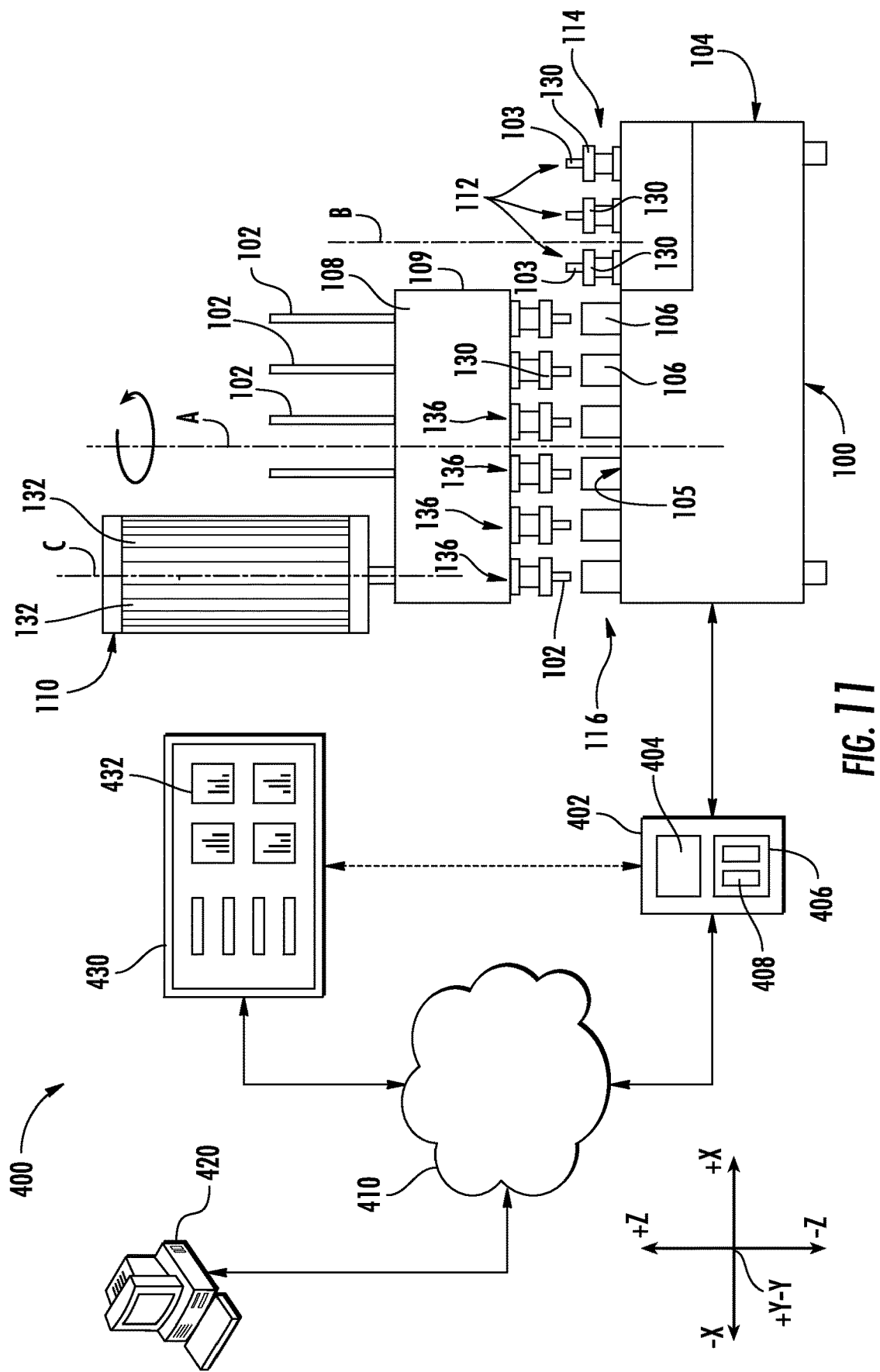
FIG. 11 schematically depicts another embodiment of a system comprising a converter for converting producing glass articles from glass tubes, according to one or more embodiments shown and described herein.

Referring now to FIG. 11, in embodiments, the system 400 can further include a display 430 operable to display a graphical user interface 432. The display 430 can be communicatively coupled directly to the control system 402 or can be in electronic communication with the control system 402 through a network 410. The display 430 may be a touch screen or may include one or more input devices (not shown) capable of enabling a user to enter information into the graphical user interface 432. The graphical user interface 432 may be operable to display information about the control system 402 and control sequence. The graphical user interface 432 may also be operable to receive input from a user and transfer the user input to the control system 402.

The control system 402 may include machine readable and executable instructions 408 that, when executed by the processor(s) 404, may cause the system 400 to automatically perform one or more steps in the control sequence for controlling the converter 100 according to the model predictive control framework described herein. The control system 402 may provide feedback control of the converter 100.

As previously discussed, the model predictive control framework disclosed herein incorporates one or more models that relate the process parameters of the converter 100 to attributes of the glass article 103, glass tube 102, or both to predict the values of the attributes from the settings of the various process parameters. The models for the converter 100 are developed and then incorporated into an objective control function for providing feedback control of the converter. During operation of the converter 100, the control system 402, through execution of one or more computer readable and executable instructions, may measure the attributes of the glass articles 103, glass tubes 102, or both, condition the measured data, and then utilize the objective control function to adjust the process parameters of the converter 100 to maintain attributes of the glass articles 103 within acceptable targets. In particular, the control system 402 may minimize the objective control function that takes into account the target values of the attributes and the differences between the measured values of the attributes and the predicted values of the attributes obtained from the models.

As previously indicated, the first action in providing feedback control of the converter 100 through the model predictive control framework is to develop one or a plurality of models relating the values of one or a plurality of process parameters of the converter 100 to one or a plurality of attributes of the glass articles 103, glass tubes 102, or both. The models for the converter may be developed through consideration of first principles, by conducting a Design of Experiments process, a combination of these two approaches, or through other methods. It is typical that first principles can suggest the model structure and the Design or Experiments can be used to determine the model coefficients as well as confirms the model structure or suggests a modification to the model structure. In embodiments, the model structure of the operating models can be linear, which can result in better computational efficiency of the model predictive control framework. However, it is understood that the model structure of the operating models can be non-linear.

In embodiments, the models for the converter 100 can be developed, fully or at least in part, through a Design of Experiments process. The Design of Experiments process can utilize 100% real time on-line measurement of the various attributes of the glass tubes 102 and/or glass articles 103 and statistical data analysis tools to automatically develop the operational models of the converter 100. In particular, the Design of Experiments process of the present disclosure for determining the operational models may include developing a plurality of condition sets for the converter 100, where each condition set comprises settings for a plurality of process parameters. The converter 100 may then be operated at each of the conditions sets to produce glass articles 103. While producing the glass articles 103, various attributes of the glass articles 103, glass tubes 102, or both may be measured in real time by the measurement devices 360 of the converter 100. Each glass article 103 may be assigned a unique identifier, which may be associated with the condition set used to make the glass article 103 and the attributes measured for the glass article. Once all of the condition sets have been run, the data on the condition sets and measured attributes can then be used to develop one or a plurality of operational models that correlate one or more of the process settings on the converter 100 to the attributes measured. The operational models may be used to automatically determine initial run settings for each of the plurality of process parameters of the converter 100. Additionally or alternatively, the operational models can be be incorporated into the objective control function for providing feedback control of the converter 100.

The plurality of conditions sets of the converter 100 may each include a plurality of settings for the plurality of process parameters of the converter 100. Each of the plurality of condition sets of the converter 100 may be different from every other condition set. Thus, each condition set may represent a unique group of settings for the process parameters of the converter 100. In some instances, such as following a forming tool change, many of the process parameters may remain the same, and only a subset of the condition sets may be needed to re-develop the operational models for the forming stations 204 of the converter 100, where the subset of the condition sets includes a number of conditions sets less than the total number of conditions sets possible for the converter 100.

The plurality of process parameters in each condition set may include, but are not limited to, an overall part rate, a holder 130 rotation rate, burner positions in one or a plurality of heating stations 202, burner heat outputs in one or a plurality of heating stations 202, positions of forming tools 324 in one or a plurality of the forming stations 204, contact timing between forming tools 324 and the glass tube 102 in one or more forming stations 204, other process parameter, or combinations of these. Referring to FIG. 3, the burner positions of the burners 302 in the heating stations 202 may include vertical position (e.g., +/−Z direction of the coordinate axis in FIG. 3), horizontal position (e.g. position in the X-Y plane of the coordinate axis in FIG. 3), or combinations of these of the burners 302 relative to the glass tube 102. Burner heat outputs of the burners 302 in the heating stations 202 may include positions of one or more of the fuel gas control valve 310, oxygen control valve 312, air control valve 314, or combinations of these, which may control the burner heat output of the burners 302.

Referring to FIG. 4, the forming tool positions of the forming tools 324 in the forming stations 204 may include vertical position (e.g., +/−Z direction of the coordinate axis in FIG. 3), horizontal position (e.g. position in the X-Y plane of the coordinate axis in FIG. 3), or combinations of these of the forming tools 324 relative to the glass tube 102. The horizontal positioning of the forming tools 324 may refer to the horizontal position relative to the glass tube when the forming tools 324 are in the engagement position. When in the engagement position, the horizontal positioning of the forming tools 324 may determine the pressure of the forming tools 324 against the glass tube 102. Contact timing between the forming tools 324 and the glass tube 102 may be controlled by controlling operation of the forming tool actuators 326 to adjust the timing of moving the forming tools 324 into and out of engagement with the glass tube 102 in the forming stations 204. As previously discussed, the contact timing can be adjusted to control the total contact time in a forming station 204.

Discussion herein of certain process parameters associated with heating stations 202 and forming stations 204 is provided for purposes of illustrating the subject matter of the present disclosure and is not intended to limit the process parameters that may be used. It is understood that other process parameters associated with the separation station 206, piercing station, cooling stations, or other processing stations 106 of the converter 100 may also be included in the condition sets. The number and type of process parameters in each condition set of the converter 100 may depend on the type of converter 100, such as the number and type of processing stations 106 on the converter 100, the configurations of each of the processing stations 106, the process control devices (e.g., control valves, motorized adjustments, speed regulators, etc.) present on each of the processing stations 106, or other factors.

Each of the process parameters of the converter 100 may have a range of settings. The range of settings for each of the process parameters may be representative of the full range of control of the process parameter or may be a narrower range of settings, over which the converter 100 may be expected to produce the glass articles having acceptable quality and yield. Each of the process parameters can have a maximum value and a minimum value. The maximum value and the minimum value for each of the process parameters can be based on the total capabilities or range of motion of the actuator or control device comprising the process parameter or can be based on values of the process parameter that are known to produce out of specification glass articles or other problematic conditions on the converter 100.

The range of settings for each of the process parameters may be used to develop the plurality of condition sets of the converter 100. In embodiments, the range of settings for each of the process parameters of the converter 100 may be input into a Design of Experiments statistical software program, which may be operable to process the range of settings for each of the process parameters of the converter 100 to develop the plurality of condition sets. An example of a Design of Experiments statistical software program may be JMP® developed by SAS. Other commercially-available statistical software packages or custom built software and/or algorithms may also be used for developing the plurality of condition sets. The plurality of conditions sets provides a set of "recipes" for operation of the converter 100. Illustrative examples of subsets of condition sets are provided in Tables 2 and 3 of the Examples.

In embodiments, a starting recipe may be provided or stored in one or more memory modules of the control system 402 of the converter 100. The starting recipe may be associated with a particular type or size of glass article 103 and may include preset values for each of the process parameters for the converter 100. The conditions sets may be developed from the starting recipe by selecting settings for each of the process parameters that are centered about the preset values from the starting recipe or distributed throughout a range of values that includes the preset value from the starting recipe. In other words, the condition sets may include the preset value from the starting recipe for a particular process parameter as well as values for the process parameter on either side of the preset value.

Once the conditions sets are developed for the converter 100, the converter 100 can be operated at each of the plurality of condition sets. A fixed number of glass articles 103 can be produced at the process parameters for each condition set. As few as 60 glass articles, or even 50 glass articles, can show statistical significance between condition sets. The control system 402 may be operable to produce greater than or equal to 50 or greater than or equal to 60 glass articles 103 at the process parameters of each condition set of the converter 100. In embodiments, the converter 100 can be operated to produce from 50 to 200, from 50 to 100, from 60 to 200, or from 60 to 100 glass articles 103 for each condition set.

While operating the converter 100 to produce glass articles 103 at the process parameters in each of the conditions sets, one or more attributes of the plurality of glass tubes 102, glass articles 103, or both can be measured using the measurement device(s) 360. As previously discussed, the measuring devices 360 may be operable to measure one or more attributes of the plurality of glass tubes 102, glass articles 103, or both. The attributes may include but are not limited to one or more temperatures or dimensions of the glass tube 102 or glass preform, one or more dimensions of the glass articles 103, one or more cosmetic features of the glass articles 103, or combinations of these. The attributes can also include intermediate dimensions of the partially formed glass article during or following one or more forming stations. The measurement devices 360 may be communicatively coupled to the control system 402. The measurement devices 360 may be operable to transmit one or more signals to the control system 402 indicative of the attributes of the glass tube 102, glass articles 103, or both measured by the measurement devices 360.

Once all the condition sets have been run on the converter 100, one or a plurality of operational models can be developed for the converter 100 based on the one or more attributes measured and the plurality of condition sets. The operational models may relate the various process settings to the one or more attributes of the glass articles 103.

The operational models may be generated through statistical analysis of the data collected on the measured attributes of the glass articles 103 and the process parameters utilized to produce the glass articles 103. In embodiments, the operational models may be developed externally from the converter 100 or the control system 402. Referring again to FIG. 11, the data collected on the measured attributes of the glass articles 103 and the process parameters used to produce the glass articles 103 may be exported from the control system 402 to an external computing device 420. The data may be exported from the control system 402 to the external computing device 420 through the network 410, which may be a wired or wireless network. The external computing device 420 may comprise a statistical analysis software capable of processing the data received from the control system 402 and developing the operational models therefrom. An example of a statistical analysis software may include JMP® developed by SAS; however, other statistical analysis software packages may be used. Once developed, the operational models may be transmitted from the external computing device 420 to the control system 402 for use in operation of the converter 100 and/or development of the objective control function.

Following development of the operational models, an initial run setting for each of the process parameters may be determined using the operational models and then to operate the converter 100 at the initial run settings. In embodiments, the operational models can be input into the control system 402, and the control system 402 can be operable to determine the initial run settings for each of the process parameters from the operational models. The term "initial run settings" refers to the values of the process parameters to which the converter 100 is initially set prior to feedback control using the model predictive control framework disclosed herein. In the model below, the initial run settings may correspond to the settings of the process parameters at k=0, where k is an integer that indicates the iteration of the control sequence, as explained below. Thus, for the first iteration of the control sequence (k=1), the values of the vector at iteration k−1, which is indicated by the term Act(k−1), will be equal to the initial run settings of the converter.

The control system 402 may be operable to receive a specification for the glass articles 103 to be produced, where the specification may include target values for one or a plurality of attributes of the glass article 103, glass tube 102, or both. The target values may be one or a plurality of target dimensions, one or a plurality of target cosmetic attributes, or combinations of these for the glass articles 103 to be produced or the glass tube 102 during various stages of conversion. For example, the target values for the attributes of the glass article 103 can include one or more specification values from an international standard for the glass article 103, such as but not limited to ISO 8362-1, "Injection Containers and Accessories—Part 1: Injection Vials Made of Glass Tubing," Third Edition, 2009 Dec. 15, the entire contents of which are incorporated by reference herein. The following Table 1 provides an example specification from ISO 8362-1 providing dimensions for injection vials made of glass tubing containing a neck finish without blow back (i.e., model A).

TABLE 1

Specification for 2R, 4R, 6R, 8R, 10R, and 15R injection vials with neck finish without blow back from ISO 8362-1 - table 1 (20R, 25R, 30R, overflow capacity, and mass omitted without prejudice).

| Size Designation | 2R | 4R | 6R | 8R | 10R | 15R |
|---|---|---|---|---|---|---|
| Perpendicularity Tolerance (a) (mm) | 1 | 1.2 | 1.2 | 1.2 | 1.2 | 1.2 |
| Ouside Diameter of Vial ($d_1$) (mm) | 16 | 16 | 22 | 22 | 24 | 24 |
| Outside Diameter of Flange ($d_2$) (mm) | 13 | 13 | 20 | 20 | 20 | 20 |
| Outside Diameter of Neck ($d_3$) (mm) | 10.5 | 10.5 | 16.5 | 16.5 | 16.5 | 16.5 |
| Inside diameter of Opening ($d_4$) (mm) | 7 | 7 | 12.6 | 12.6 | 12.6 | 12.6 |
| Total Height of the Vial ($h_1$) (mm) | 35 | 45 | 40 | 45 | 45 | 60 |
| Height of Sidewall of Vial ($h_2$) (mm) | 22 | 32 | 26 | 31 | 30 | 45 |
| Combined Height of Neck and Flange ($h_3$) (mm) | 8 | 8 | 8.5 | 8.5 | 9 | 9 |
| Radius of Shoulder ($r_1$) (mm) | 2.5 | 2.5 | 3.5 | 3.5 | 4.0 | 4.0 |
| Radius of Heel ($r_2$) (mm) | 1.5 | 1.5 | 2 | 2 | 2 | 2 |
| Thickness of Sidewall ($s_1$) (mm) | 1 | 1 | 1 | 1 | 1 | 1 |
| Thickness of Bottom ($s_2$) (mm) | 0.6 | 0.6 | 0.7 | 0.7 | 0.7 | 0.7 |
| Thickness of Heel (t) (mm) | 0.7 | 0.7 | 0.7 | 0.7 | 0.7 | 0.7 |

The machine readable and executable instructions 408, when executed by the processors 404, may cause the control system 402 to automatically receive the specifications for the glass articles 103 to be produced and determine the initial run settings for each of the process parameters of the converter 100 from the specifications and the operational models developed for the converter 100. The control system 402 may receive the specification for the glass articles 103 from a user input device or from the external computing device 420 communicatively coupled to the control system 402 through the network 410. The initial run settings for the process parameters may be determined by entering the values for the attributes of the glass article 103 from the specification into the operational models and calculating the initial run settings therefrom. Operating the converter 100 at the initial run settings may include adjusting each of the process parameters to the initial run settings determined from the operational models.

The control system 402 may be operable to develop the operating models of the converter 100. In particular, the control system 402 may include machine readable and executable instructions 408 that, when executed by the processor(s) 404, may cause the system to automatically operate the converter 100 to convert the glass tubes 102 into a plurality of glass articles 103; measure one or more attributes of the plurality of glass tubes 102, glass articles 103, or both using the at least one measurement device 360; adjust a plurality of process parameters of the converter 100 to run the converter 100 at each of a plurality of condition sets; associate each of the plurality of glass articles 103 with one of the plurality of condition sets that is used to produce the glass article 103 and the one or more attributes of the glass tubes 102, glass articles 103, or both measured by the measurement device(s) 360; and develop one or more operational models based on the attributes measured and the condition sets. Each of the operational models may relate one or more of the plurality of process parameters to the one or more measured attributes of the glass tube 102, glass article 103, or both. The machine readable and executable instructions 408, when executed by the one or more processors 404, may further cause the control system 402 to automatically determine an initial run setting for each of the process parameters based on the operational models and operate the converter 100 with each of the process parameters set to the initial run setting determined from the operational models.

Following development of the operating models for the converter 100, the operating models can then be integrated into the model predictive control framework for providing feedback control of the converter 100. In particular, the operating models can be integrated into the objective control function that provides the algorithm for feedback control of the converter 100. The objective control function can be based on a cost function for the converter 100. In embodiments, the objective control function can be based on a weighted mean square error cost function for the converter 100. Other control algorithms are contemplated for developing the objective control function. The objective control function, when based on the weighted mean square error cost function, penalizes deviations of measured values of the attributes from the target values of the attributes, attribute variance levels (either considered directly or indirectly addressed), and the actuators move magnitudes. The actuator move magnitudes refer to the magnitude of a change in a position of an actuator or control valve used to control a process parameter of the converter 100. During the feedback control sequence for controlling the converter, the objective control function for the converter 100 is minimized. If the model is linear, this is achieved by the standard quadratic programming method with constraints. The solution to the optimization problem is applied and the discrepancy between what is expected to happen and what actually happens is accounted for in developing the solution and the entire optimization step is repeated again. Thus, the control sequence and minimization of the objective control function is repeated in an interactive process to provide robust performance in the presence of significant modeling errors. Each iteration of the control sequence includes measuring the attributes for a sample of glass articles and/or glass tubes produced on the converter, recording the settings for the process parameters used to make the glass articles, processing the data set comprising the measured values and settings of the process parameters to produce a matrix of statistical properties representative of the measured values of the attributes, substituting the settings for the process parameters and the matrix of statistical properties representative of the measured values of the attributes into the objective control function, determining updated settings for the process parameters by minimizing the objective control function, and then adjusting the process parameters to the updated settings. The control sequence can then be repeated for a number of times until the updated settings converge.

The objective control function can be derived by first developing the operating models that provide expressions relating the settings of the process parameters to the estimated values of the attributes of the glass article or glass tube. The operating models can be developed through first principles, a Design of Experiments method, or combination of both, as previously described herein. The operating models can be an expression in which the estimated value of an attribute is the sum of an offset constant and at least one term that is dependent on the setting of the process parameter.

Second, the objective control function can be developed using the operating models and various terms and constants from the operating models to substituted into an initial control function, such as but not limited to a mean square error cost function, for the converter. The initial control function can depend on the estimated values for each of attributes of the glass article 103, glass tube 102, or both; the target values for each of the attributes; and the settings for each of the process parameters. The operating models developed for the converter 100 can be substituted into the initial control function for the estimated values of the attributes. Subsequently, the operating models can be solved for the offset constant to produce an offset constant function. Solving the operating models for the offset constant can include substituting the measured values of the attribute or a statistical property representative of the distribution of the measured value for each of estimated values of the attributes. The offset constant function can them be substituted into the modified control function for the offset constant to produce the objective control function.

Derivation of an exemplary objective control function according to the present disclosure will now be described in further detail. In embodiments, the operating models for the converter 100 can be linear models, such as the operating model provided in Equation 1 (EQU. 1).

$$\overline{Attrib}_{est}(k+1) = G*Act(k) + \alpha \qquad \text{EQU. 1}$$

In EQU. 1, $\overline{Attrib}_{est}(k)$ is an n×1 vector of estimated values of the attributes in iteration k+1 of the control sequence, where n is an integer equal to the number of attributes of the glass articles and/or glass tubes considered in the model predictive control framework and k is an integer indicative of the present iteration of the control sequence. The term G is a matrix of sensitivities, where the sensitivities are obtained from development of the operating models (e.g., from the Design of Experiments process). Each sensitivity in the matrix of sensitivities is indicative of the degree to which the value of an attribute changes in response to a change in a particular process parameter. The term Act(k) is an n×1 vector of the settings of the process parameters (e.g., settings of various actuators and control valves) for iteration k of the control sequence. The term a is a vector of offset constants.

Although described herein in the context of operating models that are linear functions, it is understood that more complex operating models may be developed and substituted into the initial control function to derive the objective control function. As previously discussed, the present model predictive control framework can compensate for significant errors between the operating models and the actual performance of the converter. Therefore, it has been found that any errors in the operating model arising from simplification of the operating models to linear models are easily compensated for by the model predictive control framework and feedback control of the converter 100 disclosed herein.

As previously discussed, the initial control function can be a mean square error cost function depending on the estimated values of the attributes, the target values of the attributes, and the process settings (e.g., actuator settings). The initial control function can also include weighting factors for differences in attributes and penalty factors to penalize or reduce the magnitude of changes to process parameters in each iteration. In embodiments, the initial control function can be the expression for the mean square error cost function provided in Equation 2 (EQU. 2).

$$J(k) = \qquad \text{EQU. 2}$$
$$\left(\overline{Attrib}_{est}(k+1) - Attrib_{targ}\right)^T Q^T Q \left(\overline{Attrib}_{est}(k+1) - Attrib_{targ}\right) +$$
$$(Act(k) - Act(k-1))^T R^T R(Act(k) - Act(k-1))$$

In EQU. 2, the term $Attrib_{targ}$ is a vector of target values for the attributes of the glass articles and/or glass tubes. The term $\overline{Attrib}_{est}(k+1)$ is a vector of estimated values of the attributes of the glass articles and/or glass tubes for iteration k+1 of the control sequence. The term $Q^T Q$ is a symmetric, and usually diagonal, weighting matrix comprising attribute weighting factors for differences in measured values of the attributes from target values of the attributes. Note that it is customary to represent this matrix of weighting factors as the transpose of a matrix times itself. This is not necessary but simplifies the expression. The term $R^T R$ is a symmetric, and usually diagonal, weighting matrix of penalty factors on the change in process parameters (i.e., change in actuator settings) from one iteration of the control sequence to the next. $R^T R$ acts as a closed loop robustness tuning lever that may be needed when there is substantial model inaccuracy. Adjustment of the penalty factors for the changes in process parameters to tune the objective control function is discussed in further detail herein. The operating models of EQU. 1 can be substituted into the above EQU. 2 for the term $\overline{Attrib}_{est}(k+1)$ to obtain the intermediate expression of EQU. 3.

$$J(k) = \qquad \text{EQU. 3}$$
$$(G*Act(k) + \alpha - Attrib_{targ})^T Q^T Q (G*Act(k) + \alpha - Attrib_{targ}) +$$
$$(Act(k) - Act(k-1))^T R^T R(Act(k) - Act(k-1))$$

The offset constant $\alpha$ can be estimated by solving EQU. 1 (one time step in the past and so the resulting attribute values are known and not estimated) for the offset constant and then substituting the measured values of the attributes for the estimated values of the attributes in the present iteration of the control sequence. Thus, in iteration k, we have $\alpha = Attrib_{measured}(k) - G*Act(k-1)$ from EQU. 1. This is an estimate obtained by the measurement of the attributes at time k. This estimate of the offset constant is the means by which feedback is in fact introduced into the control sequence and acts as a form of integral control (analogous to the standard PID proportional, integral, derivative controller) to remove steady state errors. The equation for estimating the offset constants can be substituted into EQU. 3 to produce the objective control function of Equation 4 (EQU. 4).

$$J(k) = (G*Act(k) + Attrib_{measured}(k) - G*Act(k-1) - \qquad \text{EQU. 4}$$
$$Attrib_{targ})^T Q^T Q(G*Act(k) + Attrib_{measured}(k) - (G*Act(k-1)) -$$
$$Attrib_{targ}) + (Act(k) - Act(k-1))^T R^T R(Act(k) - Act(k-1))$$

In EQU. 4, the only unknown in the above equation is Act(k). As previously discussed, Act(k) is an n×1 vector of the settings of the process parameters (e.g., settings of various actuators and control valves) for iteration k of the control sequence. The control system 402 can be operable to solve EQU. 4 for the values of Act(k) that minimize the objective control function J(k) for iteration k of the control sequence. The solution for Act(k) that minimized the objective control function of EQU. 4 can be constrained by the maximum and minimum values for each of settings of the process parameters. In other words, in determining the solution for Act(k) that minimizes the objective control function of EQU. 4, the following expression in Equation 5 (EQU. 5) must also be satisfied for all values of k (e.g., k and k−1, where k=1, 2, 3, 4, . . . ).

$$Act_{min} < Act(k) < Act_{max} \qquad \text{EQU. 5}$$

In EQU. 5, $Act_{min}$ is a matrix of minimum values of the setting for each of the process parameters, and $Act_{max}$ is a matrix of maximum values of the settings for each of the process parameters. The solution to this constrained optimization problem is solved by the standard quadratic programming method.

The vectors $Attrib_{targ}$ and $Attrib_{measured}$ can be any attribute of the glass article 103 and/or glass tube 102 that can be manipulated by changing one or more process parameters, for which a sufficient operating model can be obtained for said manipulation. The vectors $Attrib_{targ}$ and $Attrib_{measured}$ can be any of the attributes of the glass article 103 and/or glass tube 102 previously discussed herein. In embodiments, the vectors $Attrib_{targ}$ and $Attrib_{measured}$ can include but are not limited to one or more dimensions of the glass article 103 and/or glass tube 102, one or more cosmetic attributes of the glass articles 103, one or more chemical attributes of the glass, ranges of any of these attributes, or combinations of these. The ranges of the attributes can include a standard deviation or variance in the values of the attribute(s). The variance of one or more attributes of the glass article and/or glass tube can be included in $Attrib_{targ}$ or $Attrib_{measured}$ by one of the following: (1) directly modeling the variance response in the Design of Experiments process; or (2) modeling the maximum and minimum attribute values and controlling those to desirable set points.

As previously discussed, the objective control function can include attribute weighting factors, such as the matrix of weighting factors $Q^T Q$ in EQU. 4. The attribute weighting factors can be used to weight the relative importance of the various attributes of the glass articles and/or glass tubes in the objective control function. Thus, deriving the objective control function can further include developing attribute weighting factors for each of the attributes of the glass article, glass tube, or both and applying the attribute weighting factors to one or more terms of the objective control function based on the mean square error cost function. In embodiments, the attribute weighting factors can be applied to the term in the objective control function representing the error between the target value and the estimated value of the attribute from the original mean square error cost function (i.e., $(Attrib_{est}(k+1) - Attrib_{targ})$ in EQU. 2).

In embodiments, the attribute weighting factors can be determined by considering a process capability index Cpk for one or more of the attributes of the glass articles and glass tubes. The process capability index Cpk for an attribute can be determined from the spread in the specification range for the attribute, the estimated mean of attribute values, and an estimated variability in the attribute (e.g., standard deviation, variance, etc.) according to known calculation methods. Attributes of the glass articles and/or glass tubes with lower process capability indexes Cpk can have attribute weighting factors that weigh the attributes with more relative importance in the objective control function compared to attributes with greater process capability index Cpk. Likewise, attributes of the glass articles and/or glass tubes having greater process capability indexes Cpk can have attribute weighting factors that weigh the attributes with relative less importance in the objective control function.

As previously discussed, the objective control function can include penalty factors, such as the matrix of penalty factors $R^T R$ in EQU. 4. The penalty factors can be used to penalize the magnitude of changes in one or more of the process parameters in the objective control function per iteration of the control sequence. Each penalty factor may indicate of the amount of influence that a change in a particular process parameter has on the control response. In some instances, large changes in one or more process parameters may have a significant impact on one or more attributes that could cause divergence or oscillation of the updated settings of one or more process parameters. The penalty factors can be utilized to reduce the magnitude of changes to one or more of the process parameters that can be made in any one iteration of the control sequence. Thus, the penalty factors can be used to decrease the response rate of the feedback control by reducing the magnitude of changes that can be made in each iteration of the control sequence. The penalty factors can reduce or prevent the probability of divergence or oscillation of the control response outside of normal expected variation, but at the cost of a slower response time of the control method to changing operating conditions.

The penalty factors can be developed for one or more of the process parameters and can be applied to the term in the objective control function that represents the change in the process parameter. The penalty factors can be developed based on simulation, trial and error, operator intuition and experience, or other considerations. A process parameter having a large penalty factor R will be penalized to a greater extent in the objective control function, resulting in a smaller magnitude of allowable changes to the process parameter with high R for each iteration of the control sequence. Likewise, process parameters having a small penalty factor R will be penalized to a lesser extent in the objective control function, which can allow for greater magnitude in the allowable changes to the process parameter with low R for each interaction of the control sequence. Thus, the penalty factors can be used as a tuning feature to tune the feedback control provided by the model predictive control framework.

Referring again to FIG. 11, the objective control function can be used in a method for providing feedback control of the converter 100 for producing glass articles 103 from glass tubes 102. The control methods for feedback control of the converter 100 can include providing target values for one or a plurality of the attributes of glass tubes 102, glass articles 103, or both during or after converting. The control methods can include operating the converter 100 to produce the plurality of glass articles 103 from the plurality of glass tubes 102 and measuring the attributes of the plurality of glass articles 103 and/or the plurality of glass tubes 102. The control methods can include recording the settings of the operating parameters of the converter 100 related to the attributes to produce a data set comprising the measured values of attributes and the settings of the operating parameters. The control methods can further include processing the data set to produce a statistical property of a distribution of the measured values for each of the attributes and determining the updated settings for each of the operating parameters from the statistical property of the distribution of the measured values for each of the attributes, the target values for each of the attributes, and the settings of the operating parameters. The updated settings of the operating parameters can be values of the settings that minimize the objective control function developed for the converter. The control method can further include adjusting each of the operating parameters of the converter 100 to the updated settings.

The control method can further include repeating the steps of measuring the attributes, recording the settings for each process parameter, processing the data set, determining the updated setting for each process parameter, and adjusting each of the process parameters to the updated setting. In embodiments, the control method can be repeated continuously while the converter 100 is operated. In embodiments, the control method can be repeated at least until the updated settings for the process parameters converge. Convergence of the process parameters refers to the process parameters adjusting into a range within which further changes in the process parameters are within the normal expected variability of the process.

Figure 12:
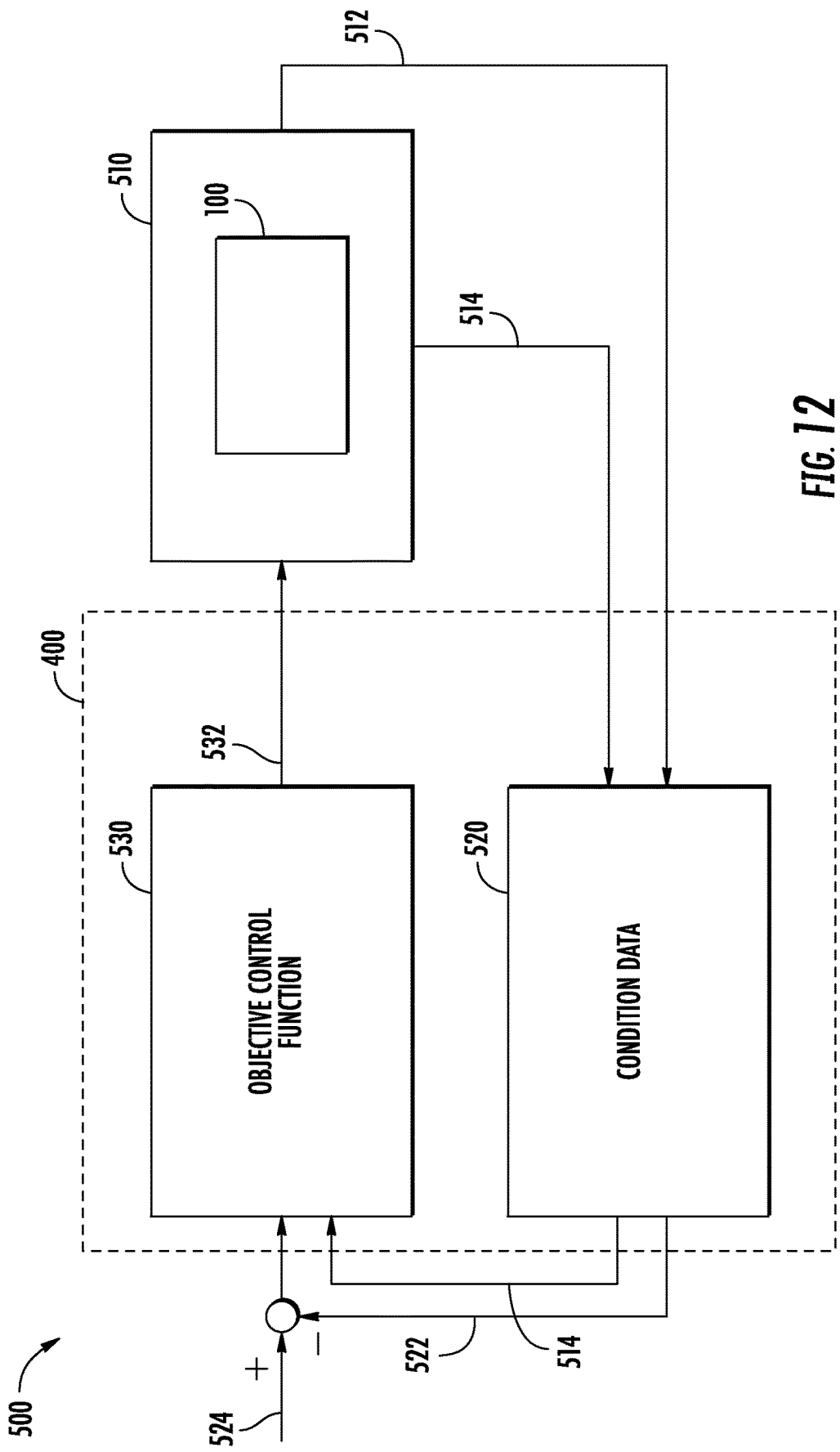
FIG. 12 schematically depicts a control sequence for providing feedback control of the converter of FIG. 11, according to one or more embodiments shown and described herein.
Figure 13:
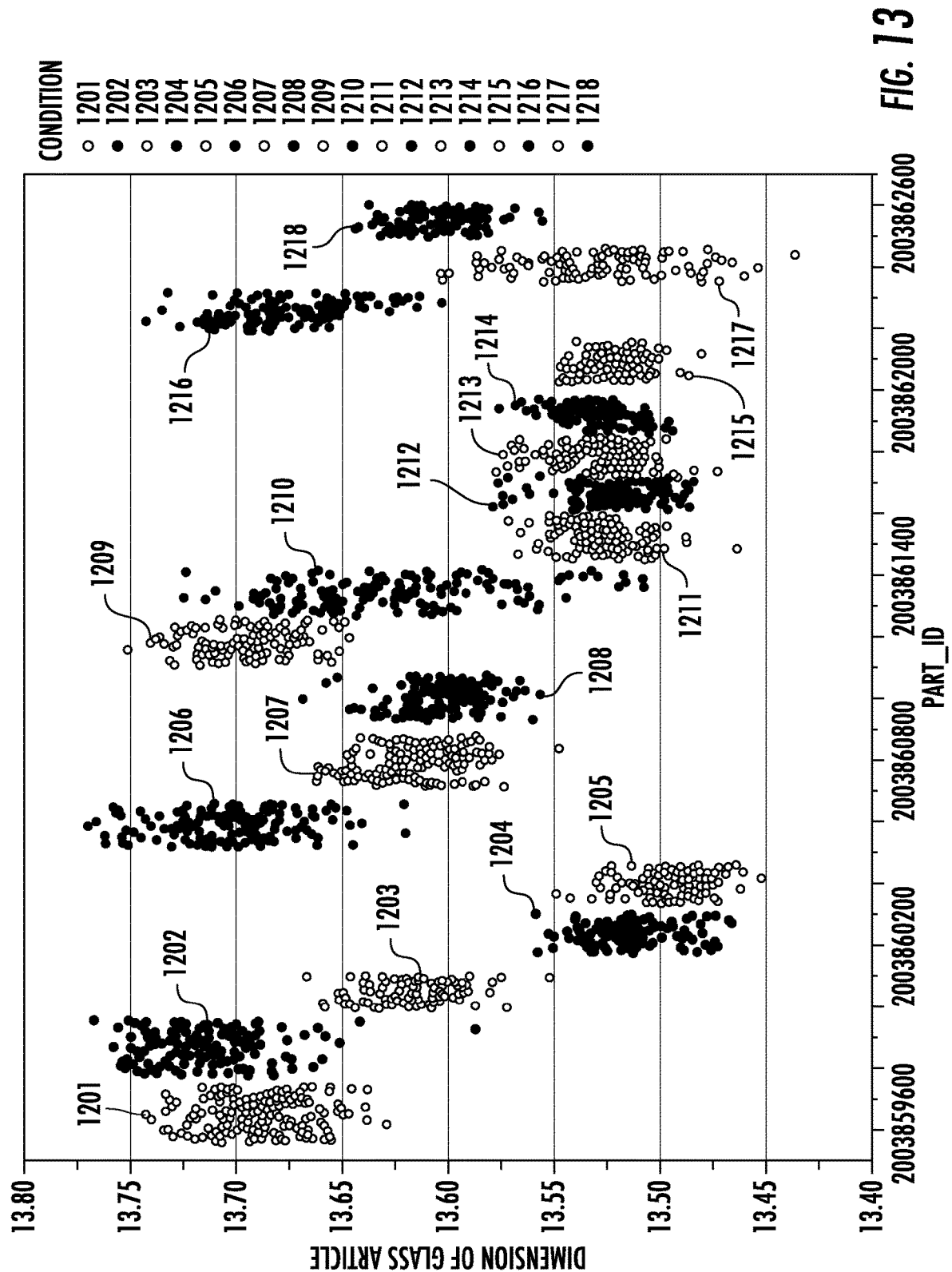
FIG. 13 graphically depicts a dimension of a glass article (y-axis) as a function of the unique identifier of the glass article (x-axis) for a plurality of condition sets, according to one or more embodiments shown and described herein.

Referring now to FIG. 12, the control sequence 500 for feedback control of the converter 100 representing the methods described herein is graphically depicted. During one iteration of the control sequence 500 for feedback control of the converter 100, the converting process 510 for producing glass articles from glass tubes using the converter 100 is operated. During the converting process 510, one or a plurality of attributes of the glass tubes, glass articles or both are measured for a number of glass articles. The measured values 512 of each of the attributes and settings 514 for the process parameters are output from the converting process 510 and received in the control system 402. The measured values 512 for each of the attributes is processed in a data processing module 520 to remove outlier data points and calculate one or more statistical properties 522 of the distribution of the measured values 512.

Following processing of the data comprising the measured values 512 of the attributes, the settings 514 for the process parameters and at least one statistical property 522 representative of the measured values 512 of the attributes are passed to the control module 530 along with the target values 524 of the attributes. The control module 530 can include the objective control function, which, in embodiments, can be based on the mean square error cost function for the converter. The control module 530 receives the settings 514 of the process parameters, the statistical properties 522 representative of the measured values 512 of the plurality of attributes, and the target values 524 of the attributes. The control module 530 then finds the values of the updated settings for the process parameters that minimize the objective control function 530. The updated settings 532 are then output from the control system 402 to the converting process 510 and converter 100, where the process parameters are adjusted to the updated settings 532. The control sequence 500 can be repeated for multiple iterations.

The control methods disclosed herein can control a single attribute by considering one or a plurality of process parameters or can control a plurality of attributes by considering a plurality of process parameters. The control methods can be fully or partially implemented through the control system 402. In embodiments, the control methods and control sequence can be fully automated through the control system 402. For instance, the control system 402 can be communicatively coupled to each of the actuators and control devices controlling the process parameters, and the control system 402 can make the adjustments to change the process parameters to the updated settings completely automatically at the end of each iteration of the control sequence.

In other embodiments, the control methods and control sequence can include some interaction with the operator of the converter 100, while other actions are performed using the control system 402. In embodiments, the control system 402 can operate to receive the measured values of the attributes and the settings of the process parameters from the converter 100, process the data comprising the measured values of the attributes and settings of the process parameters, and determine the updated values of the operating parameters by minimizing the objective control function. Following determining the updated settings of the operating parameters, the control system 402 may communicate the updated settings of the process parameters to the operator, who then can decide to adjust the process parameters of the converter 100 to the updated settings. As previously discussed, human operators have difficulties considering more than a maximum of about 3 different operating parameters and 3 different attributes at one time. Thus, for a converter in which a plurality of operating conditions and attributes must be taken into consideration in the control strategy, the control system 402 is necessary to be able to conduct the trial and error solution method necessary to minimize the complex objective control function for a plurality of attributes of the glass articles to determine the updated settings of operating parameters. Referring to FIG. 11, in embodiments, the control system 402 can include the display 430 comprising the graphical user interface 432 operable to facilitate interaction between the control system 402 and the operator of the converter 100. The control system 402 may enable the operator to enter parameters, such as attribute weighting factors, penalty factors, target values of the attributes, operating model information, or other information into the control system 402 for use in the model predictive control framework.

The target values of the attributes of the glass article 103 and/or glass tubes 102 can be provided as single target values, as a range of target values (e.g., by providing the maximum and minimum values of the specification for the attribute or by providing a single target value and a tolerance), or both. Examples of a single target value can include a target mean value, a target median value, a target maximum value, a target minimum value, a target spread, or other single target value. A range of target values can be characterized by a target minimum value and a target maximum value or by the combination of a single target value and a tolerance. The target values can refer to dimensions or cosmetic properties of the finished glass articles 103, such as but not limited to those in Table 1 from ISO 8362-1. The target values can also include target values for intermediate conditions of the glass article 103, such as temperatures, dimensions, or cosmetic features of the glass tube 102, the glass preform at the working end 150 of the glass tube 102, features of the partially formed glass article at the working end 150 of the glass tube 102, or combinations of these. The target values for each of the attributes can be manually input into the control system 402 by the operator, such as by using the graphical user interface 432, or can be automatically obtained by the control system 402 from an external system through the network 410, where the external system can be a business management system or other system capable of storing specifications for the glass articles and/or glass tubes. In embodiments, the control system 402 can be operable to save the target values of the attributes in the memory modules 406 of the control system 402.

Referring again to FIGS. 9 and 11, as previously discussed, each of the plurality of attributes of the glass tube 102, glass article 103, or both can be measured during operation of the converter 100 with one or a plurality of measurement devices 360. The measured values of the attributes and the settings of the process parameters can be saved in the one or more memory modules 406 of the control system 402, such as in a relational database stored on the memory modules 406 of the control system 402. In embodiments, the control system 402 can include machine readable and executable instructions 408 that, when executed by the processor 404, can cause the control system 402 to automatically measure each of the attributes of the glass tube 102, glass article 103, or both and record the settings of the process parameters to produce a data set comprising the measured values for each of the attributes and the settings of the process parameters. The machine readable and executable instructions 408, when executed by the processor 404, can cause the control system 402 to automatically save the data sets to the memory modules 406 or export the data sets to an external computing device 420.

For each iteration of the control sequence, the attributes of the glass tube 102 and/or glass article 103 can be measured for a plurality of glass articles 103 produced on the converter 100 to produce a data set comprising a plurality of measured values for each attribute at the settings of the process parameters. The number of glass articles 103 measured in each iteration of the control sequence can be a statistically relevant number of glass articles 103. The statistically relevant number of glass articles 103 can be a number of glass articles 103 that is large enough to produce a distribution of the measured values that is representative of the true underlying distribution (i.e., distribution of the measured values for all glass articles produced at the process parameters were the converter operated indefinitely at those process parameters). The number of glass articles 103 constituting a statistically relevant number can depend on the number of different process parameters incorporated into the model predictive control framework. Generally, the greater number of glass articles measured, the greater the accuracy of the data sets and the greater accuracy of the statistical properties of the distributions of the measured values for each of the attributes. Determining the number of glass articles that is necessary to produce a statistically relevant data set is within the skill set of a person of ordinary skill in the art whom has an understanding of the natural process variation by attribute.

The number of glass articles measured can also be balanced by the desired response time of the control sequence. Increasing the number of glass articles 103 measured increases the response time of the feedback control by increasing the time allocated to measuring the attributes to produce the data sets. Likewise, reducing the number of measured glass articles can decrease the response time of the feedback control sequence for controlling the converter 100, however, at the risk of reduced accuracy. Thus, the number of articles 103 for which attributes of the glass article 103 or glass tube is measured can be selected to balance accuracy and response rate of the feedback control. In some embodiments, in which a plurality of attributes and a plurality of process parameters are considered in the model predictive control framework, each interaction of the control sequence or method may include measuring the attributes for the glass articles for conversion of at least one full tube length of glass tube for all of the holders 130 of the converter 100. For instance, for a converter 100 having sixteen processing stations in the main turret and for glass tube long enough to produce from 20 to 30 glass articles 103 from each glass tube 102, the number of glass articles measured could be at least from 320 to 480 glass articles 103 per iteration of the control sequence. However, it is understood that the number of glass articles 103 measured could be greater or less depending on inherent attribute variation levels.

Once the measured values of the attributes and settings of the process parameters of the converter are obtained, the data set can be processed to produce one or more statistical properties representative of the distribution of the measured values. The data set obtained from the converter 100 can include the measured values for each of the attributes and the settings for each of the process parameters. The methods disclosed herein can include removing outlier data points from the data set of the measured values of the at least one attribute. After removing the outlier data points, the control methods can include calculating the statistical property for the distribution of the measured values of the attributes from the data set. The statistical property for each attribute is a calculated value that is representative of the measured values for that attribute. The statistical property for the distribution of the data set can be a mean, a median, a range, a standard deviation, a variance, or combinations of these. In embodiments, the statistical property can be the mean or the median of the distribution of the measured values. The control system 402, in particular the data processing module 520 of the control system, may comprise computer readable and executable instructions 406 that, when executed by the processor 404, cause the control system 402 to automatically process the measured value 512 data to remove outlier data points and calculate the one or more statistical properties of the distribution of the measured values for each of the attributes. Referring to FIG. 11, processing the data sets may be performed using the control system 402 or may be exported to an external computing device 420 that processes the data set and returns the statistical properties.

Referring to FIG. 12, once the data sets are processed to produce the statistical property of the distribution of the measured values for each of the attributes, the control methods then can include determining the updated settings of the process parameters from the objective control function. Determining the updated settings from the objective control function can include passing the settings for the target values of the attributes, the settings for the process parameters used to generate the measured values of the attributes, and the statistical property representative of the distribution of the measured values for each of the attributes to the control module and substituting these values into into the objective control function. In embodiments, the objective control function may be the function provided herein as EQU. 4. In the objective control function of EQU. 4, the target values of the attributes can be substituted for $Attrib_{targ}$, the statistical properties indicative of the measured values of the attributes can be substituted into the vector $Attrib_{measured}(k)$, and the settings for the process parameters can be substituted into the vector for $Act(k-1)$.

Determining the updated settings of the process parameters can further include solving the objective cost function for the values of the process parameters that minimize the objective control function. The control system 402 may be operable to determine the values of the process settings that minimize the objective control function. The updated settings for the process parameters are those settings that minimize the objective control function. In embodiments, the control system 402 may include computer readable and executable instructions 406 that, when executed by the processor 404, can cause the control system 402 to automatically substitute the target values of the attributes, the statistical properties representative of the measured values of the attributes, and the settings of the process parameters into the objective control function, and determine the updated settings for the process parameters by finding the values of the settings that minimize the objective control function. The updated settings may be determined using the control system 402 or the control system 402 may be operable to export the statistical properties, target values, settings of the process parameters, or combinations of these to an external computing device 420, which can operate to determine the updated settings and send the updated settings back to the control system 402.

As previously discussed, each of the process parameters can have a maximum value and a minimum value based on the operable range of the actuator, control valve, servo motor, or other control device, or based on the values of the process parameters that are known to produce glass articles that are out of specification. The solution to minimizing the objective control function can be further constrained by the maximum and minimum values for each of the process parameters, as discussed previously herein in relation to EQU. 4 and EQU. 5. In embodiments, determining the updated settings of the process parameters can include subjecting the objective control function to constraints comprising the maximum value and the minimum value for each of the process parameters. In embodiments, the control methods can include providing a maximum setting and a minimum setting for each of the process parameters and maintaining the updated setting for each of the process parameters in a range between the minimum setting and the maximum setting for the process parameter.

Once the updated settings for the process parameters are determined, the control method may include adjusting the process parameters of the converter 100 to the updated settings. In embodiments, the control system 402 may include machine readable and executable instructions 408 that, when executed by processor 404, may cause the control system 402 to automatically transmit control signals indicative of the updated settings of each of the process parameters to one or more control devices on the converter 100, where the control signals cause the control devices to adjust the process parameters to the updated settings. The control signals may be indicative of the updated settings or of a change in setting of the process parameter relative to the previous setting at k-1. In embodiments, the machine readable and executable instructions 406, when executed by the processor 404, may cause the control system 402 to automatically display the updated settings on display 430. In embodiments, the operator may view the updated settings and make the changes to the process parameters instead of automatically changing the process parameters using the control system 402.

As previously discussed, the control methods may include repeating the control sequence once or a plurality of times. In embodiments, the control sequence may be repeated continuously while the converter 100 is operating to produce glass articles 103. In this instance, the model predictive control framework and control system 402 provide constant feedback control of the converter 100 during operation. In embodiments, the control sequence may be repeated for a number of times sufficient for the updated settings to converge to values within an acceptable range. The acceptable range of the updated settings refers to a range of the process parameters that represents the normal expected variability in the process. Once reiteration of the control sequence results in convergence of the updated settings, the final updated settings can be maintained and reiteration of the control sequence can be ceased. In embodiments, the control method may be conducted on a periodic control basis throughout operation of the converter 100, where "periodic control basis" refers to operating the converter 100 with alternating periods of control and non-control. The periods of non-control are periods of operation of the converter 100 during which the control methods are not executed. In embodiments, the periods of non-control can have a duration greater than or equal to a duration of a single interaction of the control sequence. In embodiments, the periods of non-control can be at least as long as required to consume one set of glass tubes loaded into the converter 100.

As previously discussed, the model predictive control framework disclosed herein can compensate for some error in the operating models or changes in the converting process, materials, or operating environment that cause mismatches between the operating models developed for the converter 100 and the actual operation of the converter. In some instances, such as but not limited to process changes, tooling wear, changes in incoming materials, or process drift over time, the mismatch between the operating models integrated into the objective control function and the actual operation of the converter 100 may become significant enough to cause a lack of control of the converting process. The lack of control can be manifest in divergence of the updated settings for the process parameters with each iteration of the control sequence or oscillation of the updated settings beyond the effects of normal expected variability in the converting process.

As previously discussed, in some cases, the objective control function can be adapted to correct for mismatches that result in degradation in the ability to control the converter. For instance, in some cases, control can be restored by changing the penalty factors in the matrix of penalty factors ($R^TR$) for one or more of the process parameters. Modifying the penalty factors for changes in one or more process parameters, such as modification to penalize the changes in the process parameter to a greater extent, can reduce the magnitude of any changes to those process parameters in each iteration of the control sequence, which can reduce the probability of overshoot leading to divergence or oscillation. However, changing the penalty factors to decrease the magnitude of changes made to the process parameters can slow down the control response, which can increase the time necessary to compensate for any further changes in the process.

In embodiments, the methods disclosed herein can include repeating the control method (i.e., control sequence) for a plurality of iterations and identifying a condition indicative of a reduced ability to control one or more aspects of the converter. The condition indicative of reduced ability to control the converter can include divergence or oscillation of the updated settings for one or more of the process parameters through the plurality of iterations of the control sequence. After identifying the condition indicative of reduced ability to control the converter, the methods can include adjusting the penalty factor for one or more of the process parameters. Adjusting the penalty factors can reduce the magnitude of changes made to the one or more process parameters in each iteration of the method to thereby reduce divergence or oscillation of the updated settings and restore control to the converter.

At some point during operation of the converter 100, whether due to gradual changes to the converting process over time or due to an expected step change in the converting process, the mismatches between the operating models for the converter and actual operation of the converter can become great enough to require re-development of one or more of the operating models for the converter 100. In some cases, gradual changes in the process, such as equipment wear or other gradual change, may eventually lead to mismatches between the operating models and actual converter performance that require redevelopment of the operating models. The need to redevelop the models may be indicated by a reduction in the ability of the model predictive control framework to control the converter, such as indications of diverging settings for the process variables, oscillation of the process variables beyond the expected natural variability in the process, or excessive time (e.g., uneconomical number of interactions of the control sequence) required to converge the updated settings for the process parameters. The operating models can also be redeveloped in anticipated of or in response to expected changes to operation of the converter 100, such as but not limited to an expected change in the size, shape, or type of glass article being produced, changes in product specifications and target values, known changes in glass composition or quality, expected changes in fuel gas composition, planned replacement of worn equipment (e.g., worn forming tools, burners, control valves, actuators, etc.), other planned maintenance activities, or other expected changes. In embodiments, redevelopment of the operating models of the converter can be conducted according to a regular periodic schedule, which can aid in remediating mismatches between the operating models and actual converter performance before experiencing a reduction in the ability to control the converter.

The operating models of the converter 100 can be redeveloped through consideration of first principles or by engaging in the Design of Experiments process previously described herein for developing the operating models. Following redevelopment of the operating models through first principles, the Design of Experiments process, or both, the objective control function can be modified to incorporate the new operating models, such as by incorporating an updated matrix of sensitives G into EQU. 4. In some embodiments, updating the objective control function can also include updating the matrix of attribute weighting factors ($Q^TQ$), the matrix of penalty factors ($R^TR$), or combinations of these. The matrix of attribute weighting factors and matrix of penalty factors may be updated in situations involving expected changes to the process, such as but not limited to changes in the size, shape, or type of glass article being produced, replacement of worn equipment, changes in glass composition, or other expected changes. Once the operating models and objective control function are updated, the control method can be resumed.

Development and/or redevelopment of the operating models in response to gradual or expected changes in operation of the converter 100 will now be described in further detail. The Design of Experiments process previously described herein can be used to develop and/or redevelop the operating models of the converter 100 to quickly and efficiently achieve steady state operation of the converter 100 during start-up of a new converter 100, start-up of a new type, size, or shape of glass article 103 on an existing converter 100, changeover from one type or size of glass article 103 to another type or size of glass article 103, or combinations of these. The Design of Experiments process disclosed herein can also be used to develop or redevelop the operating models to re-tune operation of the converter 100 following a change in one or more components of the converter 100, such as forming tools 324 or burners 302; changes in fuel gas composition; changes in one or a plurality of external inputs to the converter 100; or combinations of these.

Converter Start-Up and/or Changeover

Referring again to FIG. 1, the systems 400 and methods of the present disclosure may be used to quickly and efficiently determine initial run settings of the converter 100 to achieve steady state operation at start-up of the converter or following a changeover of the converter 100. Start-up refers to initially beginning operation of a new converter 100 or to beginning operation of an existing converter 100 to produce a new type or size of glass articles 103 that has not previously been produced on the existing converter 100. Changeover may refer to changing the size, shape, or type of glass article 103 from one previously produced size, shape, or type of glass article 103 to another previously produced size, shape, or type of glass article 103. A changeover can also include a change in the dimensions of the glass tube 102, changes in the glass composition of the glass tube 102, changes in the coefficient of thermal expansion (CTE) of the glass tube 102, or other changes in the physical or chemical properties of the incoming glass tubes 102. As previously discussed, changes in the type, shape, or size of glass article 103 being produced or changes in the type or size of glass tube 102 typically can involve considerable lost production time resulting from setting and adjusting the hundreds of process parameters on the converter 100 for the new type or size of glass article.

Developing the setup for a new converter 100 or for a new glass article 103 that has not been previously produced can be a relatively long and iterative process that is heavily reliant on the human operators to execute. The setup for a new converter 100 or for a new glass article 103 not previously produced can include a two-step process: (1) burner setup; and (2) forming station setup. In particular, the burner setup of the converter 100 is typically conducted first to produce the proper preform at the working end 150 of the glass tube 102, and then a forming station 204 setup is conducted to produce the final glass article 103. During the burner setup phase, the part rate of the converter 100, burner 302 positions, and burner 302 heat outputs may be adjusted in sequence moving around the converter 100 from the separation station 206 to the last heating station 202 before forming. These adjustments during burner setup can be based on general guidelines and targets for various dimensions of the glass tube 102, which can help gauge the impact of these individual burner 102 parameters as well as their interactions with each other. However, for the most part, burner setup involves an iterative process to create an appropriate glass preform for forming to take place.

Once the glass preform shape has been developed, a setup for the forming stations 204 is then developed. The relative vertical and horizontal positioning of the forming tool 324 influences the shape of the features of the glass articles 103. For a glass vial, these features can include any of the attributes described in Table 1 for ISO 8362-1, such as but not limited to flange height, neck outer diameter, flange inner diameter, flange outer diameter, shoulder radius, or other features. The features and shapes depend on the type of glass article 103 being produced. General guidelines and targets for these various shapes and dimensions exist; however, to meet the demanding dimensional tolerances for pharmaceutical glass articles, significant iteration time may be needed to find the appropriate forming setup, which may often include going backwards in the process to make further modifications to the burner setup.

As previously discussed, the systems 400 and methods of the present disclosure can include systematically operating the converter 100 at the plurality of condition sets and developing operational models based on the condition sets and the measured attributes of the glass tubes 102, glass articles 103, or both produced using the condition sets. The operational models developed for the converter 100 for the specific glass article 103 being produced can then be used to determine the initial run settings for the converter 100 in order to produce the glass articles 103 having the desired attributes. This provides a systematic and automatic setup process that reduces or eliminates dependence on machine operator decision-making and accelerates the converter 100 setup and changeover process. The operational models developed for the converter can then be integrated in the objective control function of the model predictive control framework for providing feedback control for the converter 100.

In embodiments, the system 400 may receive an input indicative of a change in a type of glass article 103 produced by the converter 100 from a first glass article to a second glass article. The change in the type of the glass article 103 may comprises a change in size, shape, or both of the glass article 103, glass tube 102, or both. In embodiments, the second glass article may be a new type or size of glass article 103 not previously produced on the converter 100. The input indicative of a change in the type of glass article 103 may be a manual input or may be an electronic signal received from an external system, such as a business management system, through the network 410. In embodiments, the electronic signal may include a starting recipe for the second glass article, where the plurality of conditions sets may be developed beginning with the starting recipe. The system 400 may operate the converter 100 to convert the glass tubes 102 into the plurality of second glass articles, measure one or more attributes of the plurality of second glass articles using the measurement device 360, adjust the plurality of process parameters to run the converter 100 at each of the plurality of condition sets, associate each of the plurality of second glass articles with the condition set used to produce the second glass article and attributes measured, and develop one or more operational models for the second glass article based on the one or more measured attributes and the plurality of condition sets for each of the plurality of second glass articles. The system 400 may further determine an initial run setting for each of the plurality of process parameters based on the one or more second operational models and operate the converter 100 with each of the plurality of process parameters set to the initial run setting determined from the one or more second operational models. Although described in the context of a changeover from a first glass article to a second glass article or from one type or size of glass tube to another type or size of glass tube, the systems 400 and methods of this paragraph can be equally applied to startup of a new converter 100 (e.g., setup of the first glass article on a new machine).

In embodiments, the converter 100 may be setup in stages. A first stage of the setup may be the burner setup for determining the initial run settings for process parameters for the heating stations 202 to produce a glass preform having target attributes, such as temperature, viscosity, dimensions, or combinations of these. Once the converter 100 has been set up to produce the proper glass preform at the working end 150 of the glass tube 102, the second stage of the setup may be a forming setup for determining the initial run settings for the process parameters of the forming stations 214 for forming the glass preform into features of the glass articles 103.

The methods of the present disclosure may include the following steps, which may be implemented by the system through execution of the machine readable and executable instructions 408 by the processors 404. The methods may include preparing a first subset of condition sets that may include process parameters relating to producing the glass preform at the working end 150 of the glass tube 102 in one or more heating stations 202. The method may further include preparing a second subset of conditions sets that may include process parameters relating to forming the glass preform into one or more features of the glass article 103 at the working end 150 of the glass tube 102 in one or more forming stations 204. The conditions sets may be developed according to any of the methods disclosed herein, such as but not limited to inputting the various process parameters into a Design of Experiments statistical software program. In embodiments, the first subset of condition sets and the second subset of condition sets can be developed external to the system 400 and then uploaded to the control system 402 as "recipes" that the control system 402 can then automatically run through on the converter 100.

The methods may further include operating the converter 100 at each condition set in the first subset of conditions sets, measuring one or more preform attributes of the glass preform at the working end 150 of the glass tube 102, and developing one or more preform operational models based on the one or more preform attributes measured and the first subset of condition sets. The preform operational models may be developed according to any of the methods disclosed herein for developing the operational models. The preform operational models may describe the relationship of the various burner input parameters (burner flow, position, and holder 130 rotation rate), to attributes of the glass preform, such as one or more dimensions and/or temperature profile of the glass preform. The methods may further include determining initial run settings for each of the plurality of process parameters in the heating stations 202 based on the preform operational models and operating the converter 100 with each of the plurality of process parameters of the heating stations 202 set to the initial run settings determined from the preform operational models.

In embodiments, the preform operational models may be developed using an external computing system 420 (FIG. 11) outside of the control system 402 using a statistical software program such as JMP® or other statistical software. Once developed by the external computing system 420, the preform operational models may be used to determine the best initial run settings for the heating stations 202 and the initial run settings can be uploaded to the control system 402 as a recipe. In embodiments, the preform operational models may be developed internally within the control system 402. The control system 402 may include machine readable and executable instructions that, when executed by the processors 404, may cause the control system to conduct statistical analysis of the condition sets and measured attributes of the glass preform to develop the preform operational models. The machine readable and executable instructions, when executed by the processors 404, may further cause the control system 402 to automatically determine the initial run settings for the heating stations 202 from the preform operational models and automatically adjust the process parameters for the heating stations to the initial run settings developed from the preform operational models.

Once the proper glass preform has been setup, a similar process may be conducted for the forming setup to determine the initial run settings for the plurality of forming stations 204. The methods of the present disclosure may further include, while operating the converter 100 with the process parameters of the heating stations 202 set to the initial run settings, operating the converter 100 at each condition set in the second subset of condition sets, which include process parameters relating to the forming stations 204. The methods may further include measuring the one or more attributes of the plurality of glass articles 103 produced, developing one or more forming operational models based on the attributes measured for the plurality of glass articles 103 and the second subset of condition sets, determining the initial run settings for each of the plurality of process parameters in the forming stations 204 based on the forming operational models, and operating the converter 100 with each of the plurality of process parameters of the forming stations 204 set to the initial run settings determined from the one or more forming operational models. As with the preform operational models, the forming operational models may be developed on the external computing system 420 or internally on the control system 402.

The control system 402 may further include machine readable and executable instructions that, when executed by the processor, may cause the control system 402 to automatically update the objective control function with information from the operating models developed during start-up or changeover of the converter 100. In embodiments, the changeover of the converter 100 may include changing operation from a first glass article to a second glass article, where the second glass article is an article previous run on the converter 100. In these embodiments, operating models developed for previous campaigns can be retrieved and the objective control function updated with the information from the previously developed operating models without having to re-develop the operating models. The ability to use previously developed operating models is enabled by the ability of the model predictive control framework to compensate for mismatches between the operating models and actual operation of the converter 100.

Component Replacement

In embodiments, the control system 402 may be operable to re-develop one or more of the operating models in response to a change in one of the components of the converter, such as but not limited to replacement of worn forming tools, burners, actuators, control valves, converter drive motor, drive train operatively coupling the converter drive motor to the main turret, or other components. As previously discussed, changing out one or more components of the converter 100 or other planned or unplanned maintenance activities can introduce significant errors in the operating models that may slow down the response time of the model predictive control framework or cause a lack of control of the converter by the model predictive control framework. Following replacement of one or more components of the converter 100, the updated run settings for one or more of the process parameters calculated from minimization of the objective control function may no longer result in producing glass articles 103 meeting quality specifications. For instance, following replacement of one or more forming tools 324 in a forming station 204 due to wear or malfunction of the forming tools 324, the positioning of the new forming tools 324 may need to be adjusted due to the different dimensions of the replacement forming tool 324 compared to the worn forming tool 324. Replacement of the converter drive motor, components of the drive train operatively coupling the converter drive motor to the main turret, forming tool actuators, burner actuators, burner control valves, burners, or other components of the converter 100 can also introduce additional mismatches between the actual operation of the converter 100 and the attributes predicted from the operating models. High yield loss can result from these mismatches between the previous operating models and actual operation of the converter 100 after replacement of one or more components.

In these instances, the systems 400 and methods disclosed herein can automatically re-develop one or more of the operating models of the converter 100 following replacement of one or more components in the processing stations 106 of the converter 100. The following method steps relating to automatically re-developing one or more of the operating models of the converter 100 after a component change will be described in the context of replacement of a forming tool(s) 324. However, it is understood that the method steps may be utilized to similar effect in re-developing one or more operating models of the converter 100 following replacement of any other components, such as but not limited to burners 302, burner positioners 318, control valves (fuel gas control valve, oxygen control valve, air control valve), forming tool actuators 326, holders 130, converter drive motor, components of the drive train, or other components.

The methods disclosed herein for automatically re-developing one or more operating models of the converter 100 following replacement of a component of the converter 100 may include identifying one or more defective components in one or more processing stations 106 of the converter 100. Defective components may refer to components that have malfunctioned or have worn so that they no longer produce glass articles 103 meeting dimensional and/or cosmetic standards for the glass articles 103. The methods may further include replacing the defective component in the one or more processing stations 106 with one or more replacement components. The defective components may be any of the components in any of the processing stations 106 described previously herein. In embodiments, the method may include identifying one or more defective forming tools in one or more forming stations 204 of the converter 100. Defective forming tools may refer to forming tools 324 that no longer produce glass articles 103 meeting dimensional standards for the glass articles 103. The defective forming tools may be worn or damaged. The methods may further include replacing the defective forming tool(s) with one or more replacement forming tools.

Following replacement of the defective component with a replacement component, the methods may further include preparing the plurality of conditions sets for the converter 100, operating the converter 100 to convert the glass tube 102 into a plurality of glass articles 103, measuring one or more attributes of the plurality of glass articles 103, the glass tube 102, or both, adjusting one or more of the plurality of process parameters of the condition sets to run the converter 100 at each of the plurality of condition sets, and associating each of the plurality of glass articles 103 with the condition set used to produce the glass article 103 and the one or more attributes measured. The methods may further include updating the operational models based on the one or more attributes measured and the plurality of condition sets for each of the plurality of glass articles 103 to produce a set of updated operational models taking into account the replacement components. The initial run settings for each of the plurality of process parameters may be determined from the updated operational models. The process parameters may be adjusted to the initial run settings and the converter 100 operated at the new initial run settings to produce glass articles 103. The methods may further include updating the objective control function with information from the updated operating models, such as but not limited to updating the matrix of sensitivities G of the objective control function of EQU. 4.

In embodiments, replacement of a component, such as a forming tool 324, may not need adjustments to all of the process parameters or operating models of the converter 100. For instance, a forming tool 324 replacement may not affect the glass preform and the operating models and the process parameters associated with the upstream heating stations 202 may not need to be re-developed and adjusted. Thus, automatically re-developing the operating models for the converter 100 following a component replacement may only need updates to a subset of the operating models for the converter 100. In embodiments, the plurality of conditions sets of the converter 100 may include settings for a subset of the plurality of process parameters of the converter 100. The subset of process parameters may include process parameters relating to the processing station 106 for which the component has been replaced and, optionally, any processing stations 106 downstream thereof. In embodiments, the component replacement may be a forming tool replacement, and the subset of the plurality of process parameters of the converter 100 may include positioning (with respect to all three dimensions of the coordinate axis in the Figures) of the one or more replacement forming tools, a contact timing of the one or more replacement forming tools with the glass tube 102, or both. The contact timing may include the total contact time of the replacement forming tools in contact with the glass tube 102.

In embodiments, the methods for automatically re-developing one or more of the operating models of the converter 100 following a component replacement or other machine upset may be conducted using the system 400 comprising the control system 402. The control system 402 may include machine readable and executable instructions 408 that, when executed by the processors 404, may further cause the control system 402 to automatically receive an input indicative of a change in one or more components in the at least one processing station 106 of the converter and develop a subset of condition sets. The subset of condition sets may include settings for a subset of process parameters of the converter 100 relating to or affected by the change in the component of the converter 100. In embodiments, the component change may be a replacement of one or more forming tools 324 and the subset of condition sets may include settings for a subset of process parameters relating to the forming station 204 for which the forming tools were replaced and/or process parameters relating to processing stations 106 downstream of the forming station 204.

The machine readable and executable instructions 408, when executed by the processor(s) 404, may further cause the control system 402 to operate the converter 100 to convert the glass tubes 102 into the plurality of glass articles 103, measure the one or more attributes of the plurality of glass articles 103, glass tube 102, or both using the at least one measurement device 360, adjust one or more of the plurality of process parameters to run the converter 100 at each of the condition sets in the subset of condition sets, associate each of the plurality of glass articles 103 with the condition set used to produce the glass article 103 and the attributes measured for each glass article 103, and update one or more of the operational models based on the attributes measured and the subset of condition sets for each of the plurality of glass articles 103 to produce one or more updated operational models for the converter 100. The updated operational models may be used by the control system 402 to determine initial run settings for the plurality of process parameters following the component replacement. The control system 402 may then operate the converter 100 with the process parameters set to the updated initial run setting determined from the operational models. The control system 402 may also include machine readable and executable instructions 408 that, when executed by the processor 404, may cause the control system 402 to automatically update the objective control function with information from the updated operating models.

Identifying Upset Conditions

In embodiments, the control system 402 may be operable to identify one or more upset conditions on the converter 100, such as but not limited to malfunctioning components of the converter 100, wrong size glass tube 102 loaded into the converter 100, missing glass tube 102, disruption in burner gas flow, disruptions in operation of ventilation systems, other upset condition, or combinations of these. Methods disclosed herein may include, while operating the converter 100 at the run setting for each of the plurality of process parameters, measuring the one or more attributes for each of the plurality of glass articles 103; determining one or more predicted attributes for each of the plurality of glass articles 103 from the plurality of process settings and the operational model; and comparing the one or more attributes measured for each of the plurality of glass articles 103 to the one or more predicted attributes to identify deviations from normal steady state operation of the converter 100. The methods may further include identifying an upset condition of the converter 100 based on the comparison of the one or more attributes measured for each of the plurality of glass articles 103 to the one or more predicted attributes based on the operational models, correcting the upset condition of the converter 100, and repeating the development of the model following correction of the upset condition.

In any of the methods disclosed herein, the converter 100 may include a plurality of holders 130 and the methods disclosed herein may include securing one of a plurality of the glass tubes 102 in each of the plurality of holders 130 and passing each of the plurality of holders 130 and the glass tubes 102 disposed therein through the plurality of processing stations 106.

In any of the methods disclosed herein, each of the plurality of processing stations 106 of the converter 100 may be in a fixed position and the methods may include indexing the glass tube 102 through each of the processing stations 106 sequentially in succession. Alternatively, in embodiments, in any of the methods disclosed herein, the converter 100 may be a continuous converter, and the methods may include passing the glass tube continuously through the plurality of processing stations, where each of the plurality of processing stations may move in coordination with translation of the glass tube 102 during the active time.

Referring to FIG. 11, in embodiments, the system 400 may include a distributed computing environment comprising the converter 100 and control system 402, a network 410, and one or more external computing devices 420. The control system 402 may communicate with the external computing devices 420 through the network 410. One or more steps in the methods disclosed herein may be accomplished using the external computing devices 420 alone or in combination with the control system 402. Although shown in FIG. 11 as being directly communicatively coupled to the converter 100, it is understood that the control system 402 may additionally communicate with the converter 100 through the network 410. The network 410 may be a wired or wireless network. In embodiments, the network 410 may be a cloud network.

Embodiments of the disclosure may be embodied in hardware and/or in software (including firmware, resident software, micro-code, etc.). The control system 402 of the converter 100 and/or other controllers on the converter 100 may include at least one processor and the computer-readable storage medium (i.e., memory module) as previously described in this specification. The control system 402 may be communicatively coupled to one or more system components (e.g., converter 100, burner positioner 318, burner control valves, forming tool actuators 326, measurement device 360, converter drive system, etc.) via any wired or wireless communication pathway. A computer-usable or the computer-readable storage medium or memory module 406 may be any medium that can contain, store, communicate, propagate, or transport the program for use by or in connection with the instruction execution system, apparatus, or device.

The computer-usable or computer-readable storage medium or memory module 406 may be, for example but not limited to, an electronic, magnetic, optical, electromagnetic, infrared, or semiconductor system, apparatus, device, or propagation medium. More specific examples (a non-exhaustive list) of the computer-readable storage medium or memory module 406 would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable storage medium or memory module 406 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer-readable storage medium or memory module 406 may include the machine readable and executable instructions 408 for carrying out operations of the present disclosure. The machine readable and executable instructions 408 may include computer program code that may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

EXAMPLES

The following examples illustrate the operation of the disclosed system and methods for producing a plurality of glass articles from glass tube in a converter. The following examples are not intended to limit the scope of the present disclosure.

Example 1: Development of Operating Models for the Converter

The following Example 1 illustrates use of the disclosed systems and methods for developing the operating models for the converter and initially setting up the converter 100 for converting glass tube to glass articles. Due to the hundreds of different process parameters that may be adjusted on a typical converter, the Examples herein are involve only a subset of these process parameters for the purpose of illustration and brevity. The glass tubing in these Examples was aluminosilicate glass tubing, such as VALOR® glass manufactured and marketed by Corning Incorporated. The aluminosilicate glass tubing may be further processed by annealing and/or ion exchanging the glass tubing after converting. Although aluminosilicate glass is used in the examples, the effects of the systems and methods disclosed herein are not dependent on the type or composition of the glass.

The glass tubes were converted into glass articles using a converter. The converter used included eighteen processing stations in the main circuit. Each process parameter may have a preset value for a specific type or size of glass article being produced. Development of the condition sets may start with the preset value as a starting point.

Burner Setup

The methods of the present disclosure were first used to develop run settings for three process parameters relating to burner setup of the converter 100. The three process parameters of Example 1 were a burner position in a first heating station up stream of a forming station, a burner position in a second heating station disposed between the first heating station and the forming station, and the rotational speed of the holder 130 (chuck speed). A subset of 18 condition sets were developed for modeling these three process parameters using JMP® Design of Experiments statistical analysis software. The subset of 18 condition sets are provided in Table 2.

TABLE 2

| Condition Set | Ref. No. in FIG. 12 | Holder Rate of Rotation (rpm) | A7 Burner Position (mm) | A8 Burner Position (mm) |
|---|---|---|---|---|
| 1 | 1201 | 450 | 2 | -2 |
| 2 | 1202 | 450 | -2 | 2 |
| 3 | 1203 | 450 | 0 | 0 |
| 4 | 1204 | 350 | 2 | 0 |
| 5 | 1205 | 350 | -2 | -2 |
| 6 | 1206 | 400 | 2 | 2 |
| 7 | 1207 | 450 | 2 | 2 |
| 8 | 1208 | 400 | -2 | 0 |
| 9 | 1208 | 450 | 0 | -2 |
| 10 | 1210 | 350 | -2 | 2 |
| 11 | 1211 | 450 | -2 | -2 |
| 12 | 1212 | 350 | 2 | -2 |
| 13 | 1213 | 350 | 0 | 2 |
| 14 | 1214 | 350 | 2 | 2 |
| 15 | 1215 | 450 | 2 | 0 |
| 16 | 1216 | 350 | -2 | -2 |
| 17 | 1217 | 450 | -2 | 2 |
| 18 | 1218 | 400 | 2 | -2 |

The converter 100 was run at each of the conditions sets in Table 2 to produce 60 glass articles at each condition set. Five different dimensions/angles were measured for each of the glass articles produced at each condition set. Each glass article was assigned an identifier/part number and the dimensions/angles measured and the condition set was associated with each glass article in a relational database. Referring to FIG. 12, the data for one of the dimensions measured for the glass articles of Example 1 as a function of part number is graphically depicted. As shown in FIG. 12, the data points are grouped by the condition set used to make the glass articles 103.

Figure 14:
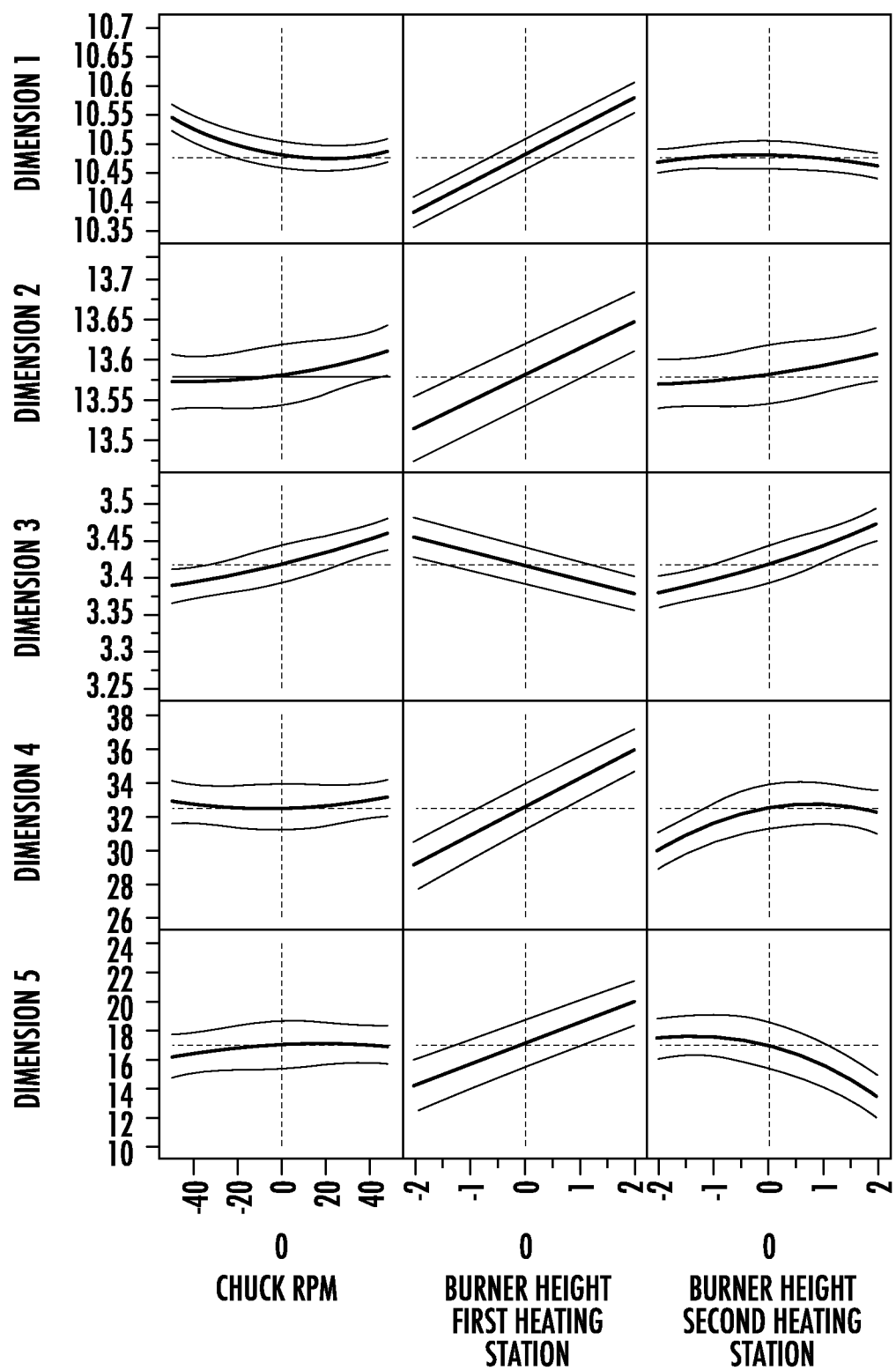
FIG. 14 graphically depicts a plurality of operational models developed from the dimension data and conditions sets from FIG. 13, according to one or more embodiments shown and described herein.

The data on the measured dimensions/angles and the condition sets for each glass article were then analyzed using the JMP® statistical analysis software to develop a plurality of operational models relating the process parameters to each of the measured dimensions/angles. Referring to FIG. 14, graphical representations for the operational models developed from the data in Example 1 are provided for purposes of illustration. It is understood that the control system 402 uses the empirical mathematical expression of the model rather than the graphical representation to determine the initial run settings for the converter.

Forming Station Setup

Next, the methods of the present disclosure were used to develop operating models and initial run settings for five process parameters relating to a forming setup involving a third heating station and one forming station positioned immediately downstream of the third heating station. The five process parameters for the forming station setup of Example 1 included a relative burner gas flow rate in the third heating station, the burner position in the third heating station, the position of a first forming tool in the forming station, the end time of contact of the first forming tool with the glass tube, and the end time of contact of a second forming tool with the glass tube in the forming station. The position of the second forming tool, in this example, is totally dependent on the position of the first forming tool through first principles. Thus, only the position of the first forming tool was modeled. The relative burner gas flow rate is a flowrate of the fuel gas delivered to the burner divided by a reference burner gas flow rate. A subset of 24 condition sets were developed for modeling these five process parameters using JMP® Design of Experiments statistical analysis software. The subset of 24 condition sets for the forming station setup of Example 1 are provided in Table 3.

TABLE 3

| Condition Set | Ref. No. in FIG. 15 | A14 Relative Gas Flow | A14 Burner Position (mm) | A15 First Tool Position (mm) | A15 First Tool End Time (Machine Angle) | A15 Second Tool End Time (Machine Angle) |
|---|---|---|---|---|---|---|
| 1 | 1401 | 1 | 9.2 | 0.08 | 290 | 330 |
| 2 | 1402 | 1 | 8.2 | 0.08 | 230 | 270 |
| 3 | 1403 | 1 | 9.2 | 0.14 | 260 | 300 |
| 4 | 1404 | 2.5 | 9.2 | 0.14 | 290 | 330 |
| 5 | 1405 | 1 | 8.2 | 0.14 | 290 | 330 |
| 6 | 1406 | 1 | 8.2 | 0.08 | 260 | 300 |
| 7 | 1407 | 2.5 | 9.2 | 0.08 | 290 | 330 |
| 8 | 1408 | 1.75 | 8.2 | 0.14 | 230 | 270 |
| 9 | 1409 | 2.5 | 8.2 | 0.08 | 290 | 330 |
| 10 | 1410 | 2.5 | 8.2 | 0.14 | 290 | 330 |
| 11 | 1411 | 1.75 | 8.7 | 0.11 | 260 | 300 |
| 12 | 1412 | 1 | 8.7 | 0.14 | 290 | 270 |
| 13 | 1413 | 1.75 | 8.2 | 0.08 | 230 | 330 |
| 14 | 1414 | 2.5 | 9.2 | 0.08 | 260 | 300 |
| 15 | 1415 | 1.75 | 9.2 | 0.08 | 230 | 270 |
| 16 | 1416 | 1 | 9.2 | 0.14 | 290 | 330 |
| 17 | 1417 | 1 | 9.2 | 0.11 | 230 | 270 |
| 18 | 1418 | 2.5 | 8.2 | 0.11 | 230 | 270 |
| 19 | 1419 | 1 | 8.7 | 0.08 | 290 | 330 |

TABLE 3-continued

| Condition Set | Ref. No. in FIG. 15 | A14 Relative Gas Flow | A14 Burner Position (mm) | A15 First Tool Position (mm) | A15 First Tool End Time (Machine Angle) | A15 Second Tool End Time (Machine Angle) |
|---|---|---|---|---|---|---|
| 20 | 1420 | 2.5 | 8.2 | 0.14 | 260 | 300 |
| 21 | 1421 | 1 | 8.2 | 0.11 | 290 | 330 |
| 22 | 1422 | 2.5 | 9.2 | 0.14 | 230 | 270 |
| 23 | 1423 | 2.5 | 8.62 | 0.08 | 230 | 270 |
| 24 | 1424 | 1.75 | 8.7 | 0.11 | 260 | 300 |

Figure 15:
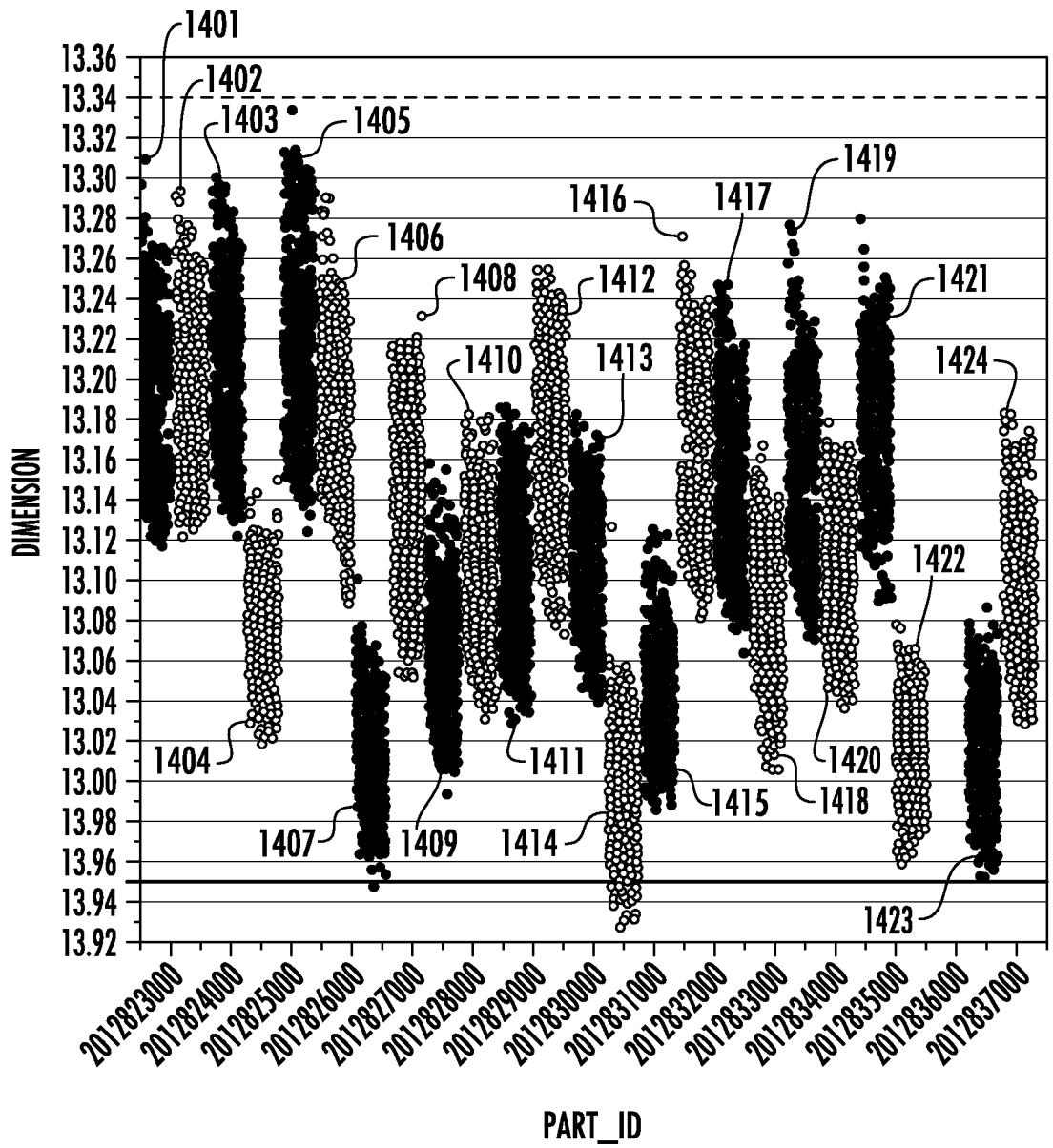
FIG. 15 graphically depicts a dimension of a glass article (y-axis) as a function of the unique identifier of the glass article (x-axis) for a plurality of condition sets, according to one or more embodiments shown and described herein.

The converter 100 was run at each of the conditions sets in Table 3 to produce 60 glass articles at each condition set. Two dimensions and two cosmetic attributes were measured for each of the glass articles produced at each condition set. Additionally, an overall desirability property of each glass article was determined from the measurements of the two dimensions and two cosmetic attributes. Each glass article was assigned an unique identifier/part number and the attributes measured and the condition set were associated with each glass article in a relational database with the unique identifier. Referring to FIG. 15, the data for one dimension measured for the glass articles of Example 1 as a function of part number is graphically depicted. As shown in FIG. 15, the data points are grouped by the condition set used to make the glass articles 103.

Figure 16:
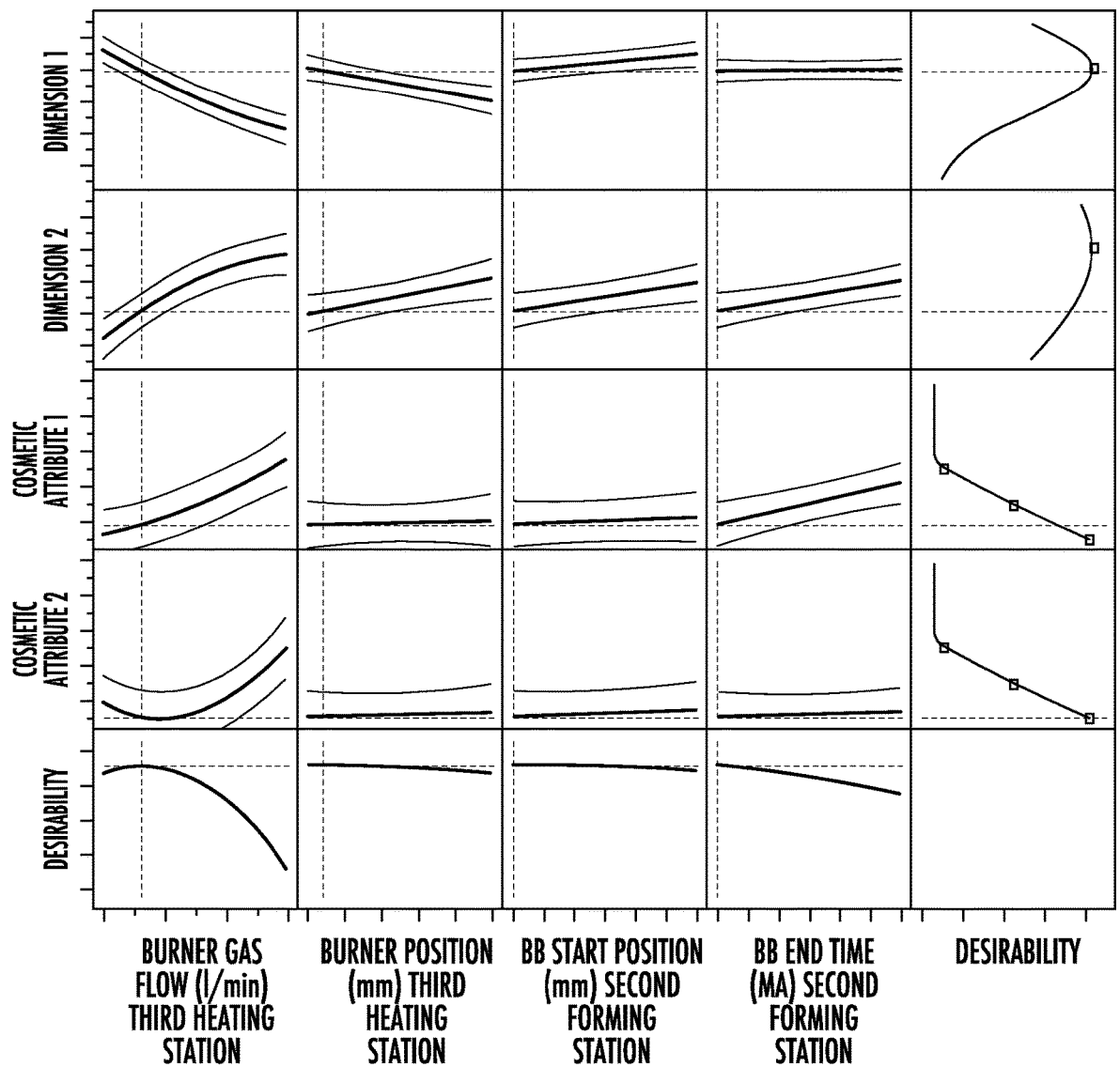
FIG. 16 graphically depicts a plurality of operational models developed from the dimension data and conditions sets from FIG. 15, according to one or more embodiments shown and described herein.

The data on the measured dimensions/angles and the condition sets for each glass article were then analyzed using the JMP® statistical analysis software to develop a plurality of operational models relating the process parameters to each of the measured dimensions, measured cosmetic attributes, and the overall desirability. Referring to FIG. 16, graphical representations for the operational models developed from the data in Example 1 are provided for purposes of illustration.

Example 2: Feedback Control with Model Predictive Control Framework

In Example 2, operating models were developed for the converter and integrated into the objective control function of EQU. 4, which was then used to provide feedback control of the converter 100. For Example 2, glass vials were produced from glass tube with the converter described in Example 1 having 18 processing stations in the main turret. The glass tube was the same as the glass tube in Example 1.

In a first step of Example 2, the operating models were developed through the Design of Experiments process. Operating models were developed for 9 process parameters taking into consideration 13 attributes of the glass vials. The process parameters modeled included the vertical position of the forming tools in a first forming station, the horizontal position of the forming tools in the first forming station, the gas flow to the burner in a first heating station before the first forming station, the vertical position of the burner in the first heating station, the vertical position of a burner in a second heating station after the first forming station, a vertical position of a pin forming tool in a second forming station after the second heating station, a work position of the BB forming tool in the second forming station, the work position of the IB wheel forming tool in the second forming station, and a work position of the OB wheel forming tool in the second forming station. The attributes of the glass tube measured for each condition set included the flange maximum outside diameter, the flange minimum outside diameter, the flange maximum inside diameter, the flange minimum inside diameter, the maximum flange height, the minimum flange height, the maximum top height, the minimum top height, the average eccentricity, the average lower flange angle, the average top flange angle, the average shoulder angle, and the average shoulder radius.

Figure 17:
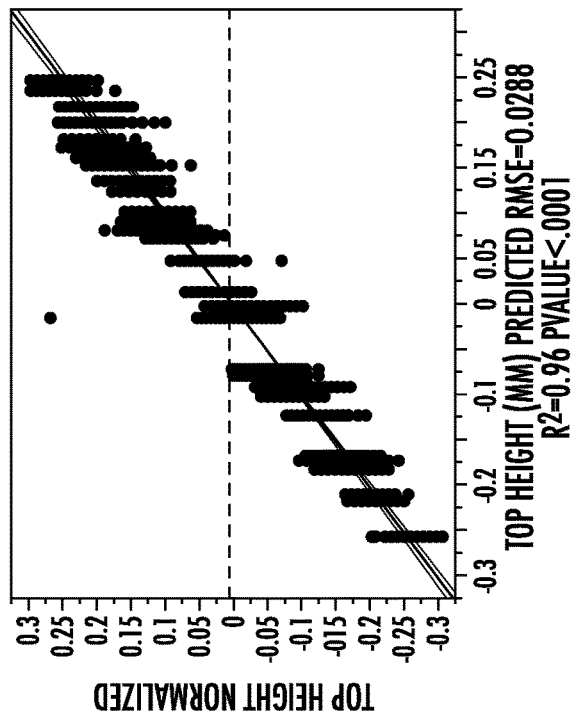
FIG. 17 graphically depicts a plot of normalized measured values of various attributes of glass vials as a function of normalized predicted values of those attributes using operating models developed in Example 2, according to one or more embodiments shown and described herein.
Figure 17:
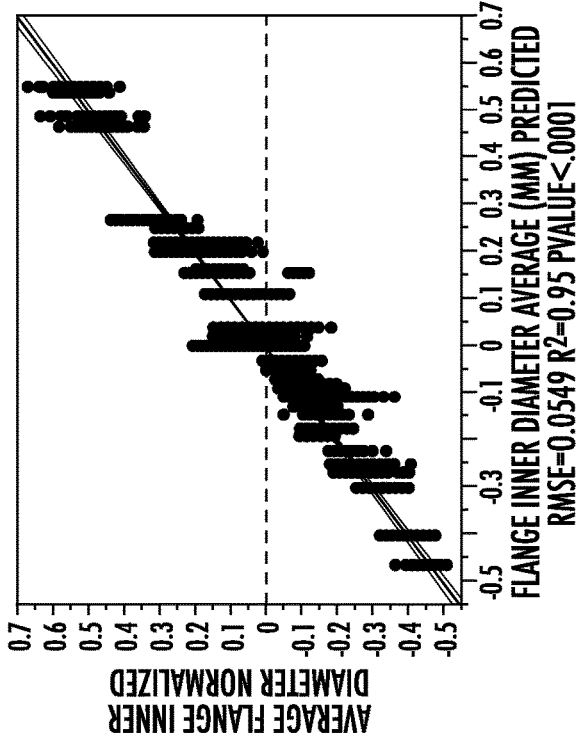
Figure 17:
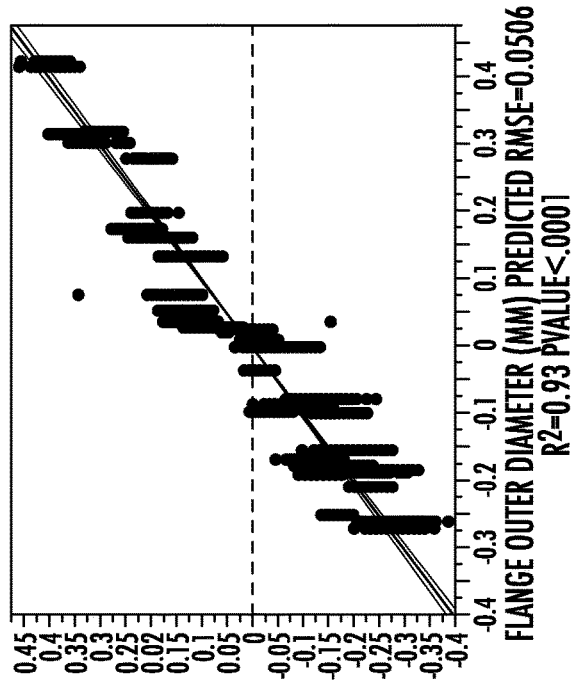
Figure 17:
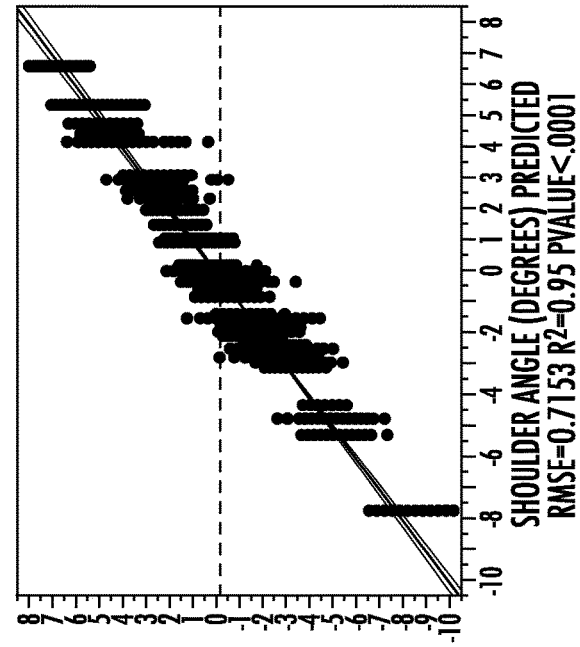

The converter was run at each condition set and the measured attributes and settings of the process parameters for each vial were associated using a unique identifier and stored in a relational database, as described in Example 1. Once all the condition sets were run, the data were then analyzed using the JMP® statistical analysis software to develop a plurality of operational models relating the process parameters to each of the measured attributes of the glass vials. In Example 2, the operating models were linear operating models in the form of EQU. 1 in order to simplify integration of the operating models into the objective control function. Referring now to FIG. 17, normalized values of the flange outer diameter, flange inner diameter, top height, and the shoulder angle of the glass article, which are derived from the measured data, are plotted against the predicted values of those attributes using the operating models and the settings of the process parameters. As shown in FIG. 17, the linear operating models developed in Example 3 provided a good prediction of the attributes, as shown by the high $R^2$ values of greater than 0.9 and very low P value of less than 0.001.

For Example 2, the converter was operated without feedback control for a period of five months, during which time machine wear and other long-term changes caused at least some additional mismatch between the operating models and actual operation of the converter. In step 2 of Example 2, after five months, the original operating models were integrated into the objective control function of EQU. 4.

Once the operating models were integrated into the objective control function, multiple iterations of the control method of the present disclosure were conducted to provide feedback control of the converter. Initially, the process parameters were set to initial run settings determined from the operating models. For each iteration of the control method, the converter was operated at the current settings of the nine process parameters previously discussed in Example 2. The 13 attributes were measured for each of the glass articles produced during operation of the converter. The measured values of the attributes and the run settings for the nine process parameters for each of the glass articles produced were saved in a database. For each iteration of the control method, the measured values of the attributes and settings of the process parameters were recorded for a number of vials corresponding to consuming an entire length of glass tube in each of the holders of the converter (e.g., 18 holders).

The data comprising the measured values of the attributes and process settings were then processed to remove outlier data points and to calculate the statistical property of the distribution of measured values for each of the attributes. In Example 2, the statistical property was the mean of the measured values for each of the attributes measured. The mean of the measured values of the attributes, the target values of the attributes, and the current settings of the process parameters were then substituted into the objective control function of EQU. 4 for $Attrib_{measured}$, $Attrib_{target}$, and $Act(k-1)$ terms respectively. During data processing and solution of the objective control function, the converter was operated at the previous run settings to maintain a consistent thermal environment of the converter.

The objective control function was then solved for the updated settings of the process parameters (e.g., Act(k)) that minimize the objective control function. The process parameters of the converter were then changed to the updated settings of the process parameters, and the control method was repeated. In Example 2, the control method was repeated for four iterations.

Figure 18:
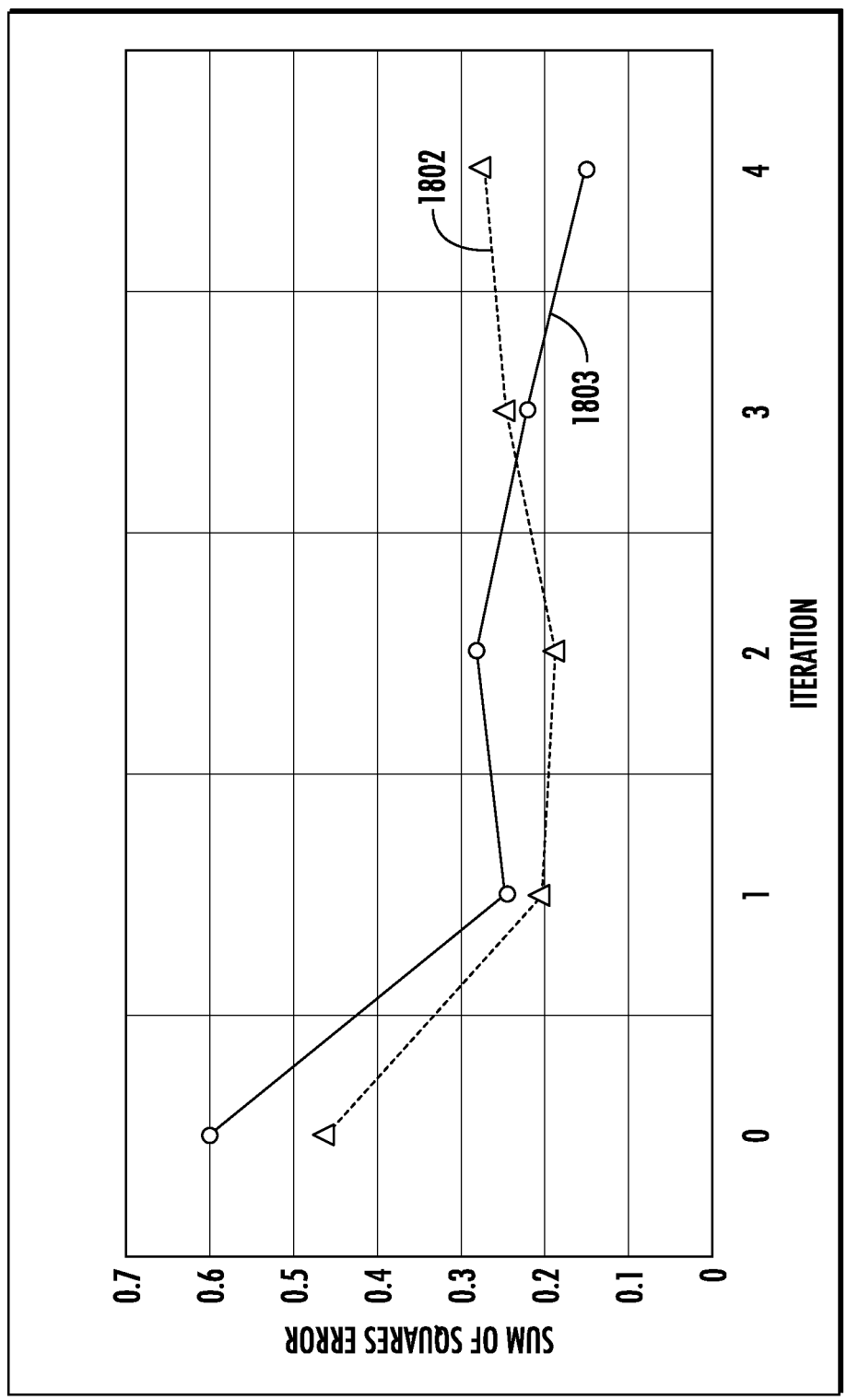
FIG. 18 graphically depicts a plot of the sum of squares error (e.g., value of the objective control function) as a function of a number of iterations of a control method for Examples 2 and 3, according to one or more embodiments shown and described herein.

Referring now to FIG. 18, the sum of square errors (e.g., value of the minimized objective control function) is plotted as a function of iteration number of the control method. Reference number 1802 refers to the value of the objective control function for Example 2. As shown in FIG. 18, the biggest change occurs in the first iteration. Thus, the model predicative control framework disclosed herein can be capable of compensating for mismatches between the operating models and actual operation of the converter in as little as one iteration of the control method. In FIG. 18, the variations in the value of the objective control function for interactions 2-4 were accountable to natural variability in the converting process.

Figure 19:
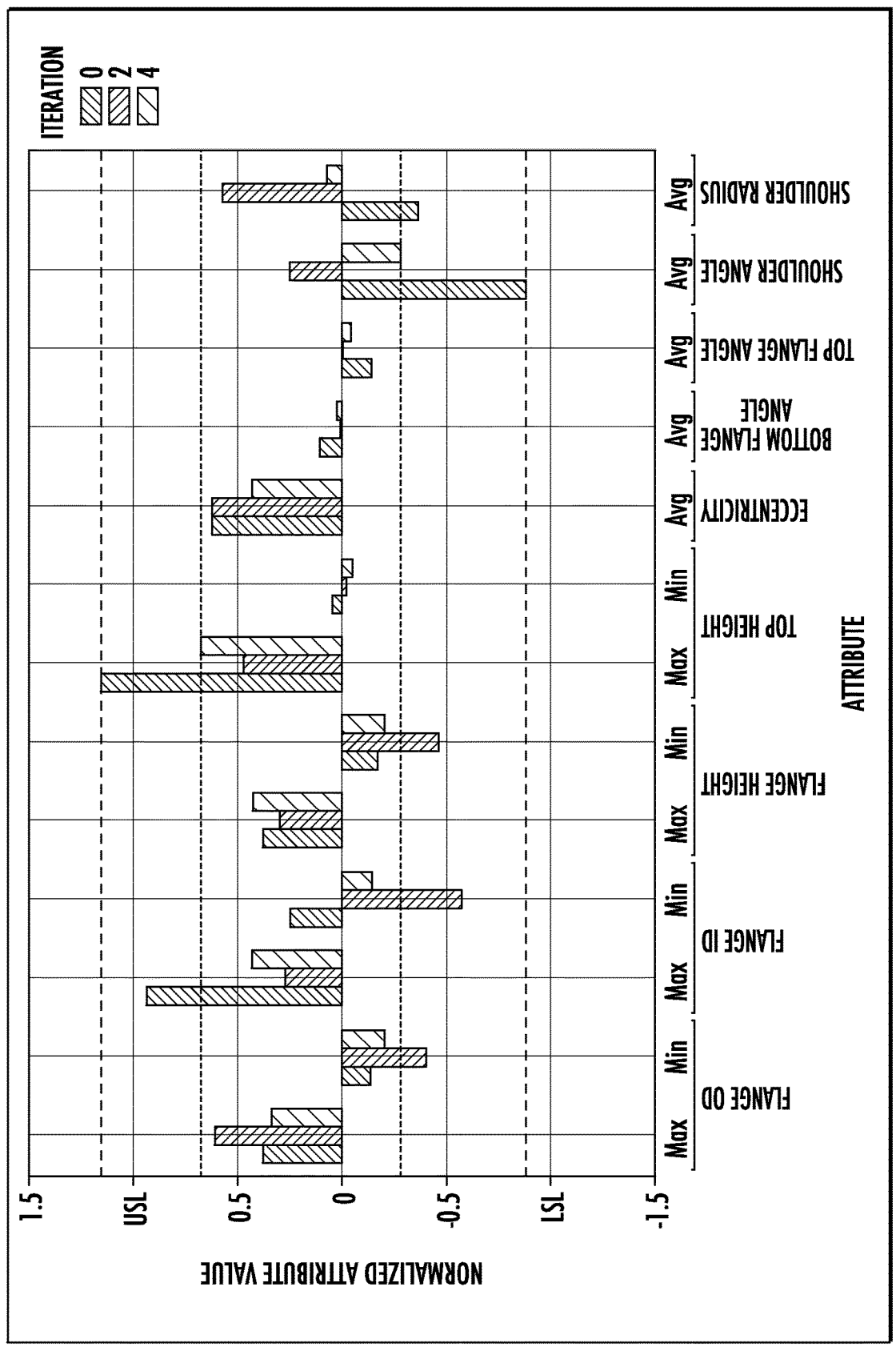
FIG. 19 graphically depicts normalized measured values for 13 attributes of glass vials produced in Example 2 for different iterations of the control method in Example 2, according to one or more embodiments shown and described herein.

Referring now to FIG. 19, the normalized mean for each of the 13 attribute values measured in Example 3 are shown as a function of iteration of the control method. Overall, the values of the attributes converge over the four iterations of the control method, further indicating the effectiveness of the model predictive control framework disclosed herein.

Figure 20:
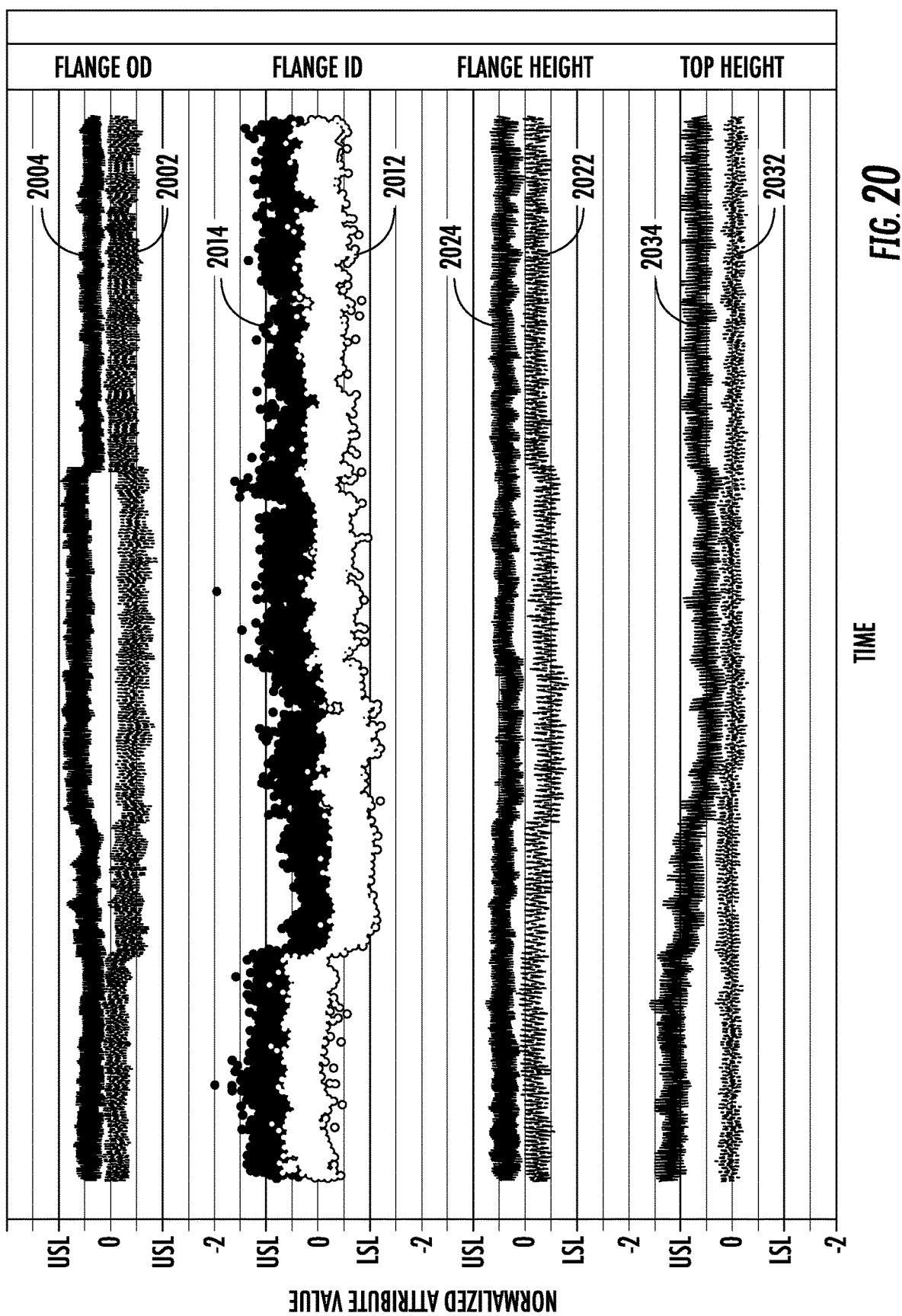
FIG. 20 graphically depicts the normalized measured values of a maximum and a minimum of each of a flange outer diameter, flange inner diameter, flange height, and top height of a glass vial as a function of time throughout the four iterations of the control method in Example 2, according to one or more embodiments shown and described herein.
Figure 21:
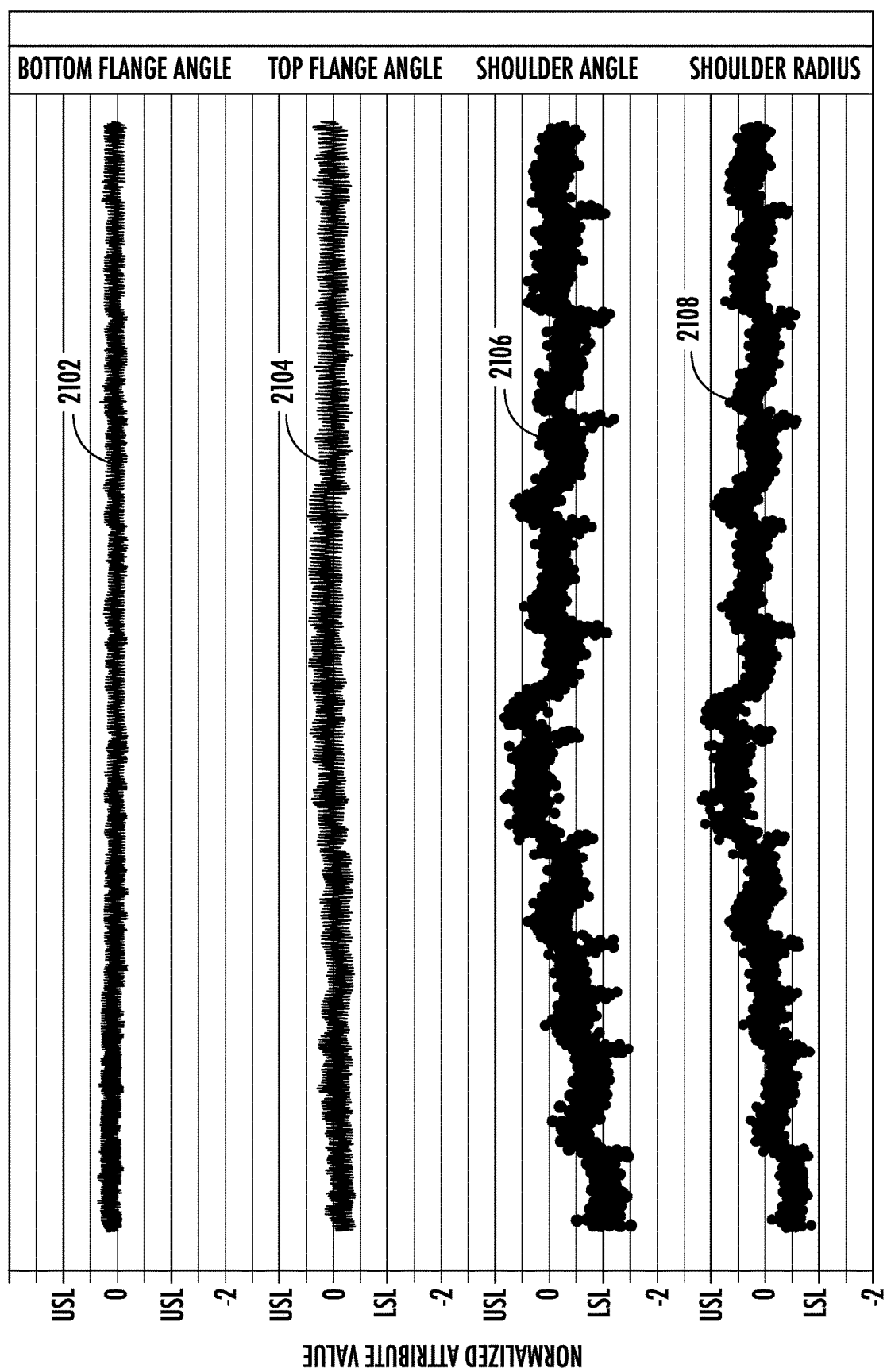
FIG. 21 graphically depicts the normalized measured values for each of a bottom flange angle, top flange angle, shoulder angle, and shoulder radius of a glass vial as a function of time throughout the four iterations of the control method in Example 2, according to one or more embodiments shown and described herein.

Referring now to FIGS. 20 and 21, the normalized measured values of the 13 attributes considered in Example 2 are plotted as a function of time during the 4 iterations of the control method. In FIG. 20, the normalized values of the flange outer diameter minimum 2002, flange outer diameter maximum 2004, flange inner diameter minimum 2012, flange inner diameter maximum 2014, flange height minimum 2022, flange height maximum 2024, top height minimum 2032, and top height maximum 2034 are graphically depicted. As shown in FIG. 20, at the beginning during iteration zero (k-0) the flange inner diameter maximum 2014 and the top height maximum 2034 of the glass vials were both greater than the upper specification limit (USL) for these parameters. As time progresses through each iteration, the process parameters are adjusted to change the inside diameter and the top height so that the flange inner diameter maximum 2014 and the top height maximum 2034 are lower back into the acceptable range between the upper specification limit (USL) and the lower specification limit (LSL). Corresponding adjustments can be seen in the flange outer diameter minimum 2002, flange outer diameter maximum 2004, flange inner diameter minimum 2012, and flange height can also be observed in FIG. 20.

Referring to FIG. 21, the normalized values of the average bottom flange angle 2102, the average top flange angle 2104, the average shoulder angle 2106, and the average shoulder radius 2108 are graphically depicted. As shown in FIG. 21, at the beginning during iteration zero (k-0) the average shoulder angle 2106 was below the lower specification limit (LSL) for the average shoulder angle. As time progresses through each iteration, the process parameters are adjusted to change the shoulder angle so that the average shoulder angle 2106 is maintained in the acceptable range between the USL and the LSL. FIGS. 20 and 21 show that the model predictive control framework and control methods disclosed in the present application can provide feedback control to the converter to identify out of specification attributes of the glass articles and bring those out of specification attributes back into acceptable specification ranges and maintain them with the acceptable specification ranges.

Example 3: Feedback Control with Model Predictive Control Framework with Further Introduction of Mismatch In Example 3, the operating models from Example 2 were integrated into the objective control function of EQU. 4. The resulting objective control function was then used in a model predictive control framework for providing feedback control to a different converter than the converter used to generate the initial operating models. The converter of Example 3 had the same number and arrangement of processing stations as the converter of Example 2. Despite having the same number and arrangement of processing stations, the use of a different converter in Example 3 was expected to introduce even more error and mismatches between the operating models for the converter of Example 2 and the actual operation of the converter of Example 3. The use of operating models from one converter in feedback control of a different converter with the same number and configuration of processing stations, as in Example 3, shows that the model predictive control framework described herein can compensate for significant mismatches between the operating models and actual operation of the converter.

The control method for Example 3 was the same as described in relation to Example 2. Referring again to FIG. 18, reference number 1803 indicates the value of the objective control function for Example 3 as a function of number of iterations of the control method. As shown in FIG. 18, the model predicative control framework disclosed herein was capable of compensating for mismatches between the operating models and actual operation of the converter in as little as one iteration of the control method, even though the operating models were developed on a completely different converting machine. Thus, the model predictive control framework of the present disclosure is robust enough to account for significant errors in the operating models without losing the ability to control the converting process.

While various embodiments of the converter and system and methods for providing feedback control of a converter for producing a plurality of glass articles from glass tubes have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for controlling a converter for producing glass articles from glass tubes, the method comprising:
   operating a converter to produce a plurality of glass articles from a plurality of glass tubes, where the converter comprises a plurality of processing stations and operating the converter comprises translating the glass tubes through each of the plurality of processing stations in succession;
   providing target values for at least one attribute of the plurality of glass articles or the plurality of glass tubes during or after converting;

measuring the at least one attribute of the plurality of glass articles or the plurality of glass tubes during or after converting;

recording settings of at least one process parameter of the converter related to the at least one attribute to produce a data set comprising measured values of the at least one attribute and the settings of the at least one process parameter of the converter;

processing the data set to produce a statistical property of a distribution of the measured values of the at least one attribute;

determining an updated setting for each of the at least one process parameter from the statistical property of the distribution of the at least one attribute measured, the target values of the at least one attribute, and the settings of the at least one process parameter, wherein the updated settings of the at least one process parameter is a value of the settings that minimizes an objective control function for the at least one attribute;

adjusting each of the at least one process parameter of the converter to the updated setting; and wherein the objective control function comprises a mean square error cost function according to the following equation:

$$J(k)=(G^*\text{Act}(k)+\text{Attrib}_{measured}(k)-G^*\text{Act}(k-1)-\text{Attrib}_{targ})^T Q^T Q(G^*\text{Act}(k)+\text{Attrib}_{measured}(k)-(G^*\text{Act}(k-1))-\text{Attrib}_{targ})+(\text{Act}(k)-\text{Act}(k-1))^T R^T R(\text{Act}(k)-\text{Act}(k-1));$$

where:

J(k) is the mean square error cost function as a function of k:

k is an integer indicative of a present iteration of minimizing the mean square error cost function;

G is a matrix of sensitivity factors representative of a degree to which a change in each of the at least one process parameter produces a change each of the at least one attribute;

$\text{Attrib}_{measured}(k)$ is a vector of the statistical property of the distribution of the measured values of the at least one attribute during iteration k;

Act(k) is a setting of the process parameter at iteration k;

Act(k−1) is a setting of the process parameter iteration k−1;

$\text{Attrib}_{targ}$ is a vector of the target values for each of the at least one attribute;

$Q^T Q$ is a symmetric weighting matrix of attribute weighting factors for errors in measured values of the attributes from target values of the attributes; and $R^T R$ is a symmetric weighting matrix of penalty factors on the change in the at least one process parameter.

2. The method of claim 1, further comprising repeating the measuring the at least one attribute, the recording the setting for each of the at least one process parameter, the processing the data set, the determining the updated setting for each of the at least one process parameter, and the adjusting each of the at least one process parameter until the updated setting for each of the at least one process parameter converges.

3. The method of claim 1, wherein processing the data set comprises:

removing outlier data points from the data set of the measured values of the at least one attribute;

after removing the outlier data points, calculating the statistical property for the distribution of the measured values of the at least one attributes from the data set.

4. The method of claim 3, wherein the statistical property of the distribution of the data set is a mean, a median, a range, a standard deviation, a variance, or combinations of these.

5. The method of claim 1, further comprising:

providing a specification range for each of the at least one attribute, wherein the specification range of an attribute comprises:

a minimum value of the attribute below which the glass article is considered out of specification; and a maximum value of the attribute above which the glass article is considered out of specification; and applying an attribute weighting factor to each of the at least one attribute in the objective control function based on a spread in the specification range of each of the at least one attribute.

6. The method of claim 5, further comprising determining the attribute weighting factor from the specification range for each of the at least one attribute.

7. The method of claim 6, comprising determining a process capability index $C_{pk}$ of each of the at least one attribute from the specification range, and determining the attribute weighting factor for each of the at least one attribute based on the process capability index $C_{pk}$ of the at least one attribute.

8. The method of claim 1, further comprising:

developing a penalty factor for each of the at least one process parameter; and applying the penalty factor to each of the at least one process parameter in the objective control function, where the penalty factor operates to reduce the magnitude of changes to process parameters that have greater impact on one or more of the at least one attributes.

9. The method of claim 8, further comprising:

repeating the method of claim 8 for a plurality of iterations;

identifying divergence or oscillation of the updated setting for one or more of the at least one process parameter indicating a reduced ability to control one or more aspects of the converter; and adjusting the penalty factor for one or more of the at least one process parameter, where adjusting the penalty factor reduces a magnitude of changes made to the one or more of the at least one process parameters in each of the plurality of iterations, thereby reducing divergence or oscillation of the updated setting.

10. The method of 9, wherein the divergence is indicated by oscillations in or consistent increases in the objective control function per iteration of the method.

11. The method of claim 1, further comprising:

providing a maximum setting and a minimum setting of each of the at least one process parameter; and maintaining the updated setting for each of the at least one process parameter in a range between the minimum setting and the maximum setting for the process parameter.

12. The method of claim 1, further comprising developing the objective control function.

13. The method of claim 12, wherein developing the objective control function comprises:

developing at least one model relating a predicted value of the at least one attribute for each setting of the at least one process parameter, wherein the at least one model comprises an expression in which the predicted value of the at least one attribute is a sum of at least one term dependent on the setting of the at least one process parameter and an offset constant;

providing an initial mean square error cost function that is a function of the predicted values for each of the at least one attribute, the target values for each of the at least one attribute, and the settings for each of the at least one process parameter;

substituting the at least one model into the initial mean square error cost function for the predicted value of the at least one attribute;

solving the at least one model for the offset constant to produce an offset constant function, where solving the at least one model for the offset constant comprises substituting the statistical property of the measured value for each of the at least one attribute for the predicted value of each of the at least one attribute; and substituting the offset constant function for the offset constant in the initial mean square error cost function to produce the objective control function.

14. The method of claim 13, wherein developing the at least one model comprises conducting a Design of Experiments process, deriving the at least one model from first principles, or combinations of these to produce the at least one model.

15. The method of claim 13, further comprising re-developing the at least one model periodically to account for process changes over time or in response to a known change in operation of the converter.

16. The method of claim 13, further comprising applying an attribute weighting factor for each of the at least one attribute to one or more terms of the objective control function.

17. The method of claim 13, further comprising applying a penalty factor for each of the at least one process parameter to one or more terms of the objective control function.

18. The method of claim 1, wherein determining an updated setting for each of the at least one process parameter further comprises subjecting the at least one process parameter to constraints comprising a maximum value and a minimum value of the at least one process parameter.

19. The method of claim 1, comprising:
providing target values for a plurality of attributes of the plurality of glass articles, the plurality of glass tubes, or both;
measuring the plurality of attributes of the plurality of glass articles, the plurality of glass tubes, or both for a plurality of glass articles;
recording settings of a plurality of process parameters of the converter related to the plurality of attributes to produce a plurality of data sets, each of the plurality of data sets comprising measured values for each of the plurality of attributes and the settings for each of the plurality of process parameters of the converter over the time period;
processing each of the plurality of data sets to produce a statistical property of a distribution for each of the plurality of attributes;
determining an updated setting for each of the plurality of process parameters from the statistical property of the distribution of each of the plurality of attributes, the target values for each of the plurality of attributes, and the settings of each of the plurality of process parameters, where the updated settings for the plurality process parameters are values of the updated settings that minimize the objective control function; and adjusting each of the plurality of process parameters of the converter to the updated setting for each of the plurality of process parameters.

20. The method of claim 1, further comprising displaying a user interface on a display.

21. The method of claim 20, further comprising receiving one or more user inputs from the user interface and changing the updated setting of the at least one process parameter based on the one or more user inputs.

22. The method of claim 1, wherein the at least one attribute comprises one or more attributes of the glass article after converting, one or more attributes of one or more features of a partially formed glass article at the working end of the glass tube, one or more attributes of the glass tube, one or more attributes of a preform at the working end of the glass tube, or combinations of these.

23. A method for controlling a converter for producing glass articles from glass tubes, the method comprising:
operating a converter to produce a plurality of glass articles from a plurality of glass tubes, where the converter comprises a plurality of processing stations and operating the converter comprises translating the glass tubes through each of the plurality of processing stations in succession;
providing target values for at least one attribute of the plurality of glass articles or the plurality of glass tubes during or after converting;
measuring the at least one attribute of the plurality of glass articles or the plurality of glass tubes during or after converting;
recording settings of at least one process parameter of the converter related to the at least one attribute to produce a data set comprising measured values of the at least one attribute and the settings of the at least one process parameter of the converter;
processing the data set to produce a statistical property of a distribution of the measured values of the at least one attribute;
determining an updated setting for each of the at least one process parameter from the statistical property of the distribution of the at least one attribute measured, the target values of the at least one attribute, and the settings of the at least one process parameter, wherein the updated settings of the at least one process parameter is a value of the settings that minimizes an objective control function for the at least one attribute;
adjusting each of the at least one process parameter of the converter to the updated setting;
providing a specification range for each of the at least one attribute, wherein the specification range of an attribute comprises:
a minimum value of the attribute below which the glass article is considered out of specification; and
a maximum value of the attribute above which the glass article is considered out of specification; and
applying an attribute weighting factor to each of the at least one attribute in the objective control function based on a spread in the specification range of each of the at least one attribute.

24. The method of claim 23, further comprising repeating the measuring the at least one attribute, the recording the setting for each of the at least one process parameter, the processing the data set, the determining the updated setting for each of the at least one process parameter, and the adjusting each of the at least one process parameter until the updated setting for each of the at least one process parameter converges.

25. The method of claim 23, wherein processing the data set comprises:
  removing outlier data points from the data set of the measured values of the at least one attribute; and
  after removing the outlier data points, calculating the statistical property for the distribution of the measured values of the at least one attributes from the data set.

26. The method of claim 25, wherein the statistical property of the distribution of the data set is a mean, a median, a range, a standard deviation, a variance, or combinations of these.

27. The method of claim 23, further comprising determining the attribute weighting factor from the specification range for each of the at least one attribute.

28. The method of claim 27, comprising determining a process capability index $C_{pk}$ of each of the at least one attribute from the specification range, and determining the attribute weighting factor for each of the at least one attribute based on the process capability index $C_{pk}$ of the at least one attribute.

29. The method of claim 23, further comprising:
  developing a penalty factor for each of the at least one process parameter; and
  applying the penalty factor to each of the at least one process parameter in the objective control function, where the penalty operates to reduce the magnitude of changes to process parameters that have greater impact on one or more of the at least one attributes.

30. The method of claim 29, further comprising:
  repeating the method of claim 29 for a plurality of iterations;
  identifying divergence or oscillation of the updated setting for one or more of the at least one process parameter indicating a reduced ability to control one or more aspects of the converter; and
  adjusting the penalty factor for one or more of the at least one process parameter, where adjusting the penalty factor reduces a magnitude of changes made to the one or more of the at least one process parameters in each of the plurality of iterations, thereby reducing divergence or oscillation of the updated setting.

31. The method of 30, wherein the divergence is indicated by oscillations in or consistent increases in the objective control function per iteration of the method.

32. The method of claim 23, further comprising:
  providing a maximum setting and a minimum setting of each of the at least one process parameter; and
  maintaining the updated setting for each of the at least one process parameter in a range between the minimum setting and the maximum setting for the process parameter.

33. The method of claim 23, wherein the objective control function comprises a mean square error cost function according to the following equation:

$$J(k)=(G^*\text{Act}(k)+\text{Attrib}_{measured}(k)-G^*\text{Act}(k-1)-\text{Attrib}_{targ})^T Q^T Q(G^*\text{Act}(k)+\text{Attrib}_{measured}(k)-(G^*\text{Act}(k-1))-\text{Attrib}_{targ})+(\text{Act}(k)-\text{Act}(k-1))^T R^T R(\text{Act}(k)-\text{Act}(k-1));$$

where:
  $J(k)$ is the mean square error cost function as a function of k;
  k is an integer indicative of a present iteration of minimizing the mean square error cost function;
  G is a matrix of sensitivity factors representative of a degree to which a change in each of the at least one process parameter produces a change each of the at least one attribute;
  $\text{Attrib}_{measured}(k)$ is a vector of the statistical property of the distribution of the measured values of the at least one attribute during iteration k;
  $\text{Act}(k)$ is a setting of the process parameter at iteration k;
  $\text{Act}(k-1)$ is a setting of the process parameter iteration k-1;
  $\text{Attrib}_{targ}$ is a vector of the target values for each of the at least one attribute;
  $Q^T Q$ is a symmetric weighting matrix of attribute weighting factors for errors in measured values of the attributes from target values of the attributes; and
  $R^T R$ is a symmetric weighting matrix of penalty factors on the change in the at least one process parameter.

34. The method of claim 33, further comprising developing the objective control function.

35. The method of claim 34, wherein developing the objective control function comprises:
  developing at least one model relating a predicted value of the at least one attribute for each setting of the at least one process parameter, wherein the at least one model comprises an expression in which the predicted value of the at least one attribute is a sum of at least one term dependent on the setting of the at least one process parameter and an offset constant;
  providing an initial mean square error cost function that is a function of the predicted values for each of the at least one attribute, the target values for each of the at least one attribute, and the settings for each of the at least one process parameter;
  substituting the at least one model into the initial mean square error cost function for the predicted value of the at least one attribute;
  solving the at least one model for the offset constant to produce an offset constant function, where solving the at least one model for the offset constant comprises substituting the statistical property of the measured value for each of the at least one attribute for the predicted value of each of the at least one attribute; and
  substituting the offset constant function for the offset constant in the initial mean square error cost function to produce the objective control function.

36. The method of claim 35, wherein developing the at least one model comprises conducting a Design of Experiments process, deriving the at least one model from first principles, or combinations of these to produce the at least one model.

37. The method of claim 35, further comprising re-developing the at least one model periodically to account for process changes over time or in response to a known change in operation of the converter.

38. The method of claim 35, further comprising applying an attribute weighting factor for each of the at least one attribute to one or more terms of the objective control function.

39. The method of claim 35, further comprising applying a penalty factor for each of the at least one process parameter to one or more terms of the objective control function.

40. The method of claim 23, wherein determining an updated setting for each of the at least one process parameter further comprises subjecting the at least one process parameter to constraints comprising a maximum value and a minimum value of the at least one process parameter.

41. The method of claim 23, comprising:
  providing target values for a plurality of attributes of the plurality of glass articles, the plurality of glass tubes, or both;

measuring the plurality of attributes of the plurality of glass articles, the plurality of glass tubes, or both for a plurality of glass articles;

recording settings of a plurality of process parameters of the converter related to the plurality of attributes to produce a plurality of data sets, each of the plurality of data sets comprising measured values for each of the plurality of attributes and the settings for each of the plurality of process parameters of the converter over the time period;

processing each of the plurality of data sets to produce a statistical property of a distribution for each of the plurality of attributes;

determining an updated setting for each of the plurality of process parameters from the statistical property of the distribution of each of the plurality of attributes, the target values for each of the plurality of attributes, and the settings of each of the plurality of process parameters, where the updated settings for the plurality process parameters are values of the updated settings that minimize the objective control function; and adjusting each of the plurality of process parameters of the converter to the updated setting for each of the plurality of process parameters.

42. The method of claim 23, further comprising displaying a user interface on a display.

43. The method of claim 42, further comprising receiving one or more user inputs from the user interface and changing the updated setting of the at least one process parameter based on the one or more user inputs.

44. The method of claim 23, wherein the at least one attribute comprises one or more attributes of the glass article after converting, one or more attributes of one or more features of a partially formed glass article at the working end of the glass tube, one or more attributes of the glass tube, one or more attributes of a preform at the working end of the glass tube, or combinations of these.

45. A method for controlling a converter for producing glass articles from glass tubes, the method comprising:

operating a converter to produce a plurality of glass articles from a plurality of glass tubes, where the converter comprises a plurality of processing stations and operating the converter comprises translating the glass tubes through each of the plurality of processing stations in succession;

providing target values for at least one attribute of the plurality of glass articles or the plurality of glass tubes during or after converting;

measuring the at least one attribute of the plurality of glass articles or the plurality of glass tubes during or after converting;

recording settings of at least one process parameter of the converter related to the at least one attribute to produce a data set comprising measured values of the at least one attribute and the settings of the at least one process parameter of the converter;

processing the data set to produce a statistical property of a distribution of the measured values of the at least one attribute;

determining an updated setting for each of the at least one process parameter from the statistical property of the distribution of the at least one attribute measured, the target values of the at least one attribute, and the settings of the at least one process parameter, wherein the updated settings of the at least one process parameter is a value of the settings that minimizes an objective control function for the at least one attribute;

adjusting each of the at least one process parameter of the converter to the updated setting;

developing a penalty factor for each of the at least one process parameter;

applying the penalty factor to each of the at least one process parameter in the objective control function, where the penalty factor operates to reduce the magnitude of changes to process parameters that have greater impact on one or more of the at least one attributes;

identifying divergence or oscillation of the updated setting for one or more of the at least one process parameter indicating a reduced ability to control one or more aspects of the converter; and adjusting the penalty factor for one or more of the at least one process parameter, where adjusting the penalty factor reduces a magnitude of changes made to the one or more of the at least one process parameters, thereby reducing divergence or oscillation of the updated setting.

* * * * *